INVENTOR.
John E. Ostline
BY
Smith, Olsen & Baird
Attys.

Nov. 20, 1956 J. E. OSTLINE 2,771,510

TOLL TICKETING TELEPHONE SYSTEMS

Original Filed Jan. 11, 1951

21 Sheets-Sheet 2

INVENTOR.
John E. Ostline
BY
Smith, Olsen & Baird
Attys.

INVENTOR.
John E. Ostline
BY
Smith, Olsen & Baird
Attys.

Nov. 20, 1956 J. E. OSTLINE 2,771,510

TOLL TICKETING TELEPHONE SYSTEMS

Original Filed Jan. 11, 1951

21 Sheets-Sheet 4

INVENTOR.
John E. Ostline
BY
Smith, Olsen & Baird
Attys.

INVENTOR.
John E. Ostline
BY
Smith, Olsen + Baird
Attys.

Nov. 20, 1956 J. E. OSTLINE 2,771,510

TOLL TICKETING TELEPHONE SYSTEMS

Original Filed Jan. 11, 1951 21 Sheets-Sheet 6

INVENTOR.
John E. Ostline
BY
Smith, Olsen + Baird
Attys.

Nov. 20, 1956 J. E. OSTLINE 2,771,510

TOLL TICKETING TELEPHONE SYSTEMS

Original Filed Jan. 11, 1951 21 Sheets-Sheet 7

INVENTOR.
John E. Ostline
BY
Smith, Olsen + Baird
Attys.

Nov. 20, 1956 J. E. OSTLINE 2,771,510

TOLL TICKETING TELEPHONE SYSTEMS

Original Filed Jan. 11, 1951 21 Sheets-Sheet 8

INVENTOR.
John E. Ostline
BY
Smith, Olsen + Baird
Attys.

INVENTOR.
John E. Ostline
BY
Smith, Olsen & Baird
Attys.

Nov. 20, 1956 J. E. OSTLINE 2,771,510

TOLL TICKETING TELEPHONE SYSTEMS

Original Filed Jan. 11, 1951 21 Sheets-Sheet 10

INVENTOR.
John E. Ostline
BY
Smith, Olsen & Baird
Attys.

INVENTOR.
John E. Ostline
BY
Smith, Olsen & Baird
Attys.

INVENTOR.
John E. Ostline

INVENTOR.
John E. Ostline

INVENTOR.
John E. Ostline
BY
Smith, Olsen & Baird
Attys.

Nov. 20, 1956 J. E. OSTLINE 2,771,510

TOLL TICKETING TELEPHONE SYSTEMS

Original Filed Jan. 11, 1951 21 Sheets-Sheet 15

INVENTOR.
John E. Ostline
BY
Smith, Olsen & Baird
Attys.

INVENTOR.
John E. Ostline
BY
Smith, Olsen & Baird
Attys.

INVENTOR.
John E. Ostline
BY
Smith, Olsen + Baird
Attys.

INVENTOR.
John E. Ostline
BY
Smith, Olsen & Baird
Attys.

CALL RECORDER 2000

INVENTOR.
John E. Ostline
BY
Smith, Olsen + Baird
Attys.

Nov. 20, 1956 J. E. OSTLINE 2,771,510

TOLL TICKETING TELEPHONE SYSTEMS

Original Filed Jan. 11, 1951

21 Sheets-Sheet 20

INVENTOR.
John E. Ostline
BY
Smith, Olsen & Baird
Attys.

INVENTOR.
John E. Ostline
BY
Smith, Olsen + Baird
Attys.

United States Patent Office 2,771,510

Patented Nov. 20, 1956

2,771,510

TOLL TICKETING TELEPHONE SYSTEMS

John E. Ostline, Chicago, Ill., assignor to Automatic Electric Laboratories, Inc., Chicago, Ill., a corporation of Delaware Original application January 11, 1951, Serial No. 205,460. Divided and this application July 15, 1953, Serial No. 368,097

21 Claims. (Cl. 179—27)

Figure 1:
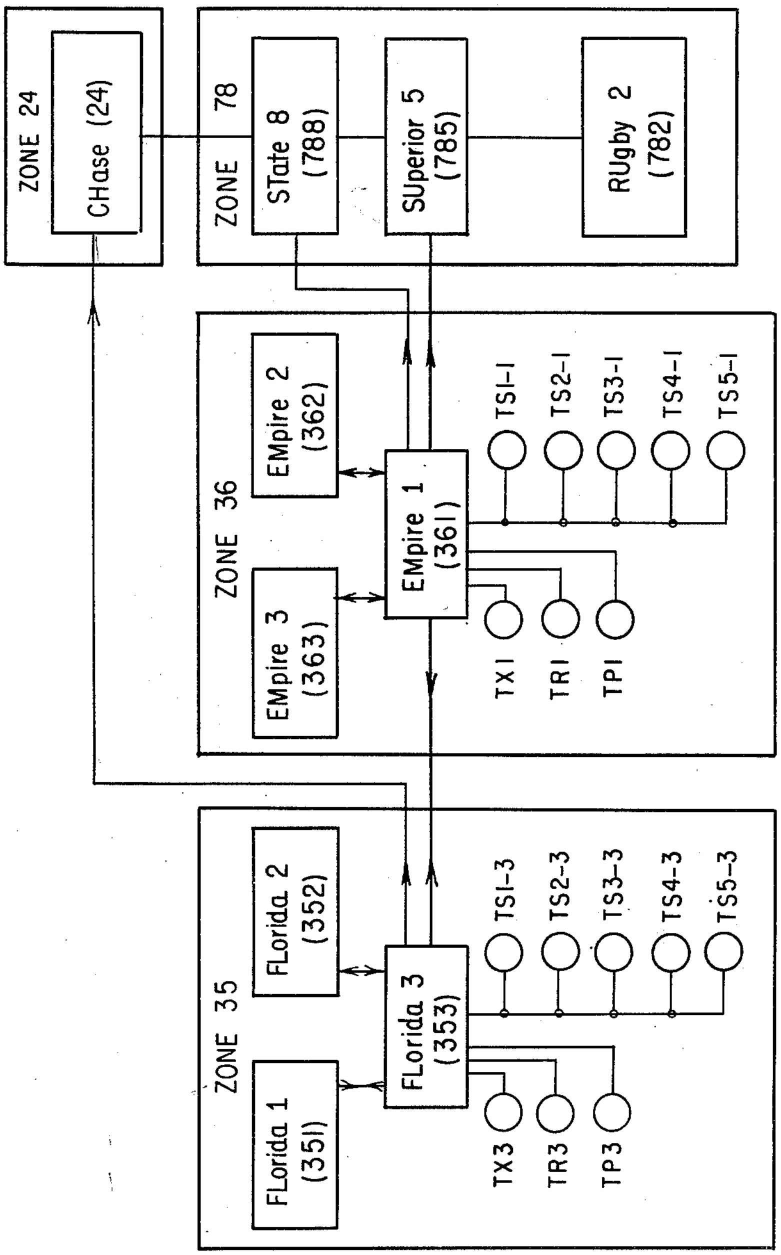

The present invention relates to automatic telephone systems in general, and in particular to improvements in automatic toll ticketing telephone systems arranged to produce a record of certain items of information pertaining to each telephone connection. More specifically, the present invention relates to improvements in automatic toll ticketing telephone systems of the character disclosed in the copending application of John E. Ostline, Serial No. 75,985, filed February 12, 1949, now Patent No. 2,678,353, granted May 11, 1954. This application is a division of a copending application of John E. Ostline, Serial No. 205,460, filed January 11, 1951.

An automatic toll ticketing telephone system of the type disclosed in the above-mentioned Ostline application, is divided into a plurality of zones and each zone includes one or more telephone exchanges. Telephone connections established between the subscribers in different exchanges in the different zones and between the subscribers in different exchanges in the same zone are handled on a toll basis so that charges for the connections may be assessed against the calling subscriber substations in accordance with the distances between the exchanges and the time duration of the connections. Each telephone connection is established automatically and a record is produced containing the particulars concerning the connections, including the office code digits identifying both the calling and called exchangers, the numerical digits identifying both the calling and the called subscriber lines, and other pertinent particulars, such as the rate applicable to the connection, the duration thereof, the date and possibly the toll charge for the call.

The telephone connections, in the above-noted Ostline application, are automatically completed from a calling subscriber to a desired called subscriber under control of a register sender apparatus provided in the originating exchange. In extending a connection, the calling subscriber merely operates his calling device in accordance with the directory number of the desired called subscriber which includes an office code portion comprising the first two letters of the called exchange name and a digit identifying the particular called exchange, and a numerical portion comprising four digits designating the called subscriber substation in the particular called exchange. Consequently, each subscriber directory number normally constitutes a seven-digit number. Certain exchanges in the system however are identified by an office code portion comprising the first two letters of the called exchange name and a numerical portion comprising four digits designating the called subscriber substations. Therefore, the directory numbers of the subscriber substations in the exchanges identified by a two-digit office code constitute a six-digit number instead of a seven-digit number. In either event, the first three digits dialed by a calling subscriber are registered in the register sender and are translated into one or more routing digits so that the call will be properly routed to the particular called exchange. The first three digits of a seven-digit called number will include the first two letters of the desired called exchange name and the digit identifying the particular called exchange, and the first three digits of a six-digit number will include the first two letters of the called exchange name and the thousands-digit of the numerical portion of the particular called subscriber substation number. In addition to determining the routing digits to be transmitted by the register sender, the first three digits dialed by the calling subscriber also control the register sender to transmit thereafter certain of the first three digits identifying the called exchange and all of the digits constituting the numerical portion of the called subscriber directory number. From the foregoing it will be understood that the register sender will first transmit the routing digits, then the determined digits of the called exchange code, and finally four digits constituting the numerical portion of the called subscriber directory number.

In the above-mentioned Ostline application an idle register sender is automatically associated with the calling subscriber line and the digits of the called subscriber directory number, as dialed by the calling subscriber, are registered therein. In response to the registration of the first three digits of the called subscriber directory number, a common translator mechanism is automatically associated with the register sender to perform the translation operation briefly noted above. In other words, the translator mechanism functions to translate the first three digits registered in the register sender into one or more routing digits and it registers the routing digits in the register sender. The translator mechanism is then disconnected from the register sender and rendered available to other register senders. Thereafter the register sender transmits the routing digits registered therein, then certain digits of the called exchange code, and finally the four digits of the numerical portion of the called subscriber directory number in order to complete the telephone connection to the called subscriber. During the establishment of the above-mentioned connection, various items of record information pertaining thereto, such as the calling subscriber directory number, the called subscriber directory number, the rate of charge for the call, and other pertinent items of information, are temporarily registered so that a record may be produced of the telephone connection and charged against calling subscriber.

During the establishment of the above-described telephone connection, an idle toll ticket repeater is also included in the connection for the purpose of registering and storing the items of record information. This repeater times the established connection, and upon the termination of the connection will have registered therein the total elapsed conversation time of the particular telephone connection.

Following the release of the connection, an idle tabulator is associated with the toll ticket repeater so that the items of record information stored in the toll ticket repeater may be transferred to the tabulator before the repeater is released and rendered available for another call. The tabulator thereafter controls a ticket tape punch mechanism and a record tape punch mechanism in order to produce respectively an individual record and a common record of the completed toll call. These records may then be used by the operating telephone company to control appropriate business machines in order to produce printed records of the items of information pertaining to each toll call contained on the perforated tapes.

The main object of the present invention is to provide improved circuits and apparatus for an automatic toll ticketing telephone system of the type noted above, and to provide an improved register sender for such a system.

A further object of the invention is to provide in an automatic toll ticketing telephone system an improved register sender which is arranged to control the switching apparatus to complete connections to subscriber lines identified by both six and seven-digit directory numbers even though the first three digits of the directory numbers are identical.

It is still another object of the invention to provide in a toll ticketing telephone system an improved register sender which is arranged to automatically route a call on a falsely grounded calling line to an operator position in the event that the call is one which would normally be recorded and which is also arranged to permit completion of the call in the event that it is one which would not be recorded.

It is still another object of the present invention to provide in a toll ticketing telephone system an improved register sender which is arranged to automatically route a call to an operator position in the event that the translator assigner fails to connect the common translator equipment to the calling register sender within a predetermined elapsed time interval.

It is still another object of the invention to provide in a toll ticketing telephone system an improved arrangement for controlling a line finder to search for a calling subscriber line and for simultaneously controlling the associated primary selector to operate a hunting switch to search for an idle register sender.

It is still another object of the invention to provide in a toll ticketing telephone system an improved register sender which is arranged to automatically translate "0" toll operator calls into a plurality of routing digits and which is arranged to automatically route the calls to the "0" toll operator position without calling in the common translator for the translation operation.

Further objects and features of the invention pertain to the particular arrangement of the circuit elements of the automatic toll ticketing telephone system whereby the above-outlined and additional operating features are attained.

Figure 2:
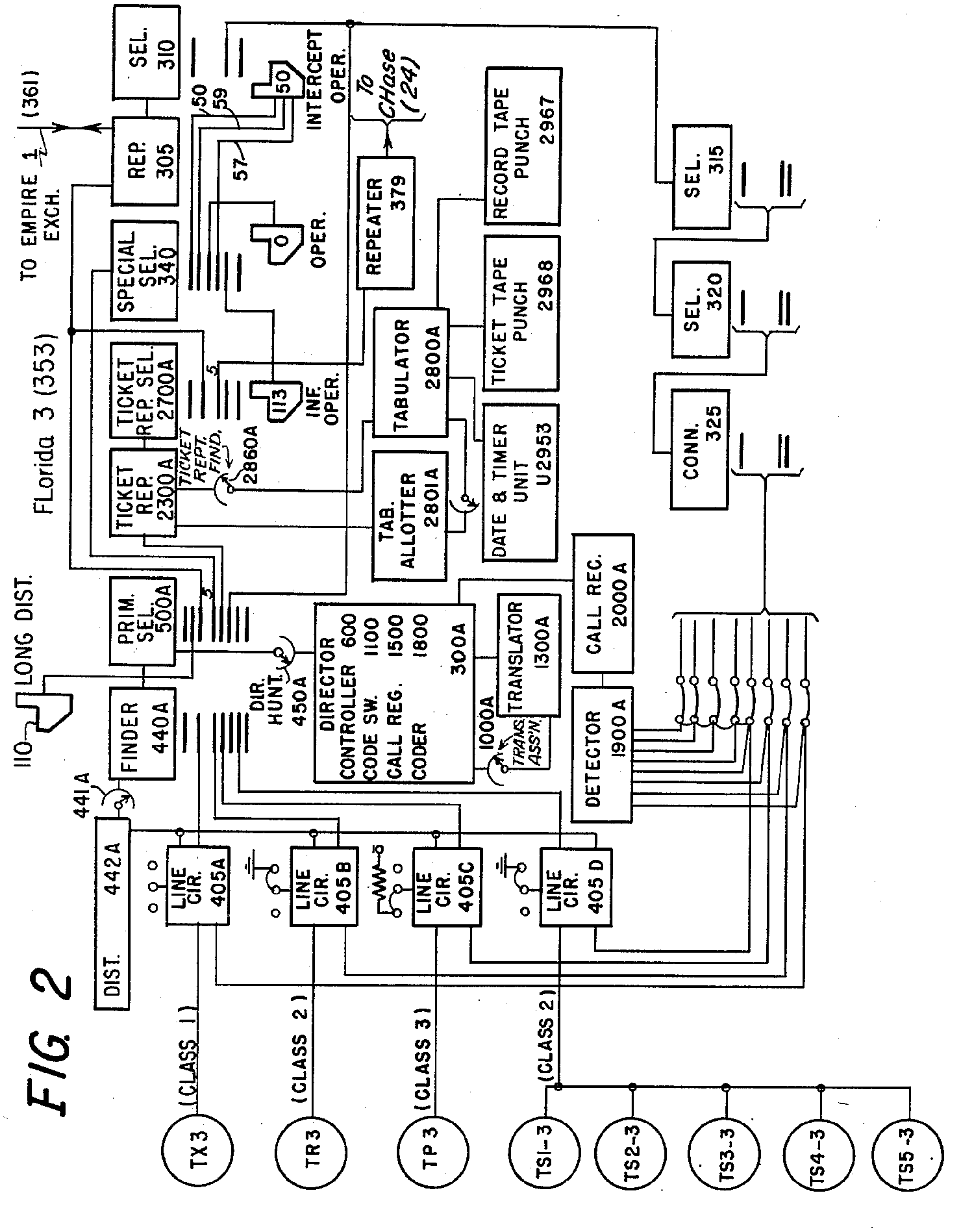
Figure 3:
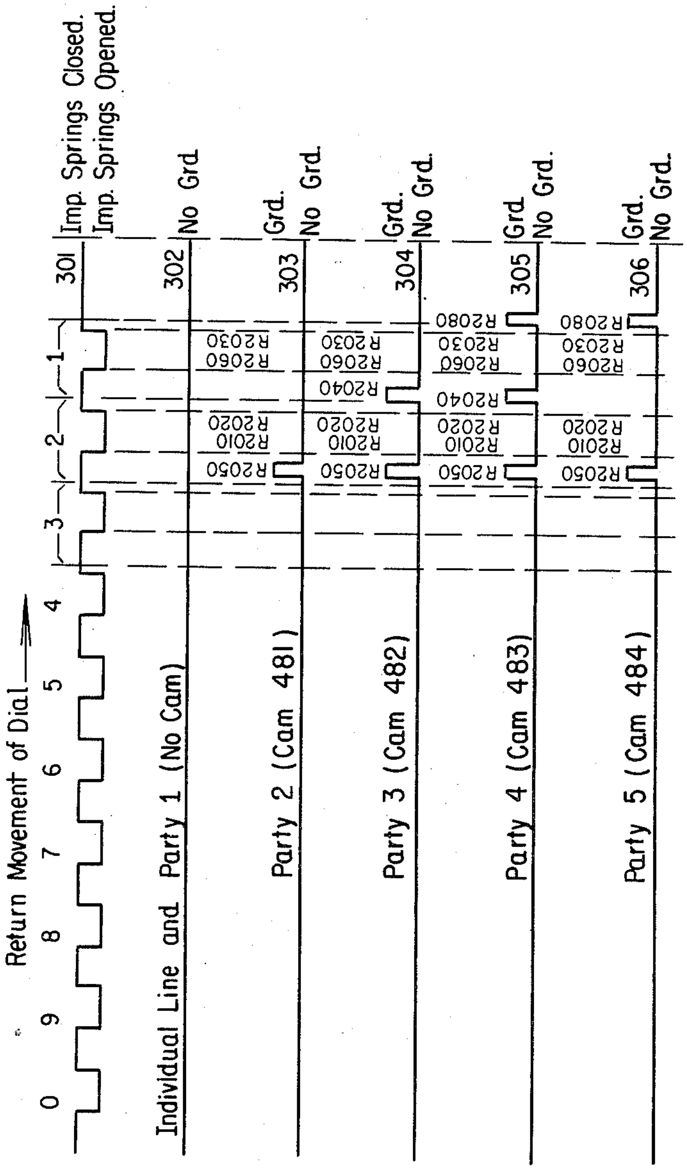
Figures 4, 5:
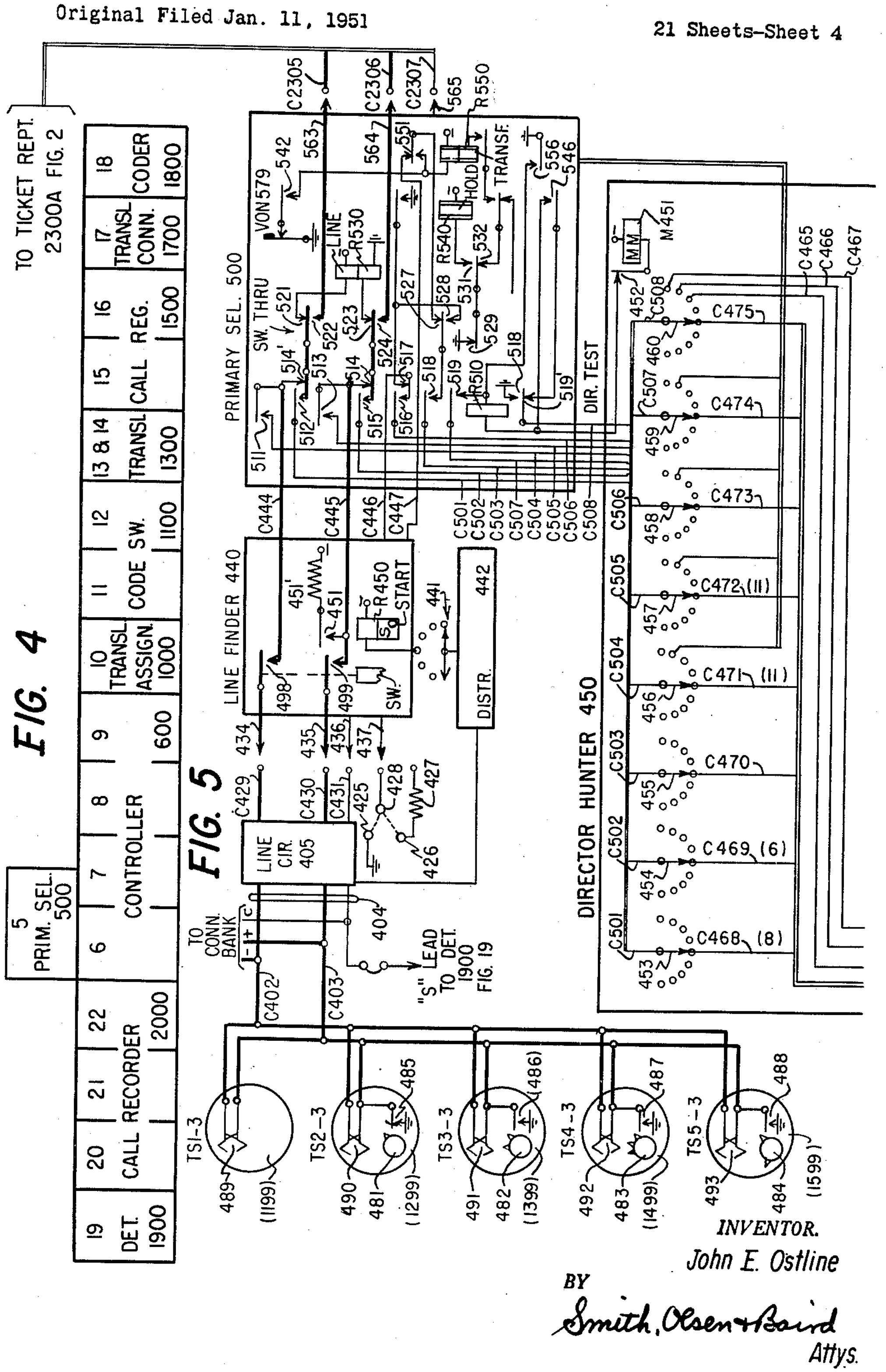

The invention, both as to organization and method of operation, together with further objects and advantages thereof, will best be understood by reference to the following specification taken in connection with the accompanying drawings in which Figure 1 is a schematic diagram of the area served by the telephone system embodying the present invention; Fig. 2 is a trunking diagram illustrating the general arrangement of the switching apparatus incorporated in the FLorida 3 exchange in zone 35 of the telephone system; Fig. 3 schematically illustrates the manner in which the dial or calling device at the different substations on five-party lines transmit switch controlling impulses corresponding to the digits of called subscriber directory numbers and station identifying ground impulses corresponding to the respective stations on the five-party lines; Fig. 4 illustrates the mode of combining Figs. 5 to 22, inclusive, to form a unified system for the FLorida 3 exchange; and Figs. 5 to 22, inclusive, when assembled together in the manner shown in Fig. 4, illustrate the details of the switching apparatus included in the FLordia 3 exchange in zone 35 of the telephone system, which apparatus has incorporated therein the features of the invention, as briefly outlined above.

More particularly, Fig. 5 schematically illustrates five subscriber substations TS1-3 to TS5-3 on a five-party line connected to the schematically illustrated line circuit 405. This line circuit 405 terminates in the bank contacts accessible to the line finder 440, and the latter circuit is individually associated with the primary selector 500. The line finder 440 may be of the type illustrated in the Bakker Patent No. 2,289,896, granted July 14, 1942, and the line circuit 405 and the primary selector 500 may be of the type illustrated in Figs. 4 and 5 of the previously noted Ostline application. In the present system the line finder 440 has been modified so that the start relay thereof, when operated to initiate the vertical and rotary stepping of the associated wiper set, also applies resistance battery to the conductor C445 in order to complete an operating circuit for the line relay R530 in the primary selector 500. In addition to the foregoing, Fig. 5 illustrates the director hunter 450 which has access via its associated wipers to a plurality of directors or register senders.

Figs. 6 to 9, inclusive, 11, 12 and 15 to 18, inclusive, illustrate the details of one of a plurality of the directors or register senders provided in the FLorida 3 exchange. Each director of the system includes a plurality of units of equipment which have been designated respectively, the controller 600 shown in Figs. 6 to 9, inclusive, the code switch 1100 illustrated in Figs. 11 and 12, the call register 1500 illustrated in Figs. 15 and 16, and the coder 1800 illustrated in Figs. 17 and 18. The controller 600 portion of the director includes facilities for controlling the operation of the other units of equipment comprising the director, for controlling the transmission of switch setting impulses for setting up desired connections, and for controlling the transmission of coded impulses for recording the various items of information pertaining to a toll connection. The code switch 1100 portion of the director includes facilities for receiving the impulses of the digits dialed by the calling subscribers and for selectively controlling the operation of the common exchange translator 1300 for the purpose of determining the routing digits to be employed by the director in setting up the telephone connections. The call register 1500 portion of the director includes facilities for registering the digits of the called subscriber directory number, as dialed by a calling subscriber, and for determining the order of transmission of the registered routing digits and the registered digits of the called number. Finally, the coder 1800 portion of the director includes facilities for registering the routing digits, the digits indicative of the rate of charge for a call, and the various control operations which are to be performed by the director, either as determined by the selective operation of the translator 1300, or as determined by the joint operation of the controller 600 and the call register 1500.

Figure 10:
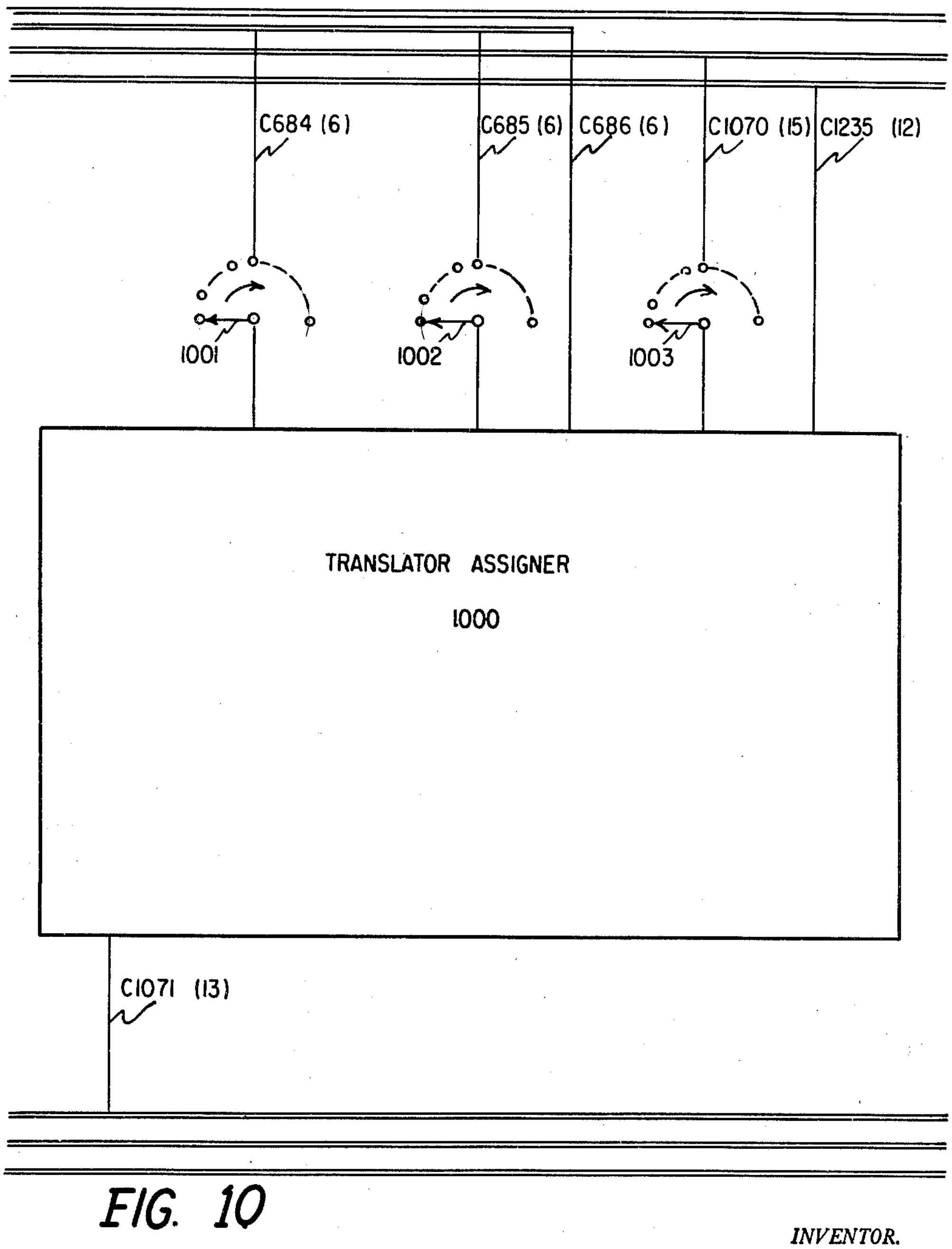

Fig. 10 schematically illustrates the translator assigner 1000 which is provided to associate the common exchange translator 1300 with a calling one of a plurality of directors and for limiting the time duration that the common translator 1300 may be associated with any calling director. The details of the translator assigner 1000 are shown in Fig. 10 of the previously noted Ostline Patent No. 2,678,353.

Figure 13:
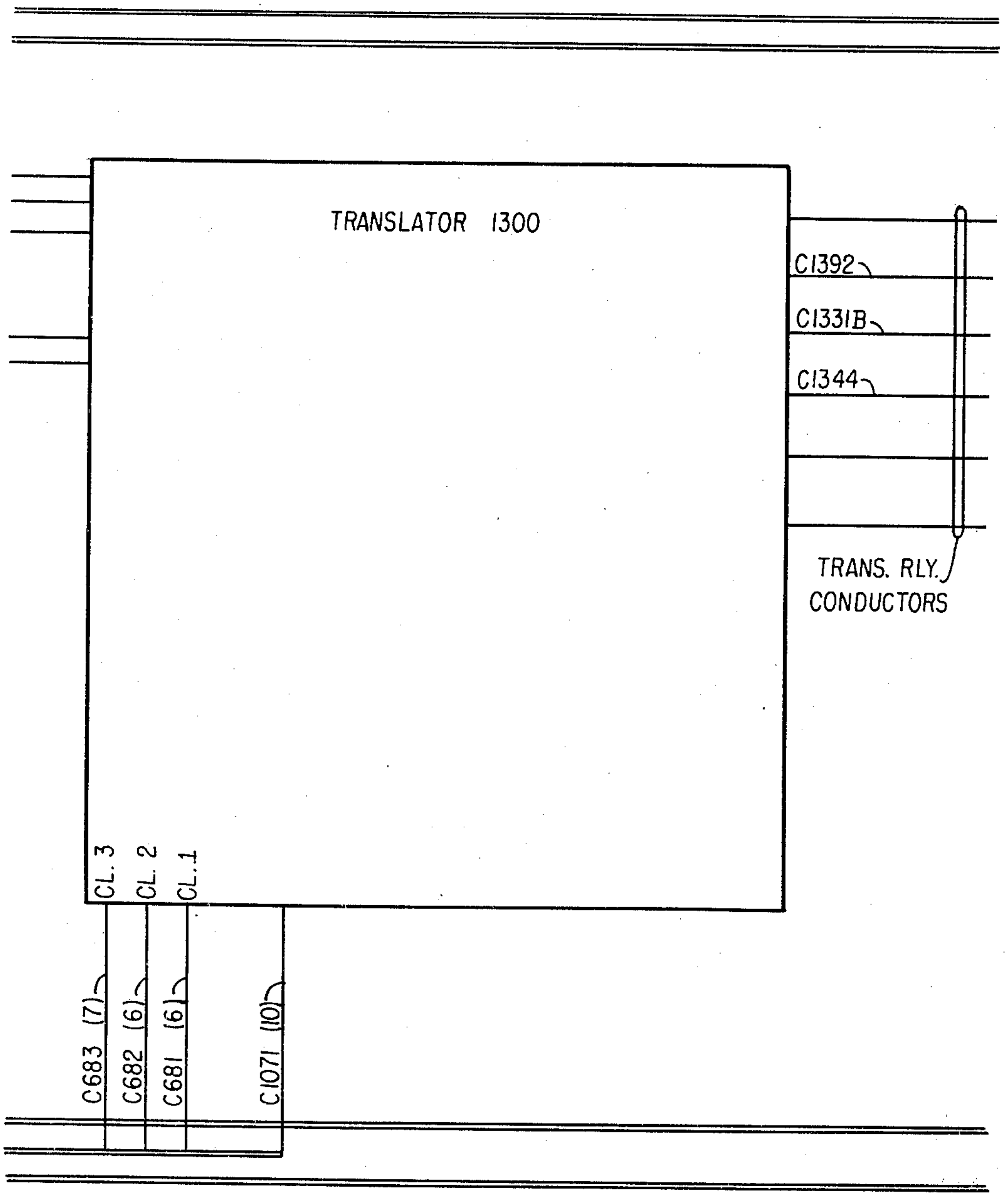
Figure 14:
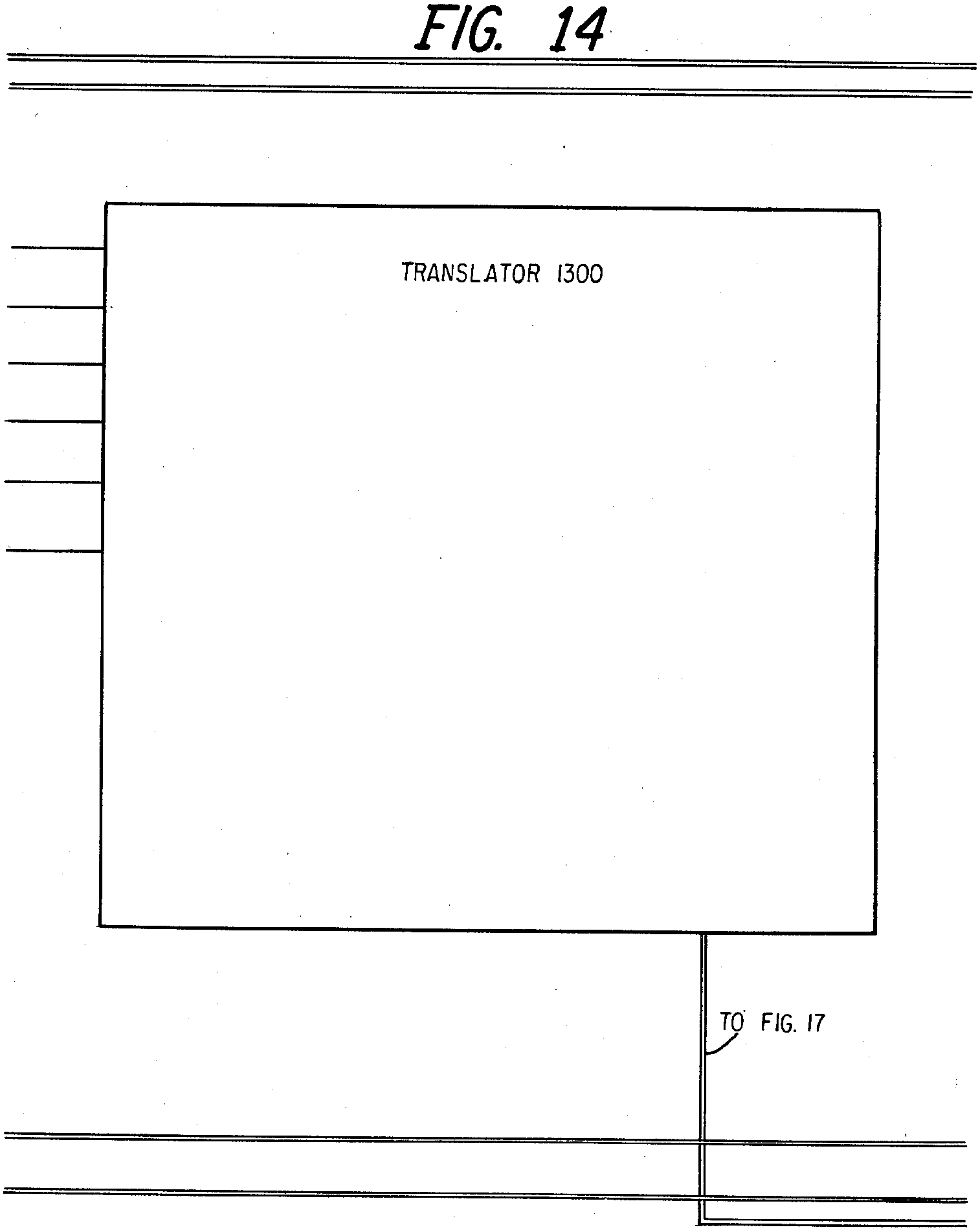

Figs. 13 and 14 schematically illustrate the common exchange translator 1300 which is temporarily associated with the coder 1800 portion of a calling director in order to register in the coder 1800 the routing digits, the rate digit applicable to a call, and certain director controls, and in order to call in the call recorder 2000 when a record is to be made of the call, all in accordance with the code digits identifying the called exchange and the class of the particular calling subscriber line. The details of the common exchange translator 1300 are shown in Figs. 13 and 14 of the above-noted Ostline Patent No. 2,678,353.

Figure 19:
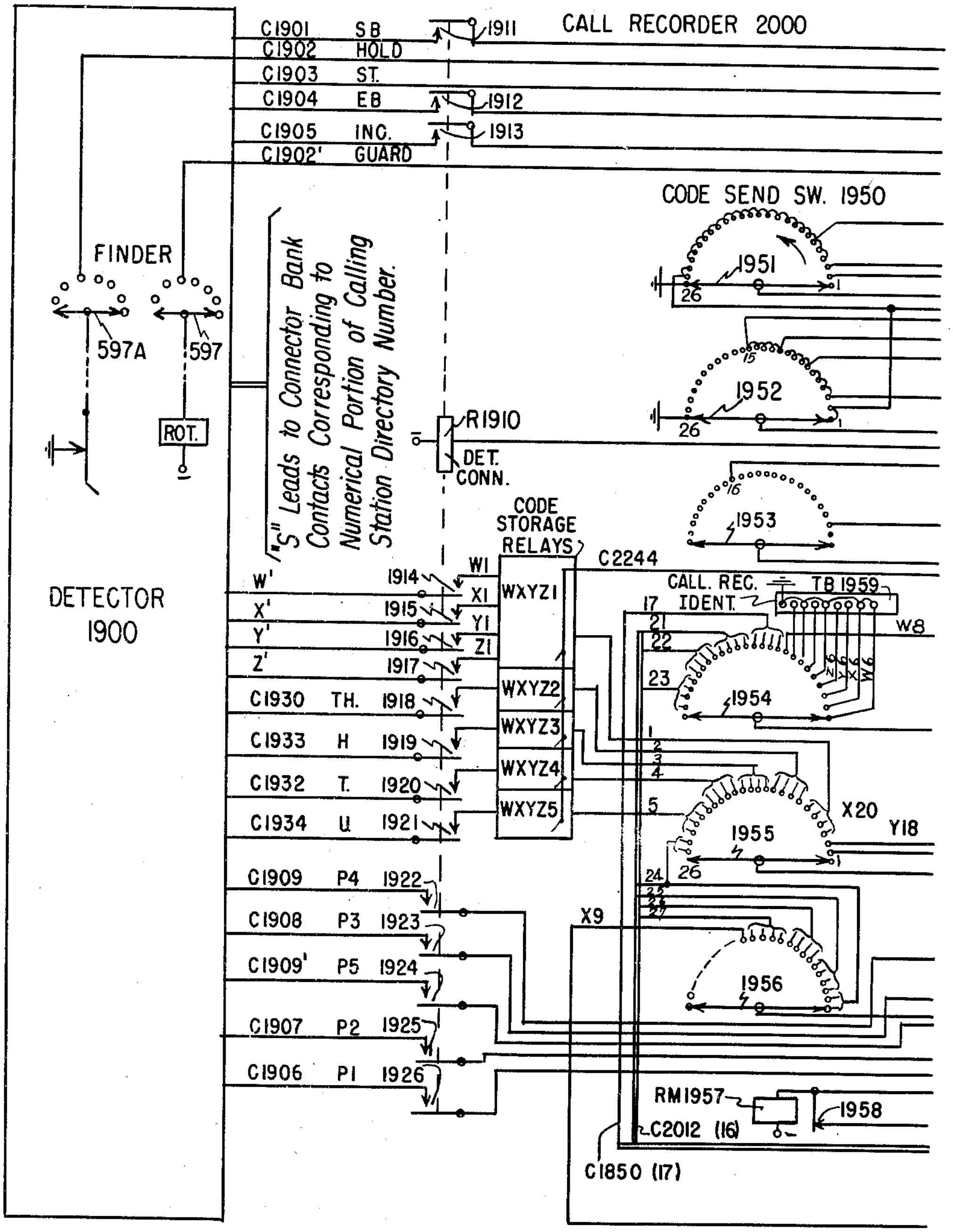

Fig. 19 schematically illustrates the detector 1900 which is arranged to identify the number of the calling station. This detector is substantially identical to the detector 1900 illustrated in the copending Ostline application, Serial No. 79,677, filed March 4, 1949, now Patent No. 2,639,330, granted May 19, 1953. Figs. 19 to 22, inclusive, illustrate the details of the call recorder 2000 which is called into use by the translator 1300 and associated with the director only in the event that a record is to be produced of the items of information pertaining to the particular toll call.

Referring now to Fig. 2, it will be seen that the primary selector 500A which corresponds to the primary selector 500 schematically illustrated in Fig. 5, has access by way of its associated bank contacts to various trunk lines extending to other switching apparatus included in the FLorida 3 exchange. More particularly, in one level of the associated bank contacts the primary selector 500A has access to the local switch train including the selectors 315 and 320, and the connector 325 for completing local calls to subscriber lines terminating in the FLorida 3 exchange.

In another level of the associated bank contacts the primary selector 500A has access to the recording trunks, including the ticket repeater 2300A and the ticket repeater selector 2700A for extending toll connections, by way of the repeater 379 to the CHase exchange, and by way of the repeater 305 to the EMpire 1 exchange. At this point it should be noted that calls may also be completed, either through the EMpire 1 exchange or the CHase exchange, to the STate 8, SUperior 5, and RUgby 2 exchanges provided in zone 78. All calls completed over the trunks including ticket repeaters, such as the ticket repeater 2300A, are recorded.

In another level of the associated bank contacts the primary selector 500A may complete connections over trunk lines including the special selector 340 to the intercepting operator position 50, the "0" operator position, and the information operator position 113.

Over still another level the primary selector 500A may complete connections to the EMpire 1 exchange via the repeater 305 without including any of the recording trunks and associated toll ticket repeaters. In other words, calls completed to the EMpire 1 exchange over the last-mentioned path will by-pass the recording apparatus.

In still another level the primary selector 500A has access to trunk lines extending to the long distance operator position 110.

The recording apparatus which may be associated with the ticket repeaters, such as the ticket repeater 2300A, includes a tubulator allotter 2801A which is arranged to select an idle tabulator 2800A and to cause it to be associated with a particular calling ticket repeater by means of the ticket repeater finder 2860A. When the tabulator 2800A is associated with a ticket repeater various items of record information pertaining to the telephone connection, including the calling subscriber directory number, the called subscriber directory number, the rate of charge for the call, the time duration of the conversational connection, and certain other items of information are transferred from the calling ticket repeater to the tabulator 2800A. Thereafter, the calling ticket repeater is released for other calls. If the toll ticket punch mechanism 2968 and the record tape punch mechanism 2967 are available, the tabulator 2800A will control these mechanisms to perforate tapes in accordance with the items of record information stored in the tabulator, and also the date and time of the recording as registered in the date and time unit U2953. In this manner the record tape punch mechanism 2967, and the ticket tape punch mechanism 2968 will produce respectively a perforated tape containing a record of various items of information pertaining to the toll connection.

All of the recording apparatus described above, including the ticket repeater 2300A, the ticket repeater selector 2700A, the tabulator allotter 2801A, the tabulator 2800A, and the ticket repeater finder 2860A, are disclosed and described in detail in the previously mentioned Ostline application Serial No. 75,985, filed February 12, 1949, now Patent No. 2,678,353, granted May 11, 1954.

*The general arrangement of the telephone system*

The telephone system disclosed in the drawings is substantially the same as the system disclosed in the last-mentioned Ostline application and it serves a large metropolitan area and the adjacent suburban areas which are divided into a plurality of zones designated 24, 35, 36 and 78. Each of the zones may include one or more exchanges. The telephone network schematically illustrated in Fig. 1 includes the FLorida 3 exchange in zone 35 which has been shown in greater detail in Fig. 2. It should be understood, however, that each of the exchanges in the various zones of the telephone system may be substantially identical to the FLorida 3 exchange illustrated in Fig. 2. Each of the exchanges in the various zones serve 10,000 subscriber lines, except the CHase exchange in zone 24. The last-mentioned exchange may be arranged to serve 10,000 subscriber lines, but it may be assumed that only a portion of the ultimate capacity of the exchange is equipped at present. Furthermore, certain of the subscriber directory numbers in the CHase exchange include six digits comprising two digits corresponding to the first two letters of the exchange name and a four-digit number corresponding to the terminal number terminating a subscriber line. Other subscriber directory numbers in the CHase exchange are seven-digit numbers comprising two digits corresponding to the first two letters of the exchange name, a third digit identifying the particular exchange in the zone, and a fourth digit number identifying the terminal number of the subscriber line in the called exchange. Consequently, the third digit of calls to the CHase exchange subscribers may be the third digit of the office code in the case of a seven-digit directory number, or it may be the thousands digit of the numerical portion of the directory number in the case of a six-digit directory number. Furthermore, this digit may be of the same numerical value for both six and seven-digit calls. All of the directory numbers of the subscriber lines terminating in all of the other exchanges of the network are seven-digit numbers, including a three-digit office code portion comprising two digits corresponding to the first two letters of the exchange name and a third digit corresponding to the number of the exchange in the zone, and comprising a four-digit numerical portion corresponding to the terminal number of the called subscriber line.

At this point it may be well to note that each of the subscriber dials or calling devices are arranged, in the conventional manner, with ten finger holes corresponding respectively to the digits 1 to 9 and 0, and that each of the digits have corresponding letters which may be dialed in accordance with the first two letters of any called exchange name. It should also be understood that if the office code of the called exchange includes three letters instead of the previously mentioned two letters and a digit, the called office digits will correspond to the first three letters of the called exchange name. The ten digits of the dial and the corresponding letters for each of the digits are as follows:

| Digits | Letters |
|---|---|
| 1 | |
| 2 | ABC |
| 3 | DEF |
| 4 | GHI |
| 5 | JKL |
| 6 | MNO |
| 7 | PRS |
| 8 | TUV |
| 9 | WXY |
| 0 | Z (Operator) |

*The apparatus incorporated in the Florida 3 exchange*

Preferably each exchange in the telephone system includes switching apparatus which is substantially identical to that provided in the FLorida 3 exchange. Referring now to the switching apparatus for the FLorida 3 exchange, as illustrated in Fig. 2, it will be noted that only certain of the subscriber line terminals have been illustrated. Three of the terminals respectively terminate the private subscriber lines TX3 and TR3, and the pay station line TP3. Five terminals commonly terminate the party subscriber line which serves the five substations TS1–3 to TS5–3, inclusive. The switching equipment included in this exchange includes a number of line circuits individually associated with the above-noted subscriber lines, the line circuits 405A, 405B, 405C and 405D being respectively associated with the above-named subscriber lines. It should also be noted that the private subscriber substation TX3 is rendered extended service facilities and is of the class 1 type. The private subscriber substation TR3 and the five-party line subscriber substations TS1–3 to TS5–3 are rendered free local service and are of the class 2 type. The pay station TP3 is denied automatic toll service and is of the class 3 type.

More particularly, the extended service subscriber substations of the class 1 type are rendered free automatic local, free automatic toll service to certain exchanges in adjacent zones, and automatic toll ticketing service to other exchanges in the various zones of the system. The private subscriber substations and the party subscriber substations of the class 2 type are rendered free automatic local service, and they are also rendered automatic toll ticketing service to all other subscriber substations terminating in the exchanges in all other zones of the system. Finally, the pay station substations of the class 3 type are rendered automatic local service, providing the necessary coin has been deposited in the pay station instrument, and they are rendered toll service to exchanges in the metropolitan area with the aid of the "0" operator. The individual line circuits for the subscriber substations are provided with strapping facilities for indicating the specific class of service to which the associated substation is entitled. The manner in which the different classes may be strapped at the line circuits individual to the associated subscriber lines, is described in detail in the last-mentioned Ostline application. The remaining switching apparatus provided in the FLorida 3 exchange has been described above in connection with the description of the various drawings constituting the present disclosure.

It should be noted that in the present telephone system code storage registering apparatus and code marking conductors are utilized for the purpose of registering various digits and for the purpose of transferring such registered digits from one unit of equipment to another. The code employed is generally referred to as a WXYZ code and is of the type wherein any digit from 1 to 9, inclusive, and 0 may be registered and transmitted by operating any one or any two of four WXYZ register relays, or by marking any one or any two of four WXYZ code marking conductors in accordance with the following code:

| Digit | Code |
|---|---|
| 1 | WX |
| 2 | WY |
| 3 | WZ |
| 4 | XY |
| 5 | XZ |
| 6 | YZ |
| 7 | W |
| 8 | X |
| 9 | Y |
| 0 | Z |

Before describing the operation of the switching apparatus in the FLorida 3 exchange it should be noted that each subscriber substation telephone instrument includes the usual handset, having a transmitter and a receiver, a ringer and a calling device or dial. The calling device provided at each of the private subscriber substations, at each pay station subscriber substation, and at each first party subscriber substation on a five-party line are of conventional construction and arrangement; while the calling device provided at each second, third, fourth and fifth party subscriber substations on a five-party line is of the construction and arrangement of that disclosed in the John E. Ostline Patent No. 2,410,520, granted November 5, 1946.

The calling devices respectively disclosed at the second party subscriber substation TS2–3, at the third party subscriber substation TS3–3, at the fourth party subscriber substation TS4–3, and at the fifth party subscriber substation TS5–3 are respectively provided with impulsing springs 490 to 493, inclusive, and they are respectively provided with cam springs 481 to 484, inclusive. In each of these calling devices the set of impulsing springs are operated, in accordance with the return movement of the associated finger wheel, to transmit a variable number of series switch controlling impulses in accordance with the finger hole selected on the pull of the finger wheel. Also, in each of these calling devices the cam springs are operated by the associated cam during the return movement of the finger wheel in order to transmit a fixed number of station identifying ground impulses.

Referring now to Fig. 3, it will be seen that the impulsing springs at the various subscriber substations are arranged to interrupt the circuit, including the two line conductors of the calling subscriber line, such as the conductors C402 and C403 as is graphically represented by the line 301, and that the station identifying cams at the party 2 to the party 5, inclusive, substations on a five-party line are arranged to apply ground potential to the line conductors as is graphically represented by the lines 303 to 306. The line 302 in Fig. 3 indicates that the individual line subscriber substations and the party 1 subscriber substations on party lines are not provided with cams and consequently do not transmit station identifying ground impulses. More specifically, the line 301 represents the normal action of the dial impulsing springs at a calling station, during the return movement thereof, to transmit switch controlling impulses over the conductors of the calling subscriber line in accordance with the value of the digit dialed. The line 303 represents the action of the cam 481 to control the associated contacts 485 (Fig. 5), during the return movement of the dial at the second party subscriber substation TS2–3, to transmit a single short ground impulse just prior to the transmission of the next to the last switch controlling impulse by the impulsing springs 490. The line 304 represents the action of the cam 482 and the associated contacts 486, during the return movement of the dial at the third party subscriber substation TS3–3, to transmit a first short ground impulse just prior to the transmission of the next to the last switch controlling impulse and to transmit a second short ground impulse between the transmission of the next to the last and the last switch controlling impulse by the impulsing springs 491. The line 305 represents the action of the cam 483 and the associated contacts 487 to transmit three short ground impulses during the return movement of the dial at the fourth party subscriber substation TS4–3. At this substation the first short ground impulse is transmitted just prior to the transmission of the next to the last switch controlling impulse, the second ground impulse is transmitted between the transmission of the next to the last and the last switch controlling impulse, and the third ground impulse is transmitted immediately after the transmission of the last switch controlling impulse by the impulsing springs 492. The line 306 represents the action of the cam 484 and the associated contacts 488, during the return movement of the dial at the fifth party subscriber substation TS5–3, to transmit two spaced-apart short ground impulses. It will be seen that the cam 484 closes the associated contacts 488 to transmit a first short ground impulse just prior to the transmission of the next to the last switch controlling impulse and that it transmits a second short ground impulse immediately after the transmission of the last switch controlling impulse by the impulsing springs 493.

From the foregoing it will be appreciated that during the return movement of the dial at each of the party subscriber substations on the five-party lines, the individual cam thereat will transmit an individual station identifying code signal indicating the position of the calling subscriber substation on the calling party line.

*Initiation of a call by a subscriber in the FLorida 3 exchange*

A description will now be given of the operation of the switching apparatus included in the FLorida 3 exchange, and for this purpose it will be assumed that a call is initiated by the subscriber at substation TS1–3, shown in Fig. 5.

When a calling subscriber removes his receiver the usual loop circuit, including the line conductors C402 and C403, is completed for operating the line circuit 405. In response to the completion of the above-mentioned loop circuit the line circuit 405 initiates the operation of the distributor 442 and it marks the terminals of the calling subscriber line in the bank contacts accessible to a group of line finders, including the line finder 440, having access to the calling subscriber line. For the purpose of this description it will be assumed that the rotary switch 441 selects the line finder 440 and that it completes an operating circuit for the start relay R450. The start relay R450, which corresponds to the relay R140 shown in Fig. 1 of the previously noted Bakker Patent No. 2,289,896, at its contacts 451, applies battery potential by way of the resistor 451′, the conductor C445, the contacts 514 and the lower winding of the relay R530, to ground. Consequently, the line R530 in the primary selector 500 now operates. In addition to the foregoing, the start relay R450 completes circuits (not shown) for controlling the line finder 440 to operate its wipers 434 to 437, inclusive, in a vertical direction and then in a rotary direction, in the well-known manner, to find and connect with the contacts in the associated contact bank terminating the calling line circuit 405. In this manner the start relay R450 in the line finder 440 simultaneously operates the line relay R530 in the primary selector and it initiates the hunting operation of the line finder 440.

In response to the operation of the line relay R530, an operating circuit is completed for the hold relay R540, and the latter relay in turn completes on obvious circuit for operating the transfer relay R550. The hold relay R540, at its contacts 541, also retains a holding ground potential on the conductor C446, extending to the line finder 440, and, at its contacts 546, completes a point in the test circuit for the director test relay R510. Under the control of the circuit completed by the contacts 546 of the hold relay R540, the magnet M451 of the director hunter 450 is self-interruptedly operated in order to advance the wipers 453 to 460, inclusive, step-by-step to search for an idle director. When an idle director is found the test relay R510 is operated, from ground at contacts 556, in series with the magnet M451, but due to the resistance of the relay R510 the magnet does not operate at this time. The test relay R510, at its contacts 511 and 513, now transfers the conductors C444 and C445 from the circuit including the windings of the line relay R530 to a circuit including the conductors C471 and C472 extending to the code switch 1100 portion of the director. Simultaneously, therewith, the relay R510 also connects the windings of the line relay R530 to the conductor C468 and C469 extending to the controller 600 portion of the director. Reference may be had to Figs. 4 and 5 of the Ostline application Serial No. 75,985, filed February 12, 1949, for a more detailed disclosure and description of the operations of the primary selector 500 and the director hunter 450.

Figure 7:
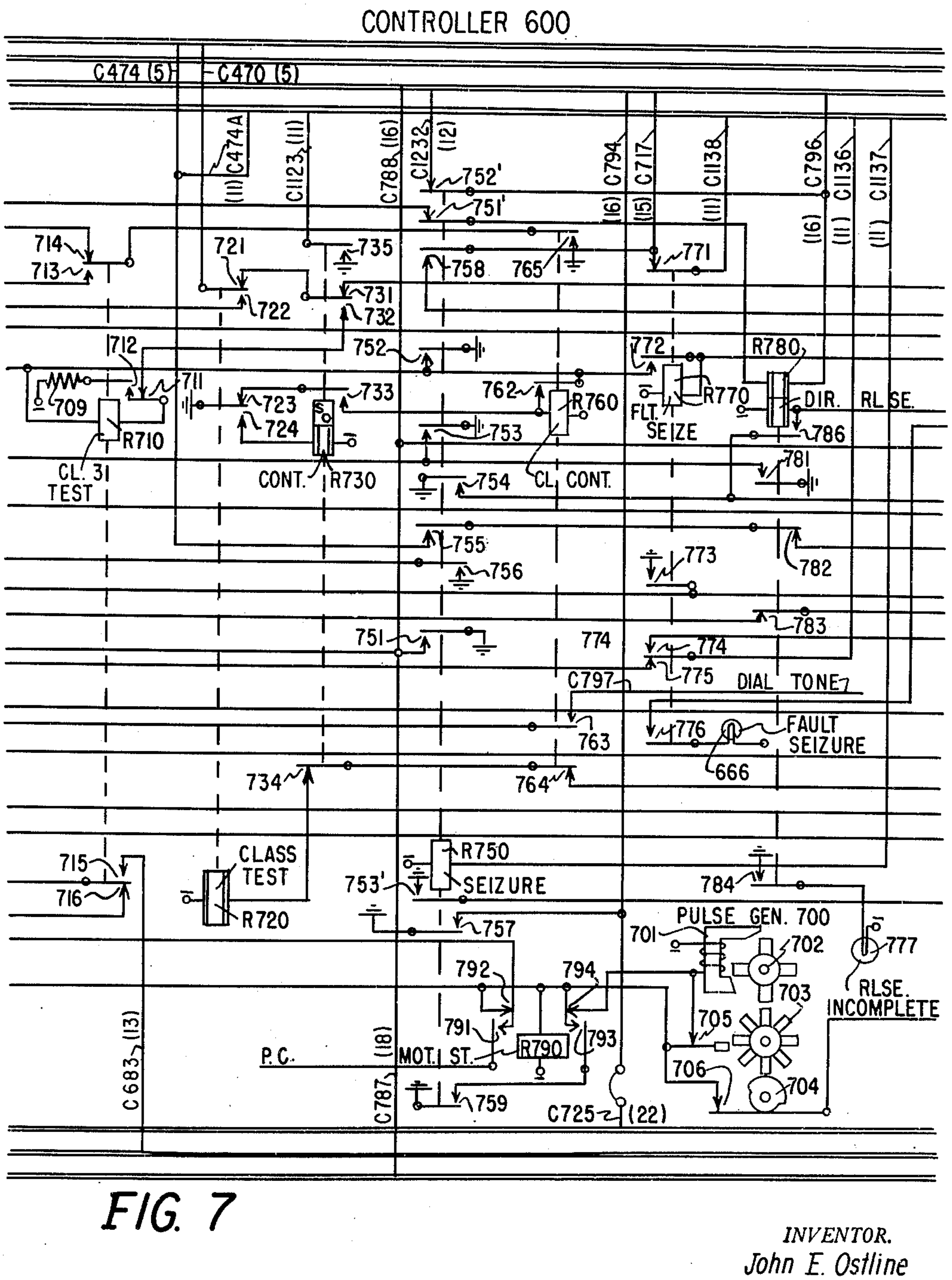

It will be appreciated that during the time that the director hunter 450 is searching for an idle director, the line finder 440 is also searching for the calling subscriber line. If it is assumed that the director is connected to the line finder 440 via the director hunter 450 and the primary selector 500, before the line finder finds the calling line, the battery potential applied via the contacts 451 to the conductor C445, will complete a circuit for operating the line test relay R1120 in the code switch 1100. This circuit may be traced from battery via resistor 451′, contacts 451, conductor C445, contacts 513, conductor C505, wiper 457, conductor C472 extending to Fig. 11, contacts 1113 and 1144, and the lower winding of the line test relay R1120, to ground. The relay R1120 now operates, and, at its contacts 1121, applies ground potential via the contacts 1117 and the resistor 1119 to the hold conductor C474A extending to Fig. 7. In Fig. 7 it will be seen that the conductor C474A is connected via conductor C474, wiper 459 of the director hunter 450, conductor C507, contacts 519, the winding of the relay R510, and the winding of the magnet M451, to battery. The last-mentioned circuit retains the director test relay R510 in its operating position under control of the director even though the calling line has not been found.

During the above-described preliminary operations of the code switch 1100 portion of the director, the line finder 440 has been searching for the calling subscriber line. When the line finder 440 finds the calling line it switches through, in a conventional manner, and closes the contacts 498 and 499. In addition to the foregoing, it dismisses the distributor 442 from the connection in order to render it available for other calls. At this time the start relay R450 restores to normal and removes the resistance battery potential from the conductor C445. This operation would normally cause the restoration of the line test relay R1120 in the code switch 1100, but due to the fact that the line finder has switched through the loop circuit, including the calling subscriber line, conductors C402 and C403, is now connected to the circuit including the lower winding of the line test relay R1120 and to a circuit including the lower winding of the line relay R1130. This loop circuit may be traced from the calling subscriber substation via the line conductors C402 and C403, line circuit 405, conductors C429 and C430, wipers 434 and 435, contacts 498 and 499, conductors C444 and C445, contacts 511 and 513, conductors C504 and C505, wipers 456 and 457, and the conductors C471 and C472 extending to the code switch 1100 in Fig. 11.

Figure 11:
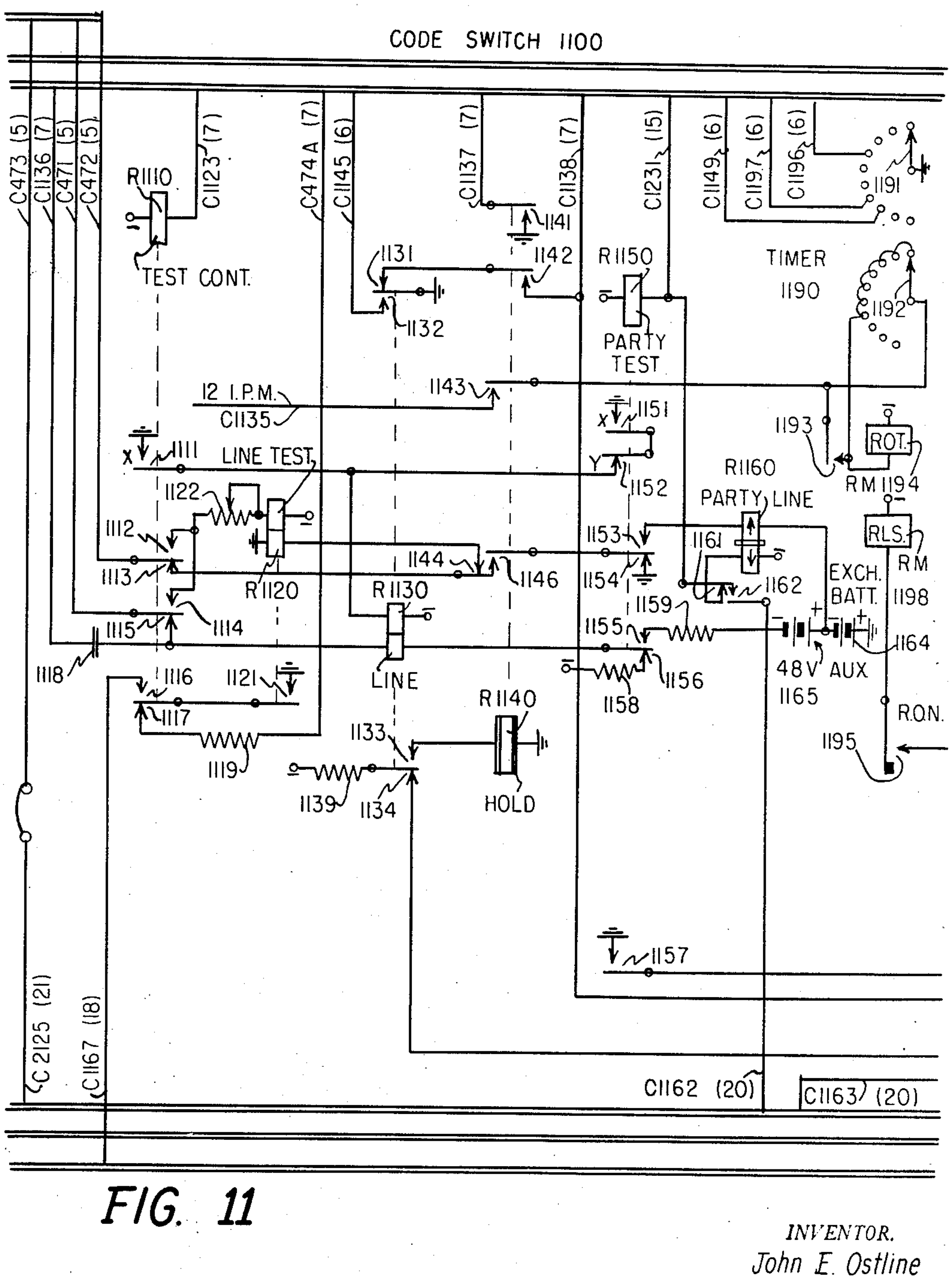
Figure 12:
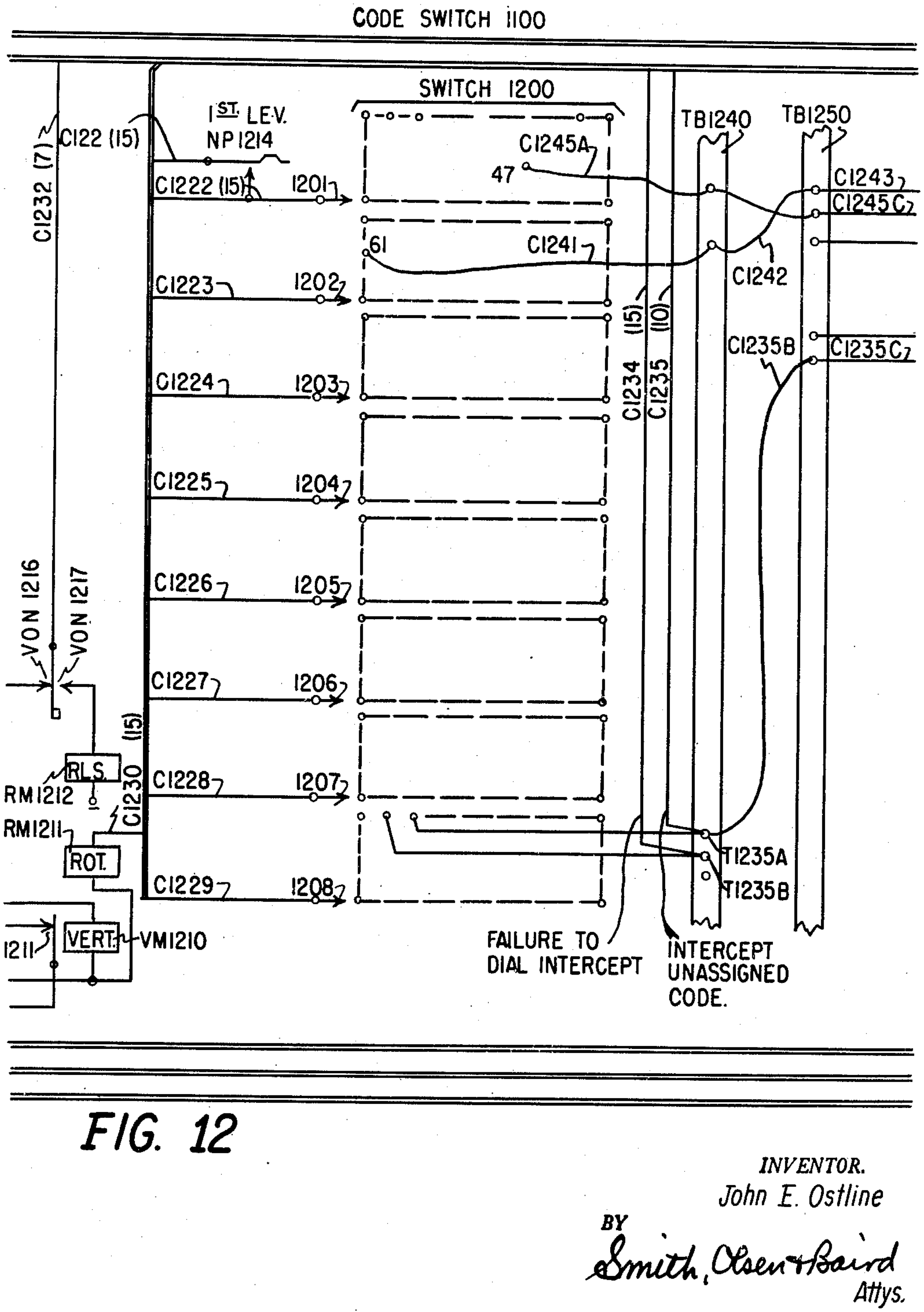

Referring now to the code switch 1100, shown in Figs. 11 and 12, it will be seen that the loop circuit including the conductor C471 is further extended via contacts 1115, the lower winding of the line relay R1130, contacts 1156, and the resistor 1158, to battery, and that the loop circuit including the conductor C472 is further extended via contacts 1113 and 1144, and the lower winding of the line test relay R1120, to ground.

In view of the foregoing description it will be appreciated that the line relay R1130 operates as soon as the line finder 440 switches through to connect with the calling subscriber line. As soon as the relay R1130 operates it completes, at its contacts 1133, an obvious circuit for operating the hold relay R1140 and, at its contacts 1132, it applies ground potential to the conductor C1145, extending to Fig. 6. The latter circuit is ineffective at the present time and is utilized to control the primary selector 500 only in the event that the first and second digits dialed by the calling subscriber correspond to the first two digits of the local called office code designation. As soon as the hold relay R1140 operates, it completes, at its contacts 1141, a circuit including the conductor C1137 extending to Fig. 7 for operating the seizure relay R750 in the controller 600. Also, at its contacts 1143, the hold relay R1140 connects conductor C1135 to wiper 1192 of the timer 1190. It should be noted that the conductor C1135 is connected to a time impulse interrupter (not shown) which transmits twelve ground impulses per minute over conductor C1135. The impulses transmitted over this conductor control the magnet RM1194 to step the wipers 1191 and 1192 twelve times per minute. The circuit operations which are controlled incident to the stepping of the wipers of the timer 1190 will be described hereinafter. Finally, the hold relay R1140, at its contacts 1144, disconnects the lower winding of the relay R1120 from the conductor C472, and, at its contacts 1146, it connects direct ground potential to the conductor C472 in order to retain the loop circuit through the lower winding of the line relay R1130. At this time, the relay R1120 restores to normal, and, at its contacts 1121, removes ground potential from the conductor C474A.

Referring now to the controller 600 portion of the director it will be seen that the seizure relay R750 operates as described above under control of the hold relay R1140 in the code switch 1100. As soon as the relay R750 operates, it applies ground potential, at its contacts 751, to the conductor C788 extending to the call register 1500 (Fig. 16), in order to ground the bank contacts accessible to the wiper 1664 of the sender switch 1600. This ground potential is also extended via the conductor C787 to the coder 1800 (Fig. 18) in order to provide a locking ground potential for various relays included therein. At its contacts 757, the relay R750 applies ground potential to the conductor C794 extending to Fig. 16 in order to apply a marking ground potential to the wiper 1515 of the receive sequence switch 1510 included in the call register 1500. The ground potential at the contacts 757 is also connected via the conductor C725 extending to Fig. 22 of the call recorder 2000, and then via the winding of the relay R2105 and the resistor 2107, to battery. The relay R2105 operates at this time and interrupts, at its contacts 2106, a point in the circuit for the relay R2120 in order to prevent the last-mentioned relay from operating until after the identity of a calling subscriber line has been completed and the relay R2105 is restored to normal. At its contacts 755, the relay R750 prepares a circuit for holding the director test relay R510 operated. This circuit may be traced from ground by way of the winding of the hold relay R820, contacts 782 and 755, conductor 474 connected to the contact engaged by the wiper 459 of the director hunter 450, and then via contacts 519, the winding of relay R510, contacts 452, and the winding of magnet M451, to battery. Attention is directed to the fact that the conductor C474A is grounded by the line test relay R1120 and will prevent operation of the hold relay R820 over the above-traced series circuit until the relay R1120 restores as noted above. As soon as the hold relay R820 operates, it locks the test relay R510 in its operated position in series with the magnet M451. At its contacts 753, the relay R750 completes a circuit for operating the director busy relay R610. The relay R610, upon operating, marks the director busy in the banks of the director hunters by applying ground potential to the conductor C475, and by operating the director busy relay R606. The details of the busy marking facilities included in the director are described in detail in the previously mentioned Ostline application. At its contacts 751' and 752', the relay R750 interrupts points in the releasing circuit, for the director, and at its contacts 753', it completes a circuit for energizing the right-hand winding of the delay sender relay R910 in order to bias this relay for subsequent operation.

As soon as the hold relay R820 operates, it completes, at its contacts 821, a circuit, including the contacts 764 and 734, for operating the class test relay R720. The relay R720, in turn, connects the conductor C470, at its contacts 722, to the class 2 test relay R670, and, at its contacts 724, it completes an obvious circuit for operating a slow-to-operate control relay R730.

It will be recalled that the calling subscriber line may be provided with any one of three different classes of service. The class of service of the particular calling subscriber line is indicated to the director by a marking placed upon the conductor C470. More specifically, the line circuit 405 associated with the calling subscriber line is provided with a terminal 428 which may be jumpered either to the grounded terminal 425 or to the resistance battery terminal 426, or the jumpers may be omitted so that no potential is applied to the terminal 428. A calling line is classified as a class 1 line arranged for extended service facilities by an absence of any potential on the terminal 428. A calling line is, on the other hand, classified as a class 2 line arranged for local service by jumpering the grounded terminal 425 to the terminal 428. Also, it is possible to classify the calling subscriber line as a class 3 line by jumpering the resistance battery terminal 426 to the terminal 428.

The potential, or absence of potential, on the terminal 428 of a calling line is extended via the conductor C432, wiper 437, line finder 440, conductor C447, contacts 551, 527 and 518 in the primary selector 500, conductor C503, wiper 455, and the conductor C470 extending to the controller 600 portion of the director.

With the foregoing three classes of service in mind it will be seen that when the contacts 722 are closed by the class test relay R720 a circuit is completed for first testing the conductor C470 to determine whether or not it is grounded to indicate a class 2 calling line. If ground potential is connected to the conductor C470 at this time, the class 2 test relay R670 will operate and lock itself in its operated position over a circuit, including the contacts 671 and 752. At its contacts 672, the relay R670 prepares a circuit for illuminating the class 2 lamp 677, and, at its contacts 674, it prepares a circuit for marking the class 2 conductor C682 extending to the translator 1300 (Fig. 13).

In the event that the calling line is not a class 2 line the relay R670 will not operate at the time it is connected to the conductor C470. Due to the slow-to-operate characteristics of the control relay R730 the class 2 test will be completed before it fully operates, but as soon as the relay R730 operates it interrupts, at its contacts 734, the previously traced circuit for the class test relay R720. Relay R720 slowly restores to normal, and at its contacts 721, it connects the conductor C470 via the contacts 732 and 711 to the winding of the class 3 test relay R710. If the calling line is of the class 3 type the conductor C470 will have resistance battery potential thereon in order to operate the class 3 test relay R710. At its contacts 712, the relay R710 will lock itself to ground at contacts 752. Also, at its contacts 713 and 715, the relay R710 prepares circuits for illuminating the class 3 lamp 678 and for marking the class 3 conductor C683 extending to the translator 1300 (Fig. 13). It should be noted that in the event that neither the class 2 test relay R670, nor the class 3 test relay R710 is operated, due to the fact that the class terminal 428 of the calling line has no potential applied thereto, circuits will be completed to indicate that the calling line is of the class 1 type.

As a further result of the restoration of the class test relay R720, and before the relay R730 restores to normal, a circuit is completed, via the contacts 723 and 733, for operating the class control relay R760. The latter relay upon operating, at its contacts 762, locks itself in its operated position from ground at contacts 752.

In the above description it was pointed out that the control relay R730 operated under control of the class test relay R720. As a result thereof, at its contacts 735, the relay R730 applies ground potential to the conductor C1123, extending to Fig. 11, in order to operate the test control relay R1110 in the code switch 1100. The relay R1110 is operated at this time in order to connect the upper winding of the line test relay R1120 to the previously traced circuit, including the conductors C471 and C472, and the conductors C402 and C403 of the calling subscriber line. When the relay R1110 operates it first closes its "X" contacts 1111 in order to complete an obvious hold circuit for the upper winding of the line relay R1130. This holding circuit will prevent the relay R1130 from momentarily restoring to normal when the circuit, including the lower winding thereof, is opened at the contacts 1115. As a further result of the operation of relay R1110, at its contacts 1113 and 1115, it disconnects the conductors C471 and C472 from the battery potential through the lower winding of the line relay R1130, and from the ground potential at the contacts 1154. At its contacts 1112 and 1114, the relay R1110 simultaneously connects the conductors C471 and C472 via the variable resistor 1122, and the upper winding of the line test relay R1120, to battery. In view of the foregoing description it will be understood that the calling subscriber line conductors C402 and C403 are temporarily disconnected from the circuit, including the lower winding of the line relay R1130 and simultaneously connected via the upper winding of the line test relay R1120, to battery. The relay R1120 is normally adjusted to operate in the event the subscriber line has a ground resistance thereon of less than 10,000 ohms. Consequently, if there is a direct ground potential or a low resistance ground leak on either the tip (+) conductor C403 or the ring (−) conductors C402 of the calling subscriber line, the relay R1120 will operate. If the relay R1120 is operated at this time it applies ground potential via the contacts 1121 and 1116 to the conductor C1167 extending to Fig. 18, in order to operate the grounded line relay R1810 in the coder 1800. This relay will lock itself in its operated position and thus register the fact that the calling subscriber line has a false ground potential thereon.

Shortly after the above-traced circuit is completed for operating the test control relay R1110, the slow-to-operate control relay R730 restores to normal and, at its contact 735, opens the circuit for the test control relay R1110. The relay R1110 now restores to normal in order to reconnect the conductors C471 and C472 to the previously traced circuits. The line relay R1130 is now held in its operated position over the previously traced loop circuit including the calling subscriber line. It will be appreciated, however, that if no ground potential is found on the calling subscriber line at the time the relay R1120 is concerned thereto, the relay will remain in its unoperated position and thus prevent the registration of a false ground condition in the coder 1800.

After the above-described class and grounded line tests have been made of the calling subscriber line, the class control relay R760 is operated as previously described. As soon as relay R760 operates it interrupts, at its contacts 764, a further point in the previously traced circuit for operating the relay R720 and, at its contacts 765, it completes a circuit for illuminating the selected one of the class identifying lamps 676 to 678, inclusive. More specifically, if neither the class 2 test relays R670, nor the class test relay R710 are operated, then the class 1 lamp 676 will be illuminated over a circuit including the contacts 673, 714 and 765. If the class 2 test relay R670 is operated, then the class 2 lamp 677 will be illuminated over a circuit including the contacts 672, 714 and 765. In the last-mentioned circuit, the ground potential at contacts 765 is also extended over a branch circuit including the conductor C708 extending to Fig. 20, in order to mark the class 2 indication in the bank of the wiper 1954 of the code send switch 1950 in the call recorder 2000. The last-mentioned marking is provided so that the call recorder 2000 will cause the registration of the class 2 indication or the class 1 indication on the record that is produced of the toll connection. If class 3 test relay R710 is operated, then a circuit will be completed for illuminating the class 3 lamp 678 over a circuit including the contacts 713 and 765. Finally, the relay R760, at its contacts 763, connects the dial tone signal applied to the dial tone conductor C797 via the contacts 624 and 725, conductor C1136 extending to Fig. 11, tone condenser 1118 and the contacts 1115, to the previously traced loop circuit, including the calling subscriber line. In this manner, the dial tone signal is transmitted to the calling subscriber to indicate that the digits of the called subscriber number may be dialed.

*Dialing the called number*

When the calling subscriber hears the dial tone signal he may dial the first two letters of the desired called exchange name, then the single digit identifying the number of the exchange in the called zone, and finally the four numerical digits designating the particular called subscriber substation in the called exchange. When the first digit is dialed by the calling subscriber, the line relay R1130 in the code switch 1100 will follow the impulses corresponding to the digit in the well-known manner and it will register this digit in the call register 1500. In response to the first interruption of the loop circuit, that is, the first impulse, the line relay R1130 will momentarily restore to normal and, at its contacts 1131, it will apply ground potential via the contacts 1142, the conductor C1138 extending to Fig. 7, and the contacts 771 and 758 in order to operate the digit relay R905. This ground pulse is also extended via the conductor C717 extending to Fig. 15, wiper 1514 of the receive sequence switch C1510, conductor C1551, and the winding of the magnet RM1521, to battery. The digit relay R905 operates and completes, at its contacts 906, an obvious circuit for operating the sequence control relay R830. Since the digit relay R905 is of the slow-to-release type it remains in its operated position during the time that the line relay R1130 is pulsing under control of the calling subscriber dial. Consequently, the digit relay R905 and the sequence control relay R830 are operated in response to the first impulse of each series of impulses transmitted by the calling subscriber and they remain in their operated positions until the last pulse of each series has been transmitted. During the interdigital pause between transmission of the successive digits of a number, the relays R905 and 830 will remain in their restored positions.

In view of the above-traced circuit for controlling the magnet RM1521 of the first called register 1520 it will be understood that the magnet RM1521 will operate upon each restoration of the line relay R1130 and that it will restore to normal upon each operation of the line relay R1130. It should be noted at this time that each series of impulses of each digit will be transmitted by the line relay R1130 to the wiper 1514 of the receive sequence switch 1510. Therefore, the impulses of the first digit will be transmitted over the conductor C1551 engaged by the wiper 1514 to the magnet RM1521 of the first code register 1520. The receive sequence switch 1510 is automatically controlled at the end of each digit to position the wiper 1514 successively into engagement with the conductors 1552 to 1557, inclusive, so that the impulses of each of the following digits dialed by the calling subscriber will be transmitted to the magnets RM1531 and RM1541 of the second and third code registers 1530 and 1540, and to corresponding magnets provided in the first, second, third and fourth numerical registers 1610, 1620, 1630 and 1640. In this manner the seven digits of a called number dialed by a calling subscriber will be registered respectively in the seven registers noted of the call register 1500. Each of the above-noted registers are arranged so that the associated wipers, such as the wipers 1523 to 1527, inclusive, of the first code register 1520, will be advanced step-by-step in a counterclockwise direction a number of steps corresponding to the number of impulses in the digit dialed.

At the end of the first digit the wipers 1524 and 1525 of the first code register 1520 will mark the code marking conductors WXYZ21 to register the first digit dialed. Also, the wiper 1526 will mark a conductor in its associated contact bank which determines whether or not the first digit dialed corresponds to the first digit of the local exchange terminating the calling subscriber. Finally, the wiper 1527 of the first code register 1520 will mark one of the conductors in its associated contact bank extending to the switch 1200 included in the code switch 1100, in order to select one of the eight wipers 1201 to 1208, inclusive.

At the conclusion of the first digit dialed by the calling subscriber the line relay R1130 will remain in its operated position during the interdigital pause and thus, at its contacts 1131, will remove ground potential from the conductor C1138 for a time interval which is sufficient to permit the slow-to-release digit relay R905 to restore to normal and interrupt, at its contacts 906, the previously described circuit for the sequence control relay R830.

Figure 15:
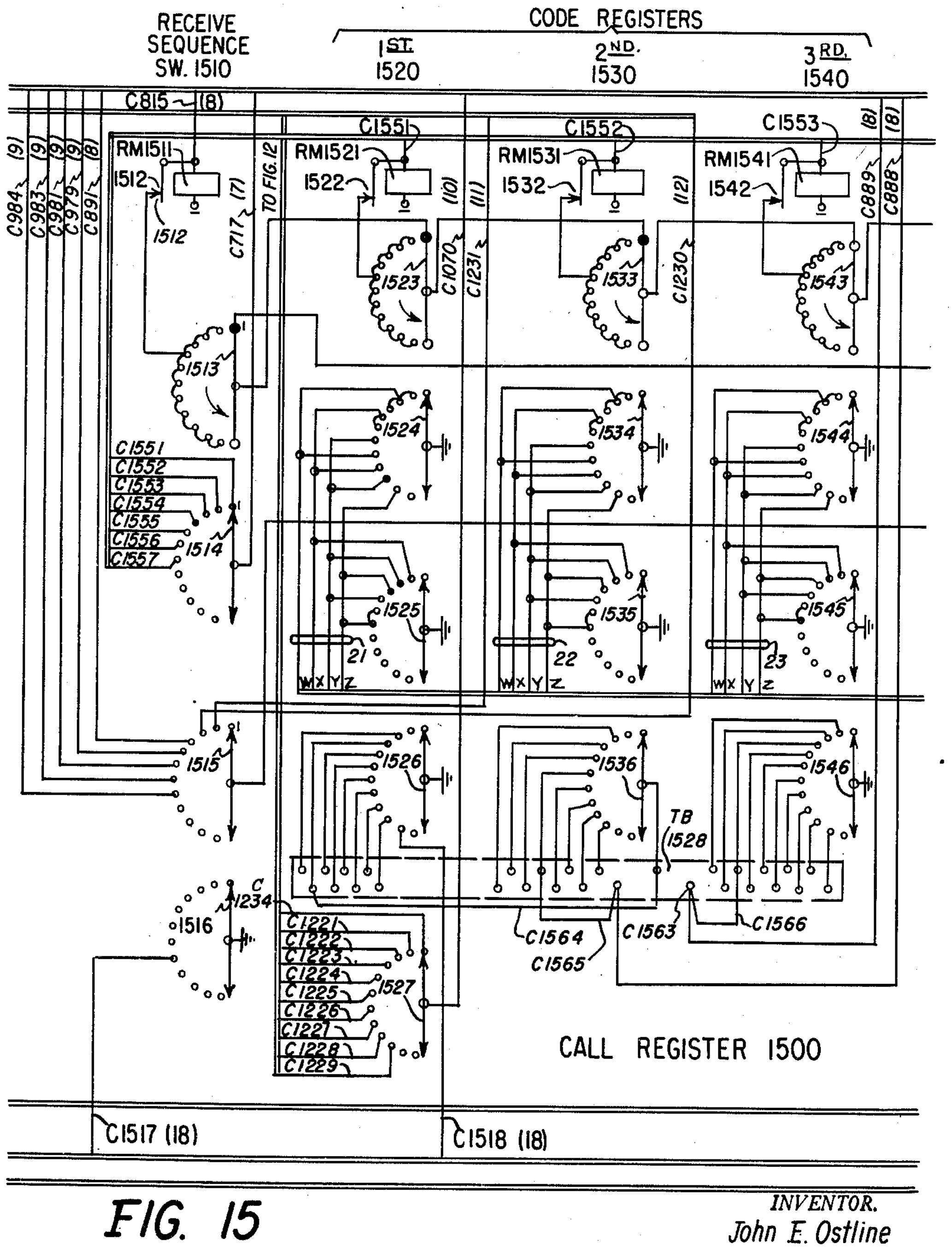

Before describing the operations which result from the restoration of the relay R830 it should be noted that when the relay initially operates, it completes a circuit by way of its contacts 831 and the conductor 815 extending to Fig. 15, for operating the magnet RM1511 of the receive sequence switch 1510. The operation of the magnet RM1511 prepares the switch 1510 to step its wipers 1513 to 1516, inclusive, one step in a counterclockwise direction as soon as the relay R830 restores to normal at the end of the digit. Consequently, when the relay R830 restores to normal at the end of the first digit it interrupts the circuit from magnet RM1511 which now restores to normal and advances its wipers into engagement with the second set of contacts in the associated contact banks. This operation transfers the previously traced impulsing circuit extending to the wiper 1514, from the conductor C1551 extending to the first code register 1520, to the conductor C1552 extending to the second code register 1530.

As a further result of the initial operation of the relay R830, at its contacts 835, it completes an obvious circuit for illuminating the station dial lamp 823 in order to indicate to the exchange attendant that the calling subscriber has started to dial. Finally, at its contacts 832, the relay R830 completes a circuit for operating the tone control relay R620. Upon operating the relay R620, at its contacts 622, locks itself in its operated position, independently of its initial operating circuit, to ground contacts 756. As a further result of the operation of relay R620, at its contacts 624, it interrupts a point in the previously traced circuit for transmitting the dial tone signal to the calling subscriber. Finally, at its contacts 621, the relay R620 disconnects the fifteen-second control conductor C1196 from the circuit for controlling the fault seizure relay R770. The last-mentioned circuit is provided so that the fault seizure relay R770 will be operated only in the event that the calling subscriber fails to dial any digits within fifteen seconds after the director has been connected to the calling subscriber line.

In the above description it was pointed out that the receive sequence switch 1510 advanced its wipers into engagement with the second set of contacts in the associated contact banks at the end of the dialing of the first digit in order to prepare the impulsing circuit for the magnet RM1531 of the second code register 1530. As a result of the advancement of the wiper 1515 into engagement with the second contact in its associated contact bank a circuit is immediately completed for operating the party test relay R1150 and for energizing the lower winding of the party line relay R1160 in the code switch 1100. This circuit may be traced from ground at contacts 757 of the operated seizure relay R750 and then via conductor C794 extending to Fig. 16, wiper 1515 and the engaged contact 2, conductor C1231 extending to Fig. 11, the winding of relay R1150, to battery, and, in multiple therewith, the contacts 1161 and the lower winding of relay R1160, to battery. The relay R1150 operates over the above-traced circuit and immediately closes its "X" contacts 1151 before the "Y" contacts 1152 are opened in order to provide a momentary hold circuit for the upper winding of the line relay. The "X" contacts 1151 are adjusted so that they are first to close upon the operation of the relay, and the "Y" contacts are adjusted so that they are last to open. At its contacts 1154 and 1156, the relay R1150 disconnects, respectively, ground and battery potential from the previously traced loop circuit including the calling subscriber line, and at its contacts 1153 and 1155 it connects the calling subscriber loop circuit to a circuit including in series the upper winding of the party relay R1160, the 48-volt auxiliary battery 1165, and the resistor 1159. The party line relay R1160 is connected to the calling subscriber loop circuit only after the dialing of the first digit, and it is disconnected therefrom after the second digit has been dialed. This party relay is of the type disclosed in the Pye Patent No. 1,673,884, granted June 19, 1928, and is arranged to respond to station identifying ground impulses transmitted by the special calling devices provided at the second to the fifth subscriber substations on party lines. As previously noted, each station is provided with special calling device of the type disclosed in the John E. Ostline Patent No. 2,410,520, granted November 5, 1946, which is provided with a cam, as schematically illustrated in Fig. 5, for transmitting ground pulses during the return movement of the dial as is graphically illustrated in Fig. 3.

If the calling line is assumed to be the first station on a calling party line, or an individual subscriber line, the calling device thereat will be of conventional construction, arranged only to interrupt the loop circuit in the usual manner, without transmitting any station identifying ground impulses. In the latter case, the line relay R1130 will respond in the manner previously described to the impulses of the second digit, and to register the digit in the second code register 1530.

*Dialing the second digit*

If the calling subscriber substation is provided with a conventional calling device the line relay R1130 will respond to the pulses of the second digit in substantially the same manner as has been described above even though the party line relay R1160 is included in the loop circuit of the relay R1130. The party line relay R1160, however, will not respond to the impulses transmitted from a conventional calling device of the type provided at an individual subscriber substation or at the first party substation on a party line due to the fact that the direction of the current flow in the lower winding opposes the direction of the current flow in the upper winding. Consequently, the impulses of the second digit control the line relay R1130, in the manner described above, to repeat the said impulses, at its contacts 1131, over the conductor C1138 to register the second digit in the second code register 1530. The impulses of the second digit will also be repeated, at the contacts 1134, to the vertical magnet VM1210 of the switch 1200, due to the fact that the party test relay R1150 is in its operated position during the dialing of the second digit. More specifically, the circuit for controlling the vertical magnet VM1210 may be traced from ground via the contacts 1157, the winding of the magnet VM1210, contacts 1134, and the resistor 1139, to battery. Therefore, each time the line relay R1130 restores to normal during the dialing of the second digit, the above-traced circuit is completed for operating the vertical magnet VM1210.

From the foregoing it will be understood that the impulses corresponding to the second digit, dialed by a calling subscriber, will be registered in the second code register 1530, and the wipers 1201 to 1208, inclusive, of the switch 1200 will be positioned in a vertical direction to a level in the associated contact banks corresponding to the value of the dialed digit.

If the calling station is provided with a special calling device, as previously noted, then the party line relay R1160 will respond to the ground impulses transmitted during the return movement of the dial, as is indicated in Fig. 3. The special calling device, when actuated in accordance with the second digit, will transmit a number of regular loop impulses for controlling the line relay R1130, and during transmission of the last two impulses of the digit the special dial will transmit one, two or three short ground impulses in order to identify respectively the second, third and fourth station on a party line, or two short ground impulses which are spaced apart by two loop impulses in order to identify the fifth station on the party line.

In order to describe the operations performed by the line relay R1130 and the party line relay R1160, when the second digit of the called number is dialed by the subscriber at substation TS2–3, it will be assumed that the second dialed digit is the digit 2 or greater. During the return movement of the dial, the line relay R1130 will restore and reoperate in response to each loop impulse, and just prior to the transmission of the next to the last impulse, the cam 481 at the substation will momentarily close the contacts 485 in order to simultaneously apply ground potential to the line conductors C402 and C403. The ground potential applied to conductor C402 is extended via the previously traced circuit to the conductor C471 extending to Fig. 11, contacts 1115, lower winding of relay R1130, contacts 1155, resistor 1159, and the negative terminal of the 48-volt auxiliary battery 1165. The ground potential applied to the conductor C403 is extended via the previously traced circuit to the conductor C472 extending to Fig. 11, contacts 1113, 1146 and 1153, the upper winding of the party relay R1160 and the negative terminal of the 48-volt exchange battery. The line relay R1130 is held in its operated position and the current flow through the upper winding of the party relay R1160 is in the same direction as the current flow in the lower winding in order to operate the last-mentioned relay. As soon as the relay R1160 operates it disconnects the grounded conductor C1231 from the circuit for its lower winding, at its contacts 1161, and, at its contacts 1162, it connects the grounded conductor C1231 to the conductor C1162 extending to Fig. 20. When the cam 481 opens the contacts 485 the ground potential is removed from the conductors C402 and C403 in order to restore the previously traced loop circuit including in series the lower winding of the line relay R1130, the upper winding of the party relay R1160 and the auxiliary battery 1165. The current flow through the upper winding of the relay R1160 is thus reversed and the relay restores to normal.

Figure 20:
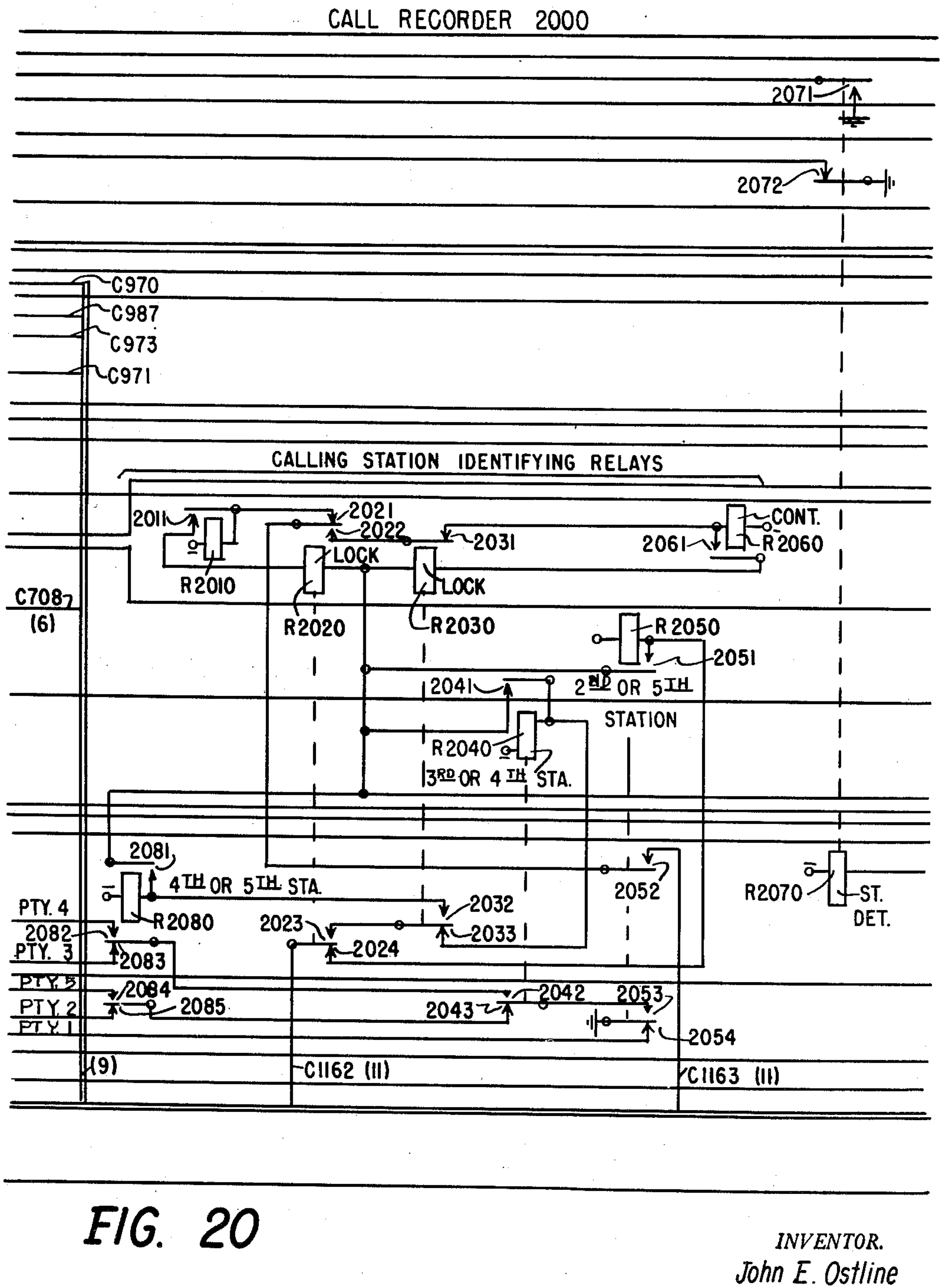
Figure 21:
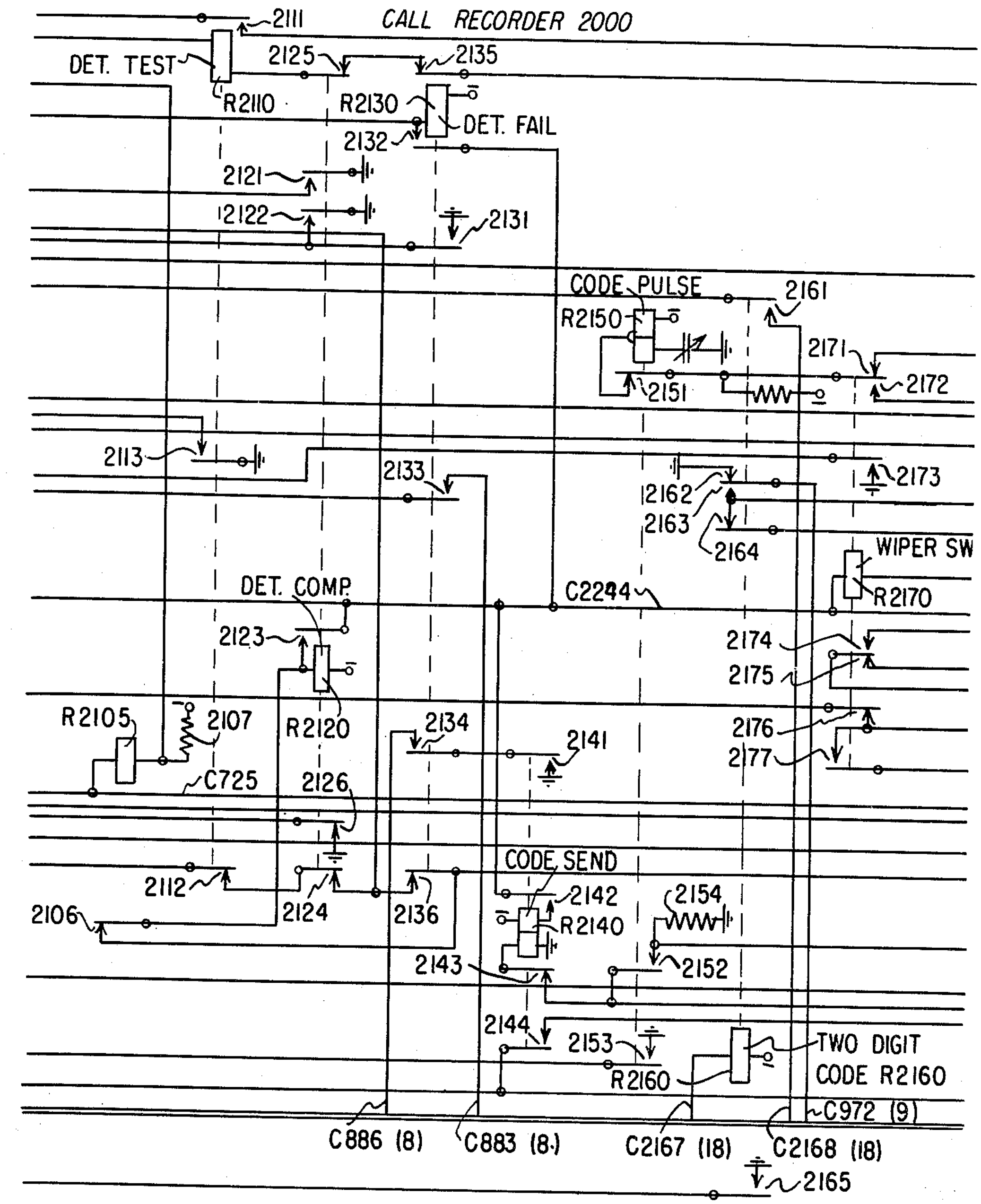

In Fig. 20, the ground potential applied to the conductor C1162 is further extended via the contacts 2024 and the winding of the station identifying relay R2050, to battery. The relay R2050 operates over this circuit, and, at its contacts 2051, immediately locks itself in its operated position to the grounded conductor C725. As a further result of the operation of the relay R2050, at its contacts 2052, it prepares a point in the circuit for operating the control relay R2010.

Immediately after the ground pulse is transmitted by the cam 481, the impulsing springs 490 are momentarily interrupted in order to transmit the next to the last loop impulse, and finally the last loop impulse of the second digit. In the code switch line 1100 the line relay R1130 will momentarily restore in response to the next to the last loop impulse and repeat the same, at its contacts 1131, over the conductor C1138, in the manner previously described. The next to the last loop impulse is also repeated via contacts 1211, conductor C1163 extending to Fig. 20, contacts 2052 and 2021, and the winding of the control relay R2010, to battery. The control relay R2010 now operates, and at the end of the next to the last loop impulse, locks itself via the contacts 2011, and the winding of the lock relay R2020 to the grounded conductor C725. The relay R2020, upon operating, disconnects the conductor C1163 from the circuit of relay R2010, at its contacts 2021, and, at its contacts 2022, it connects the conductor C1163 to the circuit for the control relay R2060. As a further result of the operation of the relay R2020, at its contacts 2024, it disconnects the conductor C1162 from the relay R2050, and, at its contacts 2023, it connects the conductor C1162 via the contacts 2033 to the winding of the relay R2040.

The last loop impulse will now be transmitted by the calling device at the substation TS2–3 and it will cause the line relay R1130 to repeat another impulse over the conductors C1138 and C1163. The last impulse transmitted over the conductor C1163 will now operate the control relay R2060, and at the end of the impulse the relay R2060 will lock itself in its operated position over a circuit including the contacts 2061, the winding of the lock relay R2030, and the grounded conductor C725. The lock relay R2030 now operates, and, at its contacts 2031, interrupts the initial circuit for the relay R2060. At its contacts 2032, the relay R2030 prepares a point in the circuit for controlling the relay R2080 over the conductor C1162.

Since only one station identifying ground impulse has been transmitted by the cam 481 during the return movement of the calling device at the substation TS2–3, the second station identifying relay R2050 has been operated, followed by the sequential operation of the relays R2010, R2020, R2060 and R2030. The operated condition of the relay R2050 registers the fact that the calling station on the five-party line is the second station. In its operated position, the relay R2050 applies ground potential via the contacts 2053, 2043 and 2085, to the party 2 marking conductor extending to the detector 1900.

If the second digit of a called number is dialed by the subscriber at the third substation TS3–3 on the party line, two short ground impulses will be transmitted during the return movement of the calling device. As is seen in Fig. 3, the first short ground impulse will be transmitted over the conductors C402 and C403 in order to operate the second station identifying relay R2050 in the same manner as has been described above in connection with the transmission of the single ground identifying impulse from the calling device at the second party subscriber substation TS2–3. Shortly thereafter the next to the last loop impulse will be transmitted by the impulsing springs 491, and the relays R2010 and R2020 will operate as previously noted to prepare, at the contacts 2023, the circuit for operating the third station relay R2040. Shortly after the transmission of the next to the last impulse, the second short ground impulse will be transmitted by the cam 482 in order to operate the party line relay R1160 a second time. At its contacts 1162, the relay R1160 will transmit a second short ground impulse over the conductor C1162, and then via the contacts 2023 and 2033, and the winding of the relay R2040, to battery. At the end of the second short ground impulse, the relay R2040 will lock itself in its operated position via its contacts 2041 to the grounded conductor C725. The last loop impulse is now transmitted by the calling device in order to control the sequential operation of the relays R2060 and R2030, in the manner previously described. At this instant, both the second and the third station identifying relays R2050 and R2040 are locked in their operated positions in order to register the fact that the calling station on the five-party line is the third station. Consequently, ground potential will now be connected via the contacts 2053, 2042 and 2083 to the party 3 marking conductor extending to the detector 1900.

If the second digit is dialed by the fourth subscriber substation TS4–3, three short ground impulses will be transmitted by the cam 483 during the return movement of the calling device. The operations of the line relay R1130 and the party line relay R1160 will be exactly the same as has been described above, except that the party line relay R1160 will be operated a third time after the transmission of the last loop impulse of the second dialed digit. Consequently, the station identifying relays R2050, R2010, R2020, R2040, R2060 and R2030 will be operated in the order named, in the manner described above. Thereafter the relay R1160 will transmit the third ground impulse over the conductor C1162, and then via the contacts 2023 and 2032, and the winding of the fourth station identifying relay R2080, to battery. At the end of the third ground impulse the relay R2080 will lock itself in its operated position over a circuit including the contacts 2081 and the grounded conductor C725. At this time the fourth station on the five-party line will be registered as the calling station and ground potential will be extended via the contacts 2053, 2042 and 2082, to the party 4 marking conductor extending to the detector 1900.

If the second digit is dialed from the fifth station TS5–3 on the five-party line, the cam 484 will transmit two spaced-apart short ground impulses during the return movement of the calling device. Attention is directed to the fact that the cam 482 at the third party station TS3–3 also transmits two ground impulses, but the two short ground impulses transmitted by the cam 484 are spaced-apart sufficiently to permit the transmission therebetween of both the next to the last and the last loop impulses of the second digit. The line relay R1130 and the party line relay R1160 in the code switch 1100 will operate in the same manner as has been described above, but the time interval between the transmission of the two station identifying ground impulses spaced-apart sufficiently so that the station identifying relays R2050 and R2080 will be operated to register the fifth station. In other words, the first short ground impulse transmitted over the conductor C1162 by the party line relay R1160 will operate and lock the relay R2050 in the manner previously described. Thereafter, the line relay R1130 will respond to two successive loop impulses and it will repeat the impulses over the conductor C1163 in order to sequentially operate the relays R2010, R2020, R2060 and R2030 in the order named. Thereafter, the second ground impulse will be transmitted over the conductor C1162 by the party line relay R1160 in order to operate the fifth station identifying relay R2080. As a result of the foregoing, a ground potential is applied via the contacts 2053, 2043 and 2084 to the party 5 marking conductor extending to the detector 1900.

After the impulses constituting the second digit of the called subscriber number have been transmitted by the calling subscriber, the line relay R1130 and the hold relay R1140 remain in their operated positions and cause the digit relay R905 and the sequence control relay R830 to restore to their normal positions. The sequence relay R830, upon restoring, at its contacts 831, removes ground potential from the conductor C815 extending to Fig. 15, thereby interrupting the circuit for the magnet RM1511. The magnet RM1511 now restores to normal and advances its wipers 1513 to 1516, inclusive, from engagement with the contacts 2 into engagement with the contacts 3 in the associated contact bank. As soon as the wiper 1515 disengages the second contact it interrupts the previously traced circuit, including the conductor C1231, for operating the party test relay R1150. The relay R1150 now restores to normal and disconnects the party line relay R1160 from the loop circuit including the line relay R1130 and it reestablishes the original loop circuit including the contacts 1154 and 1156 for the relay R1130. As a result of the advancement of the wiper 1515 into engagement with the third contact in its associated bank a circuit is completed via the conductor C1230 extending to Fig. 12 for controlling the rotary magnet RM1211 of the switch 1200. Finally, the wiper 1514 of the switch 1510 connects the impulsing conductor C717 to the conductor C1553 so that the magnet RM1541 of the third code register 1540 will be controlled by the third digit dialed by the calling subscriber.

*Dialing of the third digit*

In response to the dialing of the third digit by the calling subscriber, the line relay R1130 will respond to the impulses transmitted over the loop circuit and, at its contacts 1131, it will repeat the impulses over the conductor C1138 in the manner previously described in order to control the digit relay R905 and the magnet RM1541 of the third code register 1540. In response to the operation of the digit relay R905, the sequence relay R830 will be reoperated and, at its contacts 831, the latter relay will complete the previously traced circuit including the conductor C815 for operating the magnet RM1511 of the receive sequence switch 1510. In addition to the foregoing, the line relay R1130, at its contacts 1134, repeats the impulses of the digit to the winding of the rotary magnet RM1211. In this connection it will be recalled that the wiper 1515 of the receive sequence switch 1510, in engagement with its third contact, applies ground potential via the conductor C1230, the winding of the rotary magnet RM1211, and the resistor 1139, to battery, each time the line relay R1130 closes its contacts 1134. From the foregoing it will be understood that the line relay R1130 controls the magnet RM1541 to register the third dialed digit in the third code register 1540, and that it also controls the rotary magnet RM1211 in order to rotate the wipers 1201 to 1208, inclusive, over the selected level of the associated bank contacts to a particular contact therein corresponding to the value of the third digit. At the end of the dialing of the third digit the line relay R1130 will again be retained in its operated position during the interdigital pause and thereby cause the digit relay 905 and the sequence relay R830 to restore to normal. As previously noted, the sequence relay R830, upon restoring, will again interrupt the circuit for the magnet RM1511, thereby to advance the wipers 1513 to 1516, inclusive, an additional step in the counterclockwise direction.

It may be well to briefly outline the operations that have taken place as a result of the dialing of the first three digits of the called number. The first code register 1520 operates to register the first digit and, incident to the registration, the wiper 1527 thereof selects one of the wipers 1201 to 1208, inclusive, of the switch 1200. In response to the second dialed digit, the second code register 1530 operates to register the same, and simultaneously therewith the vertical magnet VM1210 operates to step the wipers 1201 to 1208, inclusive, of the switch 1200 in a vertical direction a number of steps corresponding to the value of the second digit. During the dialing of the second digit, the identity of a particular calling subscriber substation on a party line is also registered by the relays illustrated in Fig. 20 of the call recorder 2000. The third digit dialed by the calling subscriber is registered in the third code register 1540, and simultaneously therewith the rotary magnet RM1211 rotates the wipers 1201 to 1208, inclusive, of the switch 1200 a number of steps corresponding to the value of the third dialed digit.

Various operations may result from the registration of the first three digits dialed by the calling subscriber, including a possible disconnection of the director from the calling subscriber line. However, before continuing with the description of the operations which may result from the registration of the first three digits in the abovementioned code registers 1520, 1530 and 1540, it is convenient at the present time to mention the fact that the last four digits of a called number will be registered respectively, in the same manner as has been described hereinbefore, in the first, second, third and fourth numerical registers 1610, 1620, 1630 and 1640. The manner in which the digits registered in the various registers are utilized in controlling the setting up of a telephone connection to the called subscriber substation will be described hereinafter.

*Registration of a local call in the call register 1500*

For the purpose of describing a local call, it will be assumed that the calling subscriber in the present telephone connection is a subscriber located in the FLorida 3 exchange, and that the digits dialed by the calling subscriber correspond to the directory number of another subscriber in the FLorida 3 exchange. Consequently, the first three digits dialed by the calling subscriber will correspond to the letters FL of the exchange name, and the digit 3 identifying the third exchange in zone 35.

When the calling device is actuated in accordance with the letter F, three impulses corresponding to the digit 3 will be transmitted to the line relay R1130 and registered in the first code register 1520 in the manner previously explained. Therefore, the wipers 1523 to 1527, inclusive, will be in engagement with the contacts 3 in the associated contact banks. The wiper 1524, applies ground potential to the W21 code marking conductor, and the wiper 1525 applies ground potential to the Z21 code marking conductor. Consequently, the WXYZ21 code marking conductors will be marked in code form in accordance with the digit 3. In this manner the digit 3 registered in the first code register 1520 will be marked in the bank contacts accessible to the wipers 1655 to 1658, inclusive, of the send sequence switch 1650. Furthermore, the wiper 1526 will apply ground potential via the terminal 3 on the terminal block TB1528 and the conductor C1564 to the wiper 1536 of the second code register 1530. Finally, the wiper 1527 in engagement with the contact 3 of the associated contact bank connects the conductor C1070 to the conductor C1223 extending to the wiper 1202 of the switch 1200.

The calling subscriber now dials the second letter L of the called exchange name and thereby transmits five impulses corresponding to the digit 5 to the second code register 1530. Consequently, the wipers 1533 to 1536, inclusive, will be positioned into engagement with the contacts 5 in the associated contact banks. The wipers 1534 and 1535 will respectively apply ground potential to the X22 and Y22 code marking conductors in order to mark the same in accordance with the digit 5. Finally, the wiper 1536 in engagement with the contact 5 connects ground potential via the conductor C1565 to the conductor C888 extending to Fig. 8, contacts 833 and 813, and the winding of the first and second digit local relay R840, to battery. The relay R840 now operates and locks itself in its operated position over a circuit including the contacts 813, 845 and 754. In view of the above description it should be understood that by means of the strapping on the terminal block TB1528, it is possible to arrange the jumpering on the left-hand section and the middle section of the terminal block to complete the above-traced circuit for the relay R840 in accordance with any first and second digit. In the present description it is assumed that the letters FL (corresponding to the digits 35) operate the relay R840 at the end of the second digit.

Figure 6:
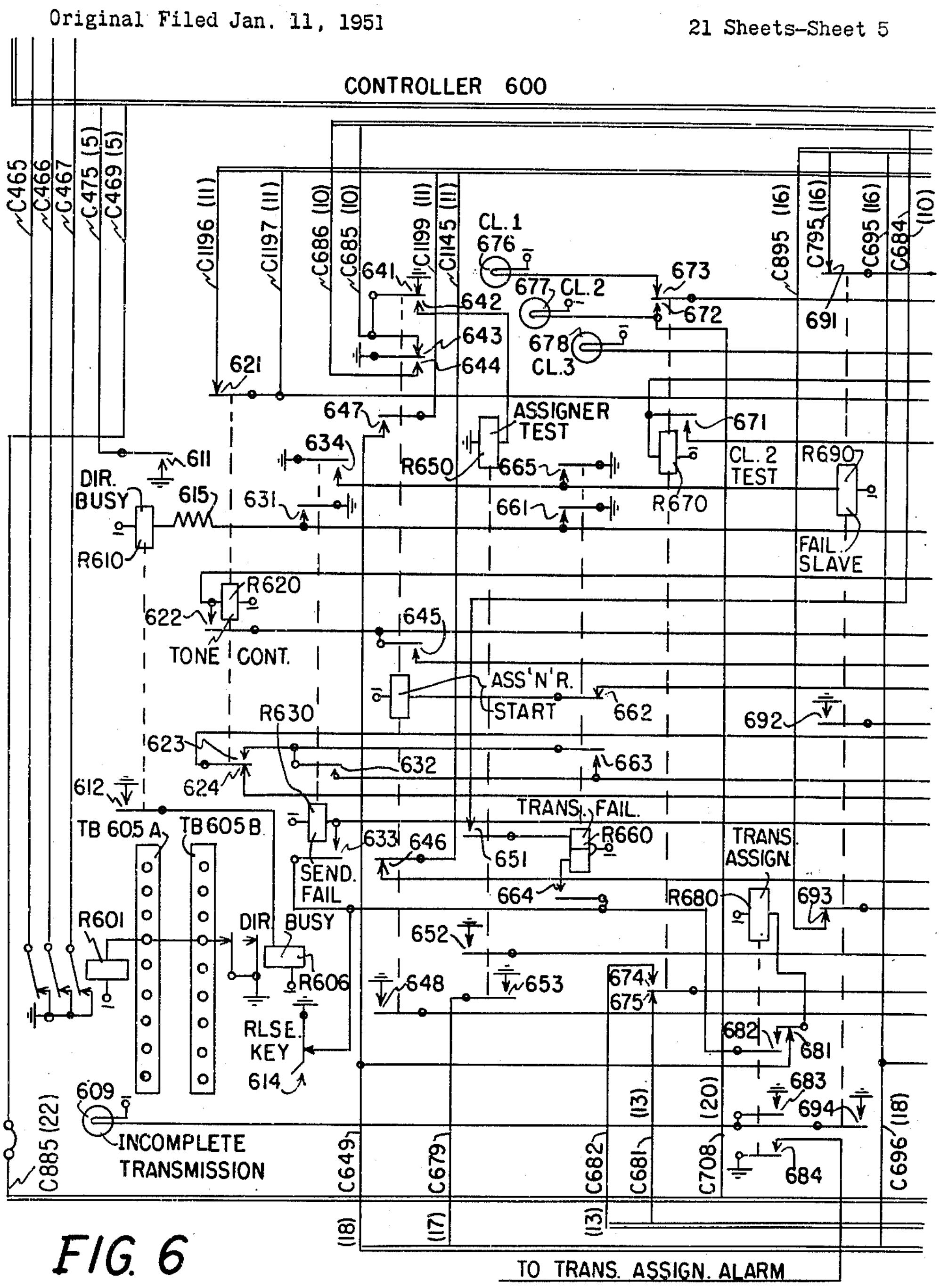

In response to the operation of the relay R840, at its contacts 844, it completes a circuit for operating the line relay R530 in the primary selector 500 which may be traced from ground at the contacts 1132 of the operated line relay R1130 in the code switch 1100, conductor C1145 extending to Fig. 6, contacts 646 and 844, resistor 843, conductor C468 extending to Fig. 5, wiper 453, conductor C501, contacts 512 and 521, and the winding of the line relay R530, to battery. The line relay R530 now operates, and, at its contacts 531, it completes various circuits in the primary selector 500 to prepare the selector to respond to the third digit dialed by the calling subscriber to the line relay R1130 of the code switch 1100.

Also, the relay R840 applies ground potential via the contacts 851, 841, 731 and 721, conductor C470 extending to Fig. 5, wiper 455, and conductors 503, the contacts 518 in order to place the transfer relay R550 under control of the controller 600 portion of the connected director. Finally, at its contacts 842 and 846, the relay R840 prepares points in the circuit for controlling the third digit local relay R850. The last-mentioned circuit is effective to operate the relay R850 only in the event that the third digit dialed by the calling subscriber corresponds to the third digit identifying the local calling exchange code.

From the foregoing explanation it will be seen that when the calling subscriber dials the first two digits of a local number the first and second code registers 1520 and 1530 will function to cause the primary selector 500 to be seized and conditioned to respond to the third digit. In other words, the primary selector 500 is now prepared to respond to the third digit dialed by the calling subscriber and registered in the third code register 1540.

In the present example it will be assumed that the third digit dialed by the calling subscriber is the digit 3 and that it controls the line relay R1130 so that the impulses of the digit are repeated, in the manner previously described, to the magnet RM1541 of the third code register and to the rotary magnet RM1211 of the switch 1200. The wipers 1543 to 1546, inclusive, of the third code register 1540 will be advanced into engagement with the third set of contacts in the associated contact banks. The wipers 1544 and 1545, respectively, apply ground potential to the W23 and Z23 code marking conductors in order to mark the WXYZ23 code marking conductors in accordance with the registered digit 3. The wiper 1546 applies ground potential to the terminal of the terminal block TB1528 connected to the jumper C1566 and then via the terminal 1563, conductor C889 extending to Fig. 8, contacts 842 and 846, and the winding of the third digit local relay R850, to battery. The last-mentioned circuit for operating the relay R850 is completed in response to the registration of the digit 3, in the third code register 1540. However, during the time that the line relay R1130 is transmitting impulses over the conductor C1138 to control the register 1540, at its contacts 1132, it also repeats the impulses over the previously traced circuit, including the conductor C1145, to the upper winding of the line relay R530 in the primary selector 500. Consequently, the relay R530 controls the primary selector 500 in the manner described in detail in the Ostline application Serial No. 75,985, filed February 12, 1949, to raise the wipers 563 to 565, inclusive, three steps in a vertical direction to a position opposite the third level of the associated bank contacts.

At the end of the dialing of the third digit 3, the line relay R1130 remains in its operated position over the previously traced loop circuit and it maintains a holding circuit, at its contacts 1132, for the line relay R530 in the primary selector 500. Also, at the end of the dialing of the third digit 3, the above-traced circuit including the wiper 1546 is completed for operating the third digit local relay R850. At this time line relay R1130 removes the ground potential from the conductor C1138 in order to cause the restoration of the digit relay R905 and the sequence relay R830, thereby to cause the receive sequence switch 1510 to advance its wipers an additional step into engagement with the fourth contacts in the associated contact banks. This operation is of no consequence in the present example inasmuch as the first three digits dialed by the calling subscriber indicate that the call is to be completed to a subscriber in the originating local exchange area and, therefore, the director will be released from the connection.

Referring now to the third digit local relay R850, it will be seen that, at its contacts 851, it removes ground potential from the conductor C470, thereby to control the primary selector in the manner described in the above-mentioned Ostline application to rotate its wipers 563 to 565 over the selected third level to search for an idle local selector, such as the selector 315 illustrated in Fig. 2. Also, at its contacts 853, the relay R850 completes a circuit for illuminating the sending lamp 883 in order to indicate that the controller 600 portion of the director is in a sending condition. Finally, at its contacts 852, the relay R850 interrupts a point in the incomplete circuit for controlling the assigner start relay R640 in order to prevent the last-mentioned relay from being operated to associate the translator 1300 with the calling director.

When the sequence control relay R830 restores to normal, at the end of the dialing of the third digit, as described above, it completes, at its contacts 834, a circuit for energizing the lower winding of the director release relay R780 from the grounded conductor C889.

*Release of the director on a local call*

When the director relay R780 is operated over the circuit including its lower winding, in response to the dialing of the three digits of a local subscriber called office code, it locks itself via its contacts 786 to ground at contacts 754 of the operated seizure relay R750. As a further result of the operation of the relay R780, at its contacts 781, it completes a multiple holding circuit for retaining the director busy relay R610 operated; at its contacts 784, it completes an obvious circuit for illuminating the release lamp 777 to indicate that the director has started to release; and, at its contacts 782, it interrupts a point in the previously traced circuit for the holding relay R820 and the director test relay R510. As a result of the latter operation, the relay R510 restores to normal, and, at its contacts 511 to 519, inclusive, it disconnects the conductors C501 to C507, inclusive, from the associated director, and it connects the conductors C444 to C446, inclusive, to the wipers 563 to 565, which have been connected to an idle local selector, such as the selector 315. In other words, when a calling subscriber registers the three code digits identifying the originating local exchange, the director controls the primary selector 500 to seize an idle selector 315 and the director is released from the connection so that the subsequent digits of the numerical portion of the local called subscriber directory number may now be dialed by the calling subscriber directly to the switches included in the local exchange, in a conventional manner.

As soon as the conductors C501 to C507, inclusive, are disconnected from the director, the line relay R1130 in the code switch 1100 restores to normal. This relay, at its contacts 1133, interrupts the circuit for the relay R1140 and the latter relay, at its contacts 1141, interrupts the circuit including the conductor C1137 in order to restore the seizure relay R750 to normal.

Figure 16:
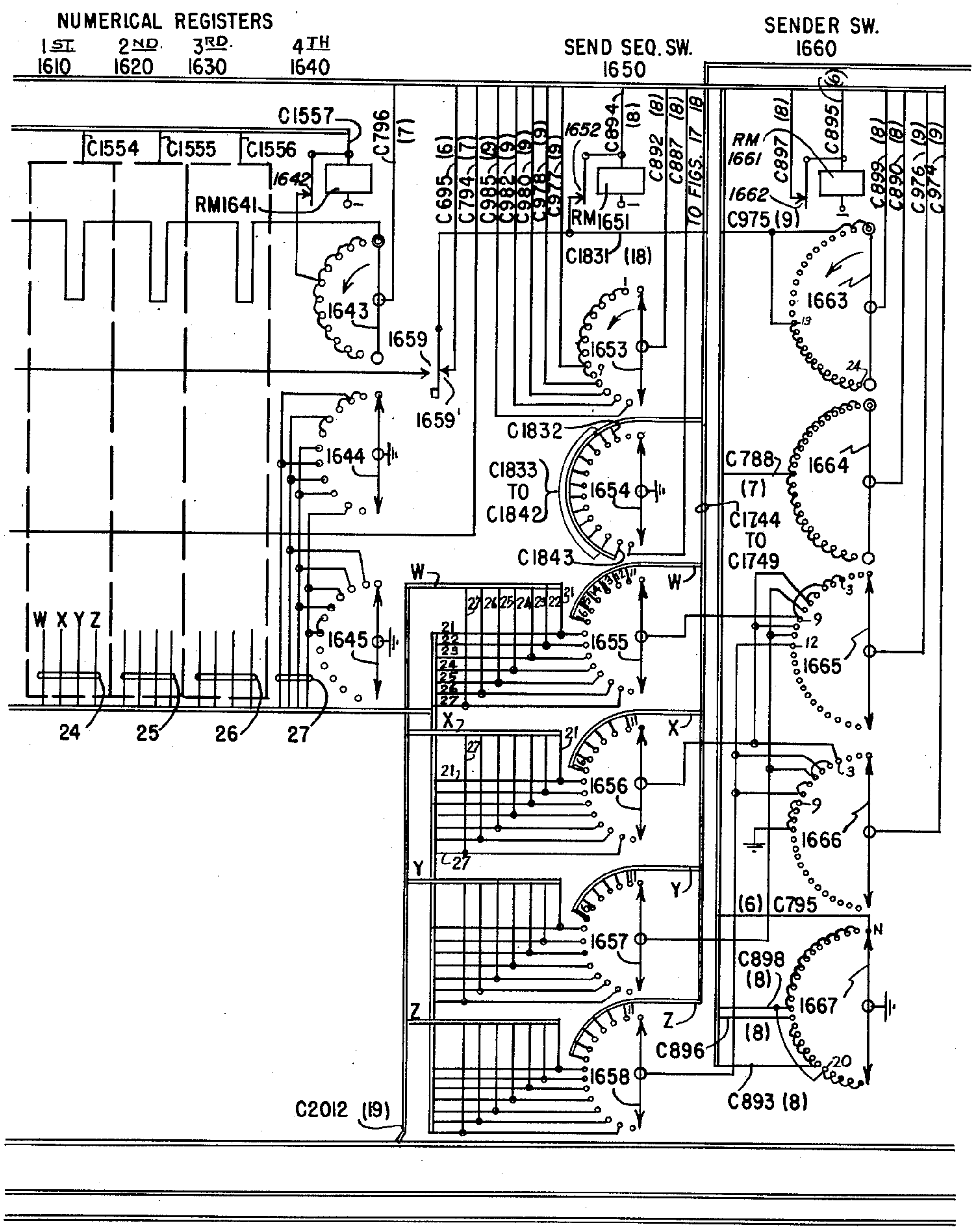

Incident to the restoration of the relay R750, at its contacts 751′, it completes a circuit including the conductors C795 and C796 for energizing the upper winding of the director release relay R780. Referring to the call register 1500, it will be seen that the conductor C795 is grounded at the home contact position of the wiper 1667 on the sender switch 1660. Therefore, the ground potential on the conductor C795 is forwarded via the contacts 691 and 751′, the upper winding of the director release relay R780 to the conductor C796 extending to Fig. 16, and also to the conductor C1232 extending to Fig. 12. Referring now to Fig. 16, it will be seen that the ground potential applied to the conductor C796 is further extended to the wiper 1643 of the fourth numerical register 1640. Although the numerical registers 1610 to 1640, inclusive, have not been operated on the present local call, it will be assumed for the purpose of describing the release of the director that the registers 1610 to 1640 have been operated to register the last four digits dialed by the calling subscriber. Therefore, the ground potential applied to the wiper 1643 will first be extended via the associated bank contacts and the interrupter contacts 1642 and the winding of the rotary magnet RM1641, to battery. The magnet RM1641 will be self-interruptedly operated over this circuit and will advance its associated wipers step by step in a counterclockwise direction until the wiper 1643 engages its home contact position. When this occurs the ground potential on the conductor C796 will be further extended to a wiper, similar to the wiper 1643, on the third numerical register 1630, in order to cause the associated rotary magnet to step its wipers to the home contact position. Each of the rotary magnets of the registers shown in Figs. 15 and 16 are sequentially operated, in the reverse order, to restore their wipers to their normal home positions in the manner explained above in describing the restoration of the fourth numerical register 1640. Therefore, when the last of the registers, that is the first code register 1520, is restored to normal, the ground potential on the conductor C796 is then forwarded via the wiper 1513 to the winding of the magnet RM1511 on the receive sequence switch 1510. This magnet also restores its wipers to the normal first contact position in order to again forward the releasing ground potential on the conductor C796 to the send sequence switch off-normal contacts 1659. Since the send sequence switch 1650 is not operated on a local call, the off-normal contacts remain in the position illustrated in the drawings, and no circuit will be completed to restore the send sequence switch 1650 to normal. However, if it is assumed that the send sequence switch is in an off-normal position, then the ground potential at the contacts 1659 will be extended via the interrupter contacts 1652 and the winding of the magnet RM1651, to battery. This magnet will be self-interruptedly operated to restore its wipers to the normal home contact positions in the same manner as has been described above. However, when the wipers reach the home contact position, the off-normal contacts 1659 and 1659′ will assume the position illustrated in the drawings.

During the time that the various magnets of the switches illustrated in Figs. 15 and 16 are restoring to normal, as described above, simultaneously therewith the ground potential applied to the conductor C1232 extending to Fig. 12, completes a circuit, including the vertical off-normal contacts VON1217, for operating the release magnet RM1212 of the switch 1200. This release magnet, upon operating, will cause the switch 1200 to restore its wipers 1201 to 1208, inclusive, to their normal resting positions, at which time the vertical off-normal contacts VON1217 are opened in order to interrupt the circuit for the magnet RM1212, and the vertical off-normal contacts VON1216 are closed in order to transfer the release circuit to the release magnet RM1198 of the timer 1190. As soon as the magnet RM1198 operates it will cause its wipers 1191 and 1192 to restore to normal in a clockwise direction to the position illustrated in the drawings and, in response to the restoration, the rotary off-normal contacts RON1195 will be opened in order to interrupt the circuit for the magnet RM1198.

As a further result of the restoration of the seizure relay R750, at its contacts 751, 752, 753, 754, 756, 757, 759 and 753′, it removes the holding ground potential from various operated relays in the director in order to cause all such relays to restore to normal. When all of the rotary switches shown in Figs. 15 and 16, the vertical and rotary switch 1200 and the minor switch of the timer 1190 have been restored to normal in the manner described above, the multiple circuit, including the upper winding of the director release relay R780, will be interrupted in order to restore the last-mentioned relay to normal. Consequently, the relay R780 now interrupts, at its contacts 781, the circuit for the director busy relay R610 which also restores to normal in order to render the associated director available for additional calls.

From the foregoing description of a local call it will be understood that the director functions to absorb the first two digits dialed by the calling subscriber and to repeat the third dialed digit to the primary selector 500 before it is disconnected from the calling line. It will be appreciated, however, that if the director is released from the calling line, and the calling line is connected through the operated primary selector 500, it is immaterial how many digits are thereafter dialed by the calling subscriber to operate the switching apparatus in the local exchange since they will be operated on a straightforward step-by-step basis. Normally, the local subscriber directory numbers will be seven digits, but any larger or smaller number of digits may be dialed, after a three digit local called office code, without regard to the operation of the director.

*Calls to exchanges outside the originating exchange area*

In order to describe the operation of the telephone system to establish connections under control of the director it will be assumed that the calling subscriber has initiated a call, has seized the director, and has registered the number of the called subscriber directory number therein. For this purpose it will be assumed that the desired called subscriber is a subscriber in the EMpire 1 exchange whose directory number is EMpire 1–1234. In response to the dialing of the digits corresponding to the called office code EM 1, the code digits 361 are registered respectively in the first, second and third code registers 1520, 1530 and 1540, in the manner previously described. Also the numerical portion of the called subscriber directory number, that is the digits 1234, are registered respectively in the first, second, third and fourth numerical registers 1610, 1620, 1630 and 1640. The above-noted registers will also mark the WXYZ21 to WXYZ27, inclusive, code marking conductors in accordance with the different digits registered in the respective registers, in the manner previously explained.

As previously noted, the wiper 1527 of the first code register 1520 will be connected to the conductor C1223 in order to select the wiper 1202 of the switch 1200. During the registration of the second and third digits in the second and third code registers 1530 and 1540, the vertical and rotary magnet VM1210 and RM1211 will be respectively controlled in accordance with the digits 6 and 1, to position the wipers on switch 1200 into engagement with the contacts 61 of the associated contact banks.

At the end of the dialing of the third digit the digit relay R905 and the sequence relay R830 restore to normal, as previously noted, and cause the magnet RM1511 of the receive sequence switch 1510 to advance its wipers into engagement with the fourth set of contacts in the associated contact banks. The principal operation performed at this time is to connect the impulsing conductor C717 to the conductor C1554 extending to the first numerical register 1610, and also to complete a circuit for associating the translator 1300 with the particular calling director. As soon as the wiper 1515 engages the contact 4, the ground potential of the contacts 757 of the operated relay R750 is connected via the conductor C794 extending to Fig. 16, wiper 1515, conductor C891 extending to Fig. 8, contacts 852, 811, 783 and 662, and the winding of the assigner start relay R640, to battery. The relay R640 now operates in order to cause the translator assigner 1000 (Fig. 10) to find the particular calling director being utilized in the present call and to associate the common translator 1300 (Figs. 13 and 14) with the said director.

Before proceeding with the description of the operation to assign the translator to the particular calling director it should be noted that the originating exchange is provided with a plurality of directors, each comprising a plurality of individual units, as previously noted, and that the originating exchange is also provided with a single common translator 1300. This translator is called into use by any calling director when it becomes necessary to translate the three code digits dialed by a calling subscriber into one or more routing digits which may be of the same value and the same number as the three code digits, or which may be of different values and different numbers of digits than the three code digits dialed by the calling subscriber. The translator 1300 is provided with a plurality of individual translator relays, each of which is permanently wired in accordance with the routing digits and other control information required to govern the operation of the director to set up a connection between the originating exchange and the particular called exchange over a predetermined route. The route, as determined by the individual translator relay may include a direct trunk route to a particular called exchange, or it may include a trunk route to the called exchange through an intermediate tandem exchange, and in certain cases the individual translator relays will route a call over an alternate trunk route to the desired called exchange, in the event all of the direct routes are busy at the time that the particular translator relay is to be selected.

When the assigner start relay R640 operates after the dialing of the third digit, it completes a locking circuit for itself which may be traced from ground at the contact 756 of the operated relay R750, contacts 645, 811, 783 and 622, and the winding of the relay R640, to battery. It may be well to mention at this time that the assigner start relay R640 can not be operated to call for the common translator 1300 if the third digit local relay R850 is operated in the manner previously described. In other words, the fact that the called office code digits do not correspond to the three code digits indicative of the local calling exchange prevents operation of both the relays R840 and R850.

As a further result of the operation of the relay R640, at its contacts 646, it interrupts a point in the previously traced circuit including the conductor C1145, thereby to prevent any impulses from being repeated to the primary selector 500 over the conductor C468. At its contacts 641 and 643, the relay R640 removes the direct ground potential from hold conductor C685 extending to the bank contact accessible to the wiper 1002 of the translator assigner 1000 (Fig. 10), thereby to remove the busy marking ground potential and indicate that the calling director requires the use of the common translator 1300. At its contacts 642, the relay R640 connects the assigner test relay R640 to the conductor C685 and, at its contacts 644, it applies ground potential to the start conductor C686 extending to Fig. 10, thereby to complete a circuit for initiating the operation of the translator assigner 1000 to associate its wipers 1001 to 1003, inclusive, with the conductors C684, C685 and C1070, respectively. Other directors accessible to the wipers of the translator assigner 1000 have ground potential applied to the conductors corresponding to the conductor C685 to mark such directors busy to the translator assigner. Finally, at its contacts 648, the relay R640 completes a circuit for controlling the pulse generator 700 and the motor start relay R790 in parallel. The circuit for controlling the pulse generator 700 may be traced from ground via the contacts 648 and 792, and via a first branch circuit, including the contacts 794 and the winding 701 of the pulse generator 700, to battery, and via a second branch circuit, including the vibrating contacts 705, and the winding 701, to battery. The last-mentioned branch circuits are provided to start the pulse generator 700 regardless of whether the contacts 705 are closed or opened. A third branch circuit is also completed for operating the motor start relay R790, which relay, upon operating, now interrupts the first branch circuit including the contact 794, and it locks itself in its operated position over a circuit including its contacts 793, and the contacts 759 of the operated seizure relay R750. In addition to the foregoing, a fourth branch circuit is completed via the contacts 792 and the conductor C695 extending to Fig. 16, for controlling the magnet RM1561 of the send sequence switch 1650. In Fig. 16 it will be seen that the ground potential applied to the conductor C695 is extended via the off-normal contacts 1659′ and the interrupter contact 1652 in the winding of the magnet RM1651, to battery. The magnet now operates and restores, under control the contacts 1652, and advances its wipers 1653 to 1658, inclusive, one step in a counterclockwise direction into engagement with the first contacts in the associated contact banks. At this instant the off-normal contacts 1659′ are opened in order to interrupt the preliminary stepping circuit for the magnet RM1651.

As a further result of the operation of the motor start relay R790, at its contacts 792, it interrupts the initial circuit, including ground potential at contact 648, and, at its contacts 791, it connects the ground potential at contacts 648 to the PC conductor in order to operate a peg count meter (not shown). At this time the ground potential at contacts 759 is connected via the contacts 793 and 705 to the winding 701 of the pulse generator 700. The generator 700 now operates to interrupt its contacts 706 at approximately ten pulses per second. In this connection it should be noted that the ground at contacts 759 is also connected via the contacts 706 and the winding of the pulse relay R880, to battery. Therefore, each time the contacts 706 are opened, under control of the pulse generator cam 704, the relay R880 restores. Consequently, the relay R880 pulses at the rate of ten pulses per second.

The pulse generator 700 is of the type disclosed in the Ostline Patent No. 2,492,435, granted December 27, 1949. It should be understood that the armature 702, the serrated permanent magnet 703, and the cam 704 are secured to a common shaft, and that armature 702 is rotated in the magnetic field created by the field structure including the winding 701. The right end of the armature spring for the contacts 705 is provided with a permanent magnet and constitutes a pendulum having a natural frequency of vibration that is determined by the mass of the magnet and the mass and stiffness of the armature itself. Thus the pulse generator 700 constitutes an electric motor which is started over the previously traced circuits regardless of the position in which the armature 702 was stopped at the termination of its previous operation. The control circuit for the pulse generator is connected and arranged by means of the circuits including the contacts of the motor start relay R790 so that it will always be restarted regardless of its previous stopped position. The principal function of the pulse generator 700 is to transmit pulses, at its contacts 706, at the rate of ten pulses per second in order to control the pulsing rate of the pulse relay R880.

*Operation of the translator assigner 1000 and the translator 1300*

At the outset it should be noted that the translator assigner 1000 (Fig. 10), and the translator 1300 (Figs. 13 and 14), are schematically illustrated, and that they are the same as those disclosed in Figs. 10, 13 and 14 of the Ostline application Serial No. 75,985, filed February 12, 1949, now Patent No. 2,678,353 granted May 11, 1954. The application of ground potential to the start conductor C686 controls the translator assigner 1000 to rotate its wipers 1001 to 1003, inclusive, to find the calling director which is marked by the resistance ground potential applied to the conductor C685 through the winding of the assigner test relay R650. When this director is found, the stepping of the wipers 1001 to 1003 is terminated and a circuit is completed over the conductor C685 for operating the assigner test relay R650 in the controller 600 portion of the director. The latter relay, at its contacts 651, connects resistance battery potential by way of the upper winding of the translator failure relay R660 to the conductor C684 extending to Fig. 10 in order to operate a director hold relay therein (not shown). However, due to the resistance of the last-mentioned relay, the translation failure relay R660 does not operate at this time. The translator assigner 1000 now applies ground potential to the conductor C1071 and to the conductor C1070 extending to Fig. 15 in order to seize the translator 1300.

Referring now to the assigner test relay R650 (Fig. 6) it will be seen that, at its contacts 652, it applies ground potential to the class 1 conductor C681, to the class 2 conductor C682, or to the class 3 conductor C683, depending upon the operated and restored conditions of the class 2 test relay R670, and the class 3 test relay R710. Consequently, a circuit will be completed over a particular one of the above noted class conductors in order to operate a corresponding class relay (not shown) in the translator 1300. The operation of the selected class relay thereat will connect any one of the marking conductors, such as the conductor C1243, C1245C, and C1235C, to any one of a plurality of the translator relays of the translator 1300, via a translator relay conductor, such as the conductor C1392. As a further result of the operation of the assigner test relay R650, at its contacts 653, it applies ground potential to the conductor C679 extending to Fig. 17, in order to complete an operating circuit for the connect relay R1710. The connect relay R1710 is provided to connect the various register relays and control relays in the coder 1800 portion of the director to the thirty-four common conductors extending to Fig. 14, so that the selected translator relay in the translator 1300 will selectively control the operation of the register relays in the coder 1800 in accordance with the translation of the particular called office code digits registered in the director.

The manner in which the particular translator relay in the translator 1300 is operated will now be described. As previously noted, at the time the translator assigner 1000 associates its wiper 1003 with the contacts terminating the conductor C1070, it applies ground potential thereto. In Fig. 15, the grounded conductor C1070 is connected via the wiper 1527 and the conductor C1223, to the wiper 1202 of the switch 1200. It will be recalled that the wipers of this switch are all positioned into engagement with the contacts 61, in the associated contact banks. Consequently, the ground potential applied to the wiper 1202 is further extended by way of the conductor C1241 to the terminal block TB1240 and jumpered to the terminal TB1250 by means of the jumper C1242. The last-mentioned terminal block terminates a plurality of conductors extending to the translator 1300, and depending upon the operated class relay thereat the conductors are further extended to the individual translator relays (not shown) in Fig. 14. Thus the ground potential applied to the jumper C1242 may be further extended via the conductor C1243 and contacts on an operated class relay (not shown) in order to operate a particular translator relay. The operated translator relay will in turn mark the WXYZ11 to WXYZ17, inclusive, code marking conductors (Figs. 17 and 18) in accordance with the information permanently wired in the selected translator relay, and it will also control various other operations over the conductors TA, TB, TC, TD, AB toll, and Y18 in the coder 1800.

Figure 17:
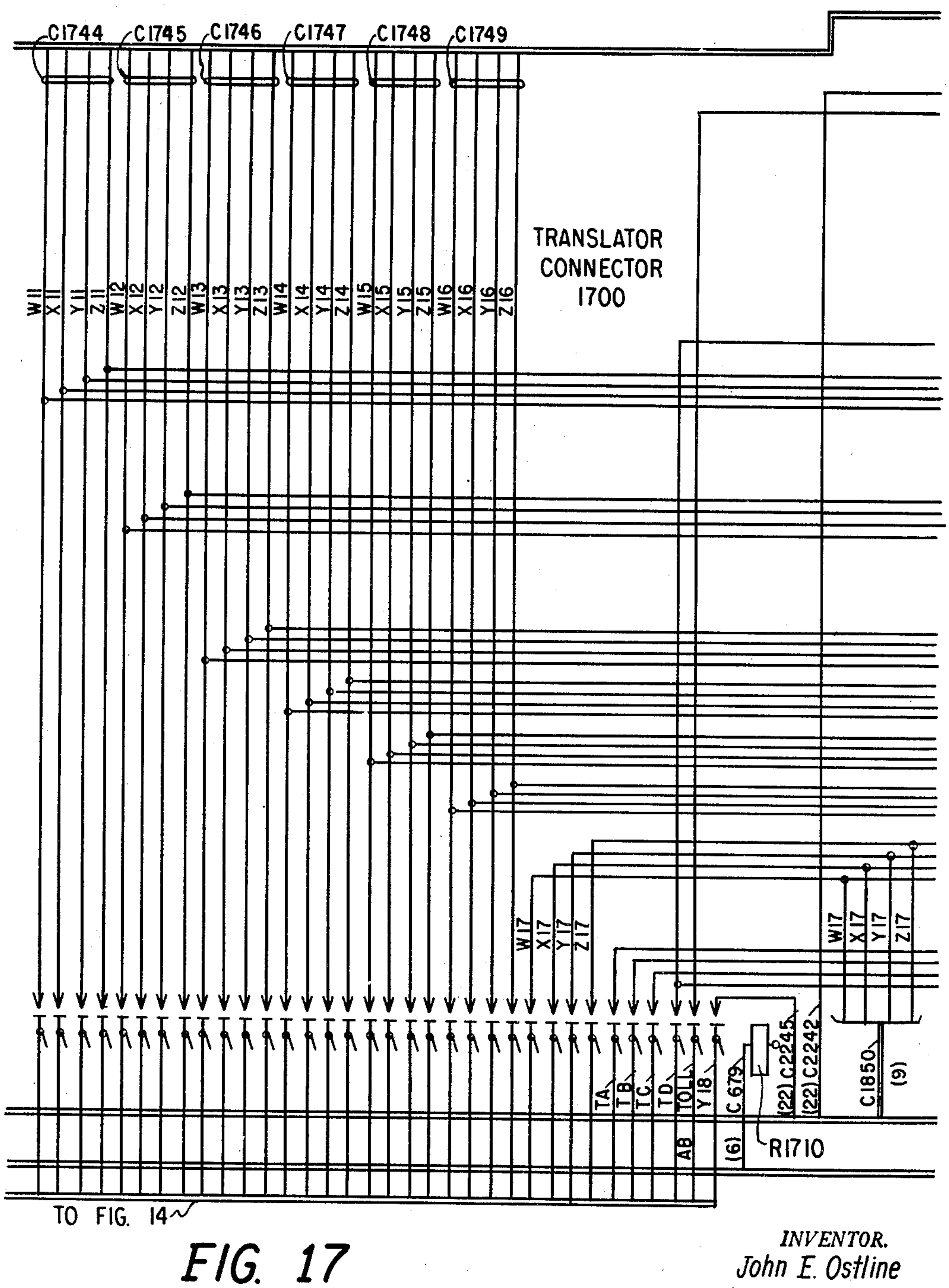
Figure 18:
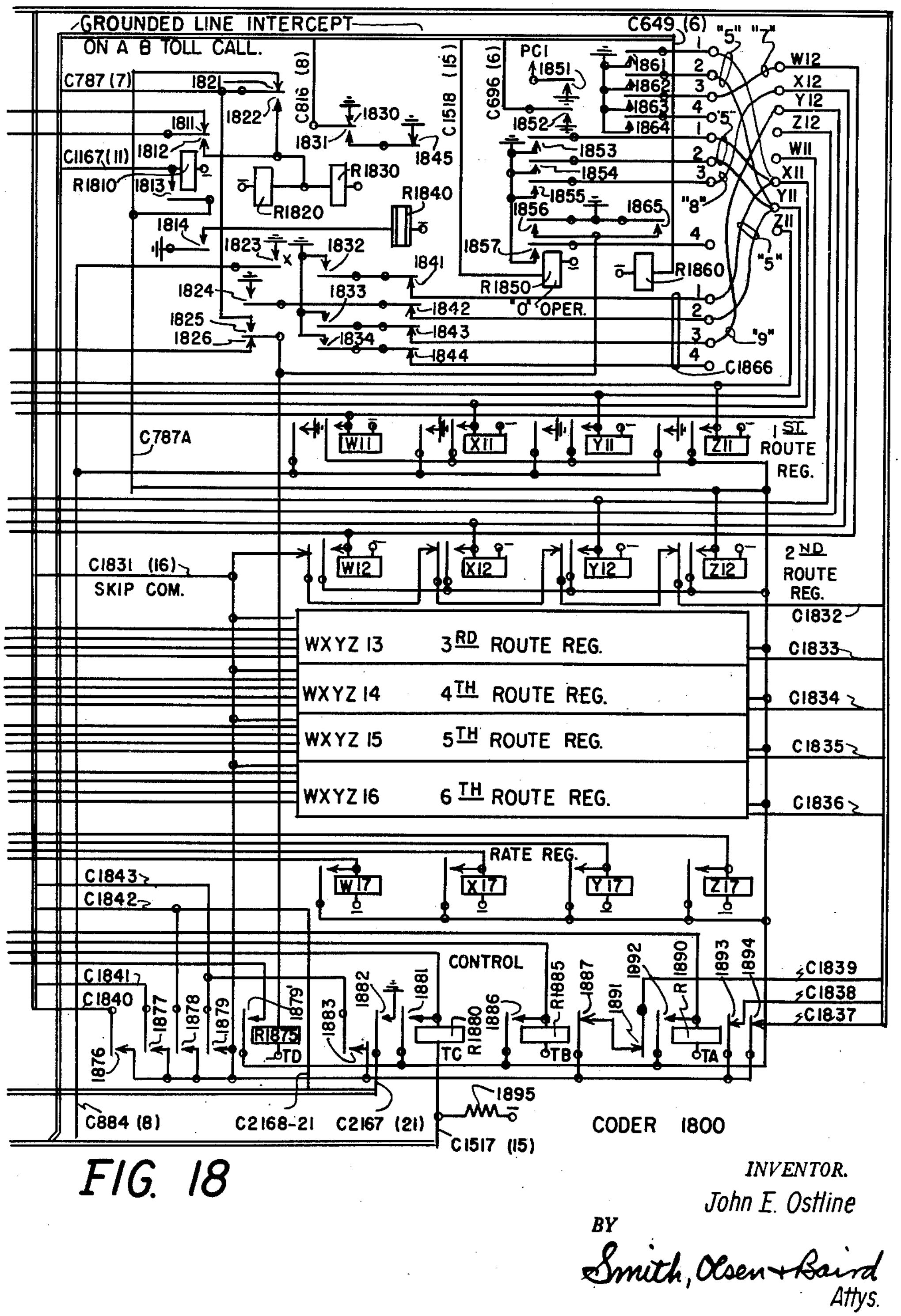

For the purpose of this description it will be assumed that the routing digits required to extend a connection from a calling subscriber in the FLorida 3 exchange to a called subscribed in the EMpire 1 exchange, are the digits 4 and 8. Consequently, it will also be assumed that the selected translator relay marks the various marking conductors WXYZ11 to WXYZ17, and also the TA, TB, etc., control conductors in the manner to be explained hereinafter. Referring now to Figs. 17 and 18, it will be understood that when the selected translator relay operates it grounds the X11 and Y11 conductors via the contacts of the connect relay R1710 in order to complete circuits for operating the X11 and Y11 register relays in the first route register. As soon as the last-mentioned relays are operated, they immediately lock themselves in their operated position over a circuit including their left-hand inner-make contacts, conductor C787A, contacts 1821, and the grounded conductor C787 extending to Fig. 7. Accordingly, these relays are locked in their operated positions to register the first routing digit 4 in the first route register of the coder 1800. In addition thereto, at the left-hand outer-make contacts the register relays X11 and Y11 apply ground potential to the conductor C884 extending to Fig. 8 in order to operate the translation complete relay R810 in the controller 600. The last-mentioned circuit indicates to the controller 600 that all of the information is transferred from the operated translator relay in the translator 1300, to the coder 1800. Although the above description includes only the transfer of one routing digit from the translator 1300 to the coder 1800 it should be understood that all of the information permanently registered in the operated translator relay is simultaneously transferred to the coder 1800. Therefore, the second routing digit 8 will be transferred to the second route register in the coder 1800 by the application of ground potential to the X12 code marking conductor, thereby to operate the X12 register relay in the second register of the coder 1800. The last-mentioned relay also locks itself in its operated position via its inner-make contact to the grounded conductor C787. At its outer-break contact, the X12 register relay interrupts a point in a circuit including in series the conductors C1832 and C1831, which prevents the send sequence switch 1650 from skipping the routing digit 8 registered in the second register of the coder 1800. Since only two routing digits are required in the present call, the WXYZ13 to WXYZ16 code marking conductors are not marked and, therefore, the register relays of the third to the sixth route registers in the coder 1800 will remain in their normal unoperated positions. It will be appreciated however, that if additional routing digits are needed they may also be registered in the coder 1800 in the manner explained above. Since no digits are registered in the third to the sixth route registers, the conductors C1833 to C1836, inclusive, are connected via closed contacts of the unoperated register relays to the skip conductor C1831 in order to control the send sequence switch 1650 to skip the last-mentioned registers.

The four WXYZ17 code marking conductors are provided to indicate the units digit of the rate of charge for a call completed between a subscriber in the FLorida 3 exchange and a called subscriber in the EMpire 1 exchange. Accordingly, it will be assumed that the charge rate for this call is the rate 01, and that the W17 and X17 code making conductors are grounded in order to operate the corresponding register relays in the rate register in accordance with the units digit 1. These relays also lock themselves in their operated position over the previously traced circuit to the grounded conductor C787. The TA, TB, TC and TD code marking conductors are connected, respectively to the TA, TB, TC and TD control relays, R1890, R1885, R1880 and R1875. These relays may be individually operated, or they may be operated in various combinations in order to determine the operation of the director in transmitting the dialed digits which are now registered in the code and numerical registers of the call register 1500. In order to describe the various combinations which may be utilized in any telephone connection, the different relays will be considered individually. For example, the TA control relay R1890, if operated, controls the director to send out all seven digits registered in the call register 1500 after the director has transmitted the routing digits registered in the first to the sixth route registers in the coder 1800. Also, the TA control relay R1890 may be operated with the TC control relay R1880. The last-mentioned relay must be operated on all six-digit called subscriber directory numbers and normally prevents the transmission by the director of any digit which may be registered in the fourth numerical register 1640 of the call register 1500. Therefore, when the TA and TC control relays are both operated, the director will transmit the first six digits registered in the call register 1500 after the routing digits have been transmitted. The TB control relay R1885 is provided to determine whether or not the third digit registered in the third code register of the call register 1500 is to be transmitted. In its operated position, the TB control R1885 will permit the director to transmit the first and second code digits, registered in the call register 1500, it will control the director to skip the digit registered in the third code register, and it will permit the director to transmit the remaining digits registered in the call register 1500 regardless of whether a six or a seven digit number has been registered therein. Obviously, if the TA relay R1890 is operated in combination with the TB relay R1885, then all of the digits registered in the call register 1500 will be transmitted, and if they are both restored the first three digits registered in the call register 1500 will be skipped. The TC control relay R1880 is provided for controlling the director when a six-digit called number has been dialed and registered in the call register 1500. This relay will normally be operated on all six-digit numbers and it controls the director to skip the last register of the call register 1500. This control relay may also be operated in combination with either the TA or TB control relays, R1890 and R1885. Finally, the TD control relay R1875 is provided to determine whether or not the director is to transmit the digits registered on the four numerical registers of the call register 1500. Thus, if the TA control relay R1890 is operated in combination with the TD control relay R1875 then the director will transmit only the first three digits of a number as registered in the call registers of the call register 1500.

For the purpose of the present description it will be assumed that the TB control relay R1885 is operated by the translator 1300, and that the relay locks itself in its operated position via its contacts 1886 to the grounded conductor C787. At its contacts 1887, the TB control relay R1885 disconnects the conductor C1839 from the skip conductor C1831 and thereby controls the director to transmit the digit registered in the third code register of the call register 1500. The remaining four digits of the seven-digit number registered in the call register 1500 will also be transmitted. Since the TA control relay R1890 is in its normal position, the digits registered on the first and second code register of the call register 1500 will be skipped by the director.

It will also be assumed that the AB toll conductor is grounded by the translator 1300 in the present call in order to complete a circuit for controlling the call recorder 2000. This circuit may be traced from the grounded AB toll conductor via the contacts 1811, the conductor C2242 extending to Fig. 22, and the winding of the start relay R2230 in the call recorder 2000. The relay R2230 operates and, at its contacts 2237, locks itself to the grounded conductor C725. The operated condition of the start relay R2230 indicates that the present telephone connection is an AB toll call and that a record is to be produced containing the items of information pertaining to the connection. The Y18 code marking conductor will not be grounded in the present call by the translator 1300 because the tens digit of the rate of charge for the call is the digit 0. If the last-mentioned code marking conductor is grounded, a circuit will be completed via the conductors C2245 extending to Fig. 22 in order to operate the tens digit rate relay R2270. The last-mentioned relay will register the tens digit 1 of the rate of charge for a call.

All of the information which is permanently wired on the selected translator relay in the translator 1300 is simultaneously transferred to the coder 1800 in the manner described above and, consequently, the translator 1300 may now be disconnected from the particular calling director so that it may be used by other directors requiring the translation of a registered called office code.

As described above, the translation complete relay R810 is operated as sooon as one of the register relays WXYZ11 in the coder 1800 is operated to register a first route digit. At its contacts 811, the relay R810 interrupts a point in the previously traced locking circuit for the assigned start relay R640, which relay now restores to normal. In response to the restoration of the relay R640, at its contacts 641 and 642, it transfers the hold conductor C685 from the circuit including the relay R650 to direct ground potential. As soon as the above transfer is made the translator assigner 1000 is controlled over the conductor C685 to rotate its wipers 1001 to 1003, inclusive, an additional step in order to disconnect the translator assigner 1000 from the director. As a further result of the restoration of the relay R640, at its contacts 644, it removes ground potential from the start conductor C686 in order to interrupt the circuit for the start relay (not shown) in the translator assigner 1000. The translator assigner 1000, in stepping its wipers 1001 to 1003, inclusive, an additional step, interrupts the circuit including the conductor C1070 and thereby restores the selected translator relay in the translator 1300 to normal. In addition to the foregoing, the translator assigner 1000 disconnects ground potential from the conductor C1071 in order to interrupt the start circuit for the translator 1300.

As soon as the assigner test relay R650 restores to normal, it disconnects the ground potential from the class 1, 2, or 3 conductors C681 to C683, inclusive, in order to restore the particular class relay in the translator 1300. At this time the translator 1300 is fully restored to normal and available for other calls. Finally, at its contacts 653, the assigner test relay R650 removes ground potential from the conductor C679 in order to restore the connect relay R1710 to normal and thereby disconnect the coder 1800 from the translator 1300.

From the foregoing description of operation it will be understood that the translator 1300 may be assigned to the exclusive use of a calling director for a very short period of time. During this time interval the information permanently stored on a selected translator relay in the translator 1300 is simultaneously transferred to and registered in the coder 1800. Immediately thereafter, the coder 1800 controls the director to disconnect the translator 1300 and render it available for further calls.

*Sending of the digits by the director*

As noted above, the translation complete relay R810 is operated to indicate that the coder 1800 has been operated to register the information transferred thereto from the translator 1300. Upon operating, the relay R810 controlled the disconnection of the translator 1300 from the coder 1800 by interrupting the circuit for the relay R640 as described above. In addition thereto, at its contacts 814, the relay R810 completes a circuit for operating the start send relay R930. The circuit for the start send relay R930 may be traced from battery via the winding of the relay, contacts 822 and 814, conductor C815 extending to Fig. 18, and the grounded contacts 1830. Upon operating, the relay R930, at its contacts 932, locks itself in its operated position to ground at the contacts 754 of the operated seizure relay R750. The start send relay R930 also controls, at its contacts 931, 933 and 934, various circuit operations whereby the director sends out impulses corresponding to the various routing digits which have been registered in the coder 1800, and certain of the dialed digits which have been registered in the call register 1500. More specifically, at its contacts 931, the relay R930 applies ground potential from the contacts 751 to the conductor C977 extending to Fig. 16, thereby to mark the contacts 1 to 9, inclusive, in the bank associated with the wiper 1653 of the send sequence switch 1650. The ground potential applied to the above noted contacts controls the send sequence switch 1650 to start the sending operation and to continue the sending of all of the routing digits registered in the coder 1800 without regard to the speed at which the calling subscriber may dial the last four digits of the called number. In other words, after the calling subscriber has registered the first three digits of the called office code in the code registers of the call register 1500, the routing digits will be registered in the coder 1800 by the translator 1300 and the sender portion of the director may operate to send out all of the routing digits while the calling subscriber continues to dial the remaining four digits of the numerical portion of the called subscriber directory number into the director.

As a further result of the operation of relay R930, at its contacts 933, it connects the ground potential at the contacts 753′, via the resistor 936 and the contacts 933, to the left-hand winding of the delay send relay R910. Finally, at its contacts 934, the relay R930 connects battery potential via the resistor 923, and the contacts 934 and 868 (as soon as relay R860 operates), to the left-hand winding of the delay send relay R910. At the present time, the resistance battery potential mentioned above is not applied to the left-hand winding of the relay R910 because the relay R860 is in its normal position. Therefore, the resistance ground potential connected to the left-hand winding of the relay R910 is further extended through the winding of the relay, impulsing contacts 882, resistor 843, conductor C468 extending to Fig. 5, wiper 453 of the director hunter 450, conductor C501, contacts 512 and 521, and the upper winding of the line relay R530, of the primary selector 500, to battery. The line relay R530 now operates and prepares the primary selector 500 to respond to the first routing digit transmitted by the director. The above-noted resistance ground potential, after it passes through the left-hand winding of the relay R910, is also extended via the conductor C975 extending to Fig. 16, the home and first contacts accessible to the wiper 1663, conductor C899 extending to Fig. 8, and the resistor 843. The last-mentioned circuit effectively short-circuits the impulsing contacts 882 in order to prevent the interruptions thereof, by the pulse relay R880, from being transmitted to the line relay R530 in the primary selector 500. The send sequence switch 1650 has its wipers 1653 to 1658, inclusive, positioned in engagement with the contacts 1 in the associated contact banks at the present time, due to the fact that the magnet RM1651 was previously operated to advance the wipers from the home contact positions when the start circuit was completed for the pulse generator 700. Consequently, when the start send relay R930 applies ground potential to the conductor C977, a circuit is completed via the wiper 1653 in engagement with the contact 1, conductor C892 extending to Fig. 8, contacts 864, the winding of the pulse control relay R870, and the resistor 879, to battery. The relay R870 operates over this circuit and thus extends the ground potential applied to the conductor C892 via the contacts 881, 877, and 693 to the conductor C895 extending to Fig. 16. In Fig. 16, the ground potential applied to the conductor C895 completes a circuit for operating the magnet RM1661 of the sender switch 1660. Since the pulse relay R880 is intermittently operated at the rate of ten pulses per second under control of the pulse generator 700, it interrupts the last-mentioned circuit, at its contacts 881, a corresponding number of times, thereby to control the magnet RM1661 to advance its wipers step-by-step at the rate of ten steps per second. As a further result of the operation of the relay R870, at its contacts 872, it applies ground potential via the contacts 861 and the conductor C894 extending to Fig. 16, in order to operate the rotary magnet RM1651 of the send sequence switch 1650. At its contacts 875, the relay R870 completes an obvious circuit for illuminating the sending lamp 883 in order to indicate that the director is performing its impulse sending operation. Finally, at its contacts 878, the relay R870 applies a direct ground potential to the conductor C468, either by way of the contacts 867 and 882, or by way of the contacts 867, conductor C975, home and first contacts accessible to wiper 1663, conductor C889, and the resistor 843, to the conductor C468. As long as the wiper 1663 is in engagement with its home and first contacts, the impulsing contacts 882 will be short-circuited, but as soon as wiper 1663 is stepped beyond its contact 1, the short-circuit will be removed from the impulsing contacts 882 so that they then will be effective to transmit impulses over the conductor C468 to the line relay R530 in the primary selector 500.

Before describing further operations of the sender switch 1660 and the send sequence switch 1650, it should be noted that the former is controlled by the impulsing relay R880 to advance its wipers 1663 to 1667, inclusive, step-by-step at the rate of ten impulses per second, whereby the wipers 1665 and 1666 may simultaneously test the associated contacts for the code markings applied thereto by the WXYZ wiper 1655 to 1658, inclusive, of the send sequence switch 1650. The wipers 1665 and 1666 engage the contacts 3 to 12, inclusive, during the stepping movement thereof and these contacts will be marked with ground potential applied to the wipers 1655 and 1658 by the WXYZ code marking conductors accessible to the last-mentioned wipers. The wipers 1655 to 1658, inclusive, as they are advanced over the associated bank contacts 1 to 6, inclusive, selectively connect the WXYZ11 conductors C1744 to WXYZ16 conductors C1749 of the correspondingly designated route register in the coder 1800 to the appropriate contacts accessible to the wipers 1665 and 1666. The remaining contacts 7 to 13, inclusive, accessible to the wipers 1655 to 1658, inclusive, terminate respectively the WXYZ21 to WXYZ27 code marking conductors extending to the various registers in the call register 1500. In view of the foregoing, it will be appreciated that the wipers 1655 to 1658, inclusive, of the sender sequence switch 1650 successively tests the code marking conductors WXYZ11 to WXYZ16, and WXYZ21 to WXYZ27 to determine the digit registers in the correspondingly designated registers. As the sender switch 1660 advances its wipers 1665 and 1666 over its contacts 3 to 12, inclusive, it will test the WXYZ conductors to determine the digit that is registered in the particular register connected through the wipers 1655 to 1658, inclusive. Therefore, upon each cycle of rotation of the wipers of the sender switch 1650 one of the registered digits is determined and a corresponding number of switch controlling impulses will be transmitted over the impulsing conductor C468 in order to control the setting up of the telephone connection.

When a particular digit is determined by the sender switch 1660 the transmission of switch setting impulses will be terminated and the sender switch 1660 will automatically be controlled to first advance its wipers step-by-step in a rapid manner to the contacts 14 under control of the self-interrupting contacts 1662 on the rotary magnet RM1661; secondly, to advance its wipers step-by-step over its contacts 14 to 19, inclusive, at the rate of ten pulses per second; and finally, to advance its wipers to the home contact positions at the rapid rate, under control of the self-interrupting contacts noted above. The slow rate of stepping of the wipers over contacts 14 to 19, inclusive, provides the digit spacing or interdigital pause between the transmission of successive impulse trains constituting successive digits. The interdigital pause is accomplished under the joint control of the sender switch 1660 and the digit space relay R860. After each registered digit has been transmitted by the sender switch 1660, the send sequence switch 1650 will advance its wipers an additional step in order to select the WXYZ code marking conductors of the next registered digit and to extend such code markings to the bank contacts accessible to the wipers 1665 and 1666 of the sender switch 1660.

Returning again to the operations which occur immediately after the pulse control relay R870 operates, it will be seen that the first time the pulse relay R880 operates, it completes the circuit at its contacts 881 (previously traced) for energizing the rotary magnet RM1661 of the sender switch 1660. The magnet RM1661 operates to prepare the sender switch 1660 to advance its wipers from engagement with the home contacts into engagement with the contacts 1 in the associated contact banks. At the end of the first pulse, that is when the relay R880 restores to normal, the contacts 881 are opened in order to interrupt the circuit and thus restore the magnet RM1661 to normal. The restoration of the magnet RM1661 advances the wipers 1663 to 1667 into engagement with the contacts 1 in the associated contact banks.

The next operation of the pulsing relay R880 reoperates the magnet RM1661. At the end of the pulse, the magnet RM1661 restores to normal and advances its wipers into engagement with the contacts 2. No pulses are transmitted over the conductor C468 to the line relay R530 in the primary selector during the time the wiper 1663 engages the home contact and the contact 1, due to the fact that the contacts 882 are short-circuited, as previously noted. It is convenient to mention at this time that the short-circuit is removed from the contacts 882 during the time that the wiper 1663 engages the contacts 2 to 12, inclusive, and that the short-circuit is replaced during the time that the wiper 1663 engages the contacts 13 to 24, inclusive.

The next time that the pulse relay R880 operates, after the wiper 1663 is in engagement with contact 2, an impulse is transmitted at the contacts 882 over the previously traced circuit including the contacts 878 and 867, the resistor 843, and the impulsing conductor C468 to the line relay R530, and at the same time an impulse is transmitted at the contacts 881 over the conductor C895 to the rotary magnet RM1661. When the relay R880 restores, the impulse transmitted over the conductors C468 and C895 is terminated. Accordingly, the line relay R530 in the primary selector 500 restores and reoperates to control the first vertical step of the associated wipers in a conventional manner and the magnet RM1661 operates and restores to advance its wipers into engagement with the contacts 3 in the associated contact banks. In this manner the pulse relay R880 simultaneously repeats the impulses over the impulsing conductor C468 and the conductor C895 in order simultaneously to control the line relay R530 in the primary selector and the magnet RM1661 in the sender switch 1660. After the wipers 1665 and 1666 reach the contact 3 in the associated contact banks, the testing circuit is prepared for determining the digit that is registered in the register selected by the send sequence switch 1650.

In the present example it has been assumed that the digit 4 has been registered in the WXYZ11 register relays of the first route register in the coder 1800. Therefore, the X11 and Y11 relays, in their operated positions, apply the locking ground potential to the X11 and Y11 conductors in the cable C1744 extending to Fig. 16. Referring now to Fig. 16 it will be seen that the WXYZ11 conductors in the cable C1744 terminate, respectively, on the contacts 1 now engaged by the wipers 1655 to 1658, inclusive. Since only the X11 and Y11 conductors are marked with ground potential in accordance with the registered digit 4, the wipers 1665 and 1666 of the sender sequence switch 1660 do not find the ground potential on the associated bank contacts until these wipers have been stepped from the contacts 3 to the contacts 6. As soon as the wipers 1665 and 1666 engage the contacts 6, a circuit will be completed for simultaneously energizing both the left-hand and the right-hand windings of the digit stop relay R920.

At the end of the fourth impulse transmitted over the conductor C468 by the pulse relay R880 the wipers of the sender switch 1660 will be advanced into engagement with the contacts 6 in the associated contact banks. The ground potential applied to the X11 code marking conductor in the cable C1744 will be extended via the wiper 1656 in engagement with contact 1, wiper 1665 in engagement with contact 6, conductor C976 extending to Fig. 9, and the right-hand winding of the digit stop relay R920, to battery. The right-hand winding of the relay will energize over the above-traced circuit, but the relay is constructed so that it will not operate its associated contacts unless the left and right-hand windings thereof are simultaneously energized. In the present example the left-hand winding of the relay R920 is energized by the ground potential applied to the Y11 code marking conductor in the cable C1744 over a circuit, including the wiper 1657 in engagement with contact 1, wiper 1666 in engagement with contact 6 conductor C974 extending to Fig. 9, and the left-hand winding of the digit stop relay R920, to battery. Since the two windings of the relay R920 are simultaneously energized, the relay operates its contacts 921, thereby to complete an obvious circuit for operating the digit space relay R860. As soon as the last-mentioned relay operates it completes a locking circuit for itself which includes its contacts 865, conductor C890 extending to Fig. 16, wiper 1664 in engagement with any one of its contacts 1 to 24, inclusive, conductor C788 extending to Fig. 7, and the grounded contacts 751 of the operated seizure relay R750.

From the foregoing it will be understood that the digit stop relay R920 is operated when the wipers of the sender switch 1660 engage contacts in the associated contact banks marked in accordance with a registered digit; that the relay R920 operates the digit space relay R860; and that the digit space relay R860 will be locked in its operated position until the sender switch 1660 has completed a cycle of operation and has again returned its wipers to the home contact positions. As a further result of the operation of the digit space relay R860, at its contacts 866, it places a short-circuit around the impulsing circuits 882 via the resistor 843. Also, at its contacts 866, the relay R860 completes a test circuit for the left-hand winding of the delay send relay R910 and, at its contacts 867, it removes the ground potential from the impulsing contacts 882. In view of the foregoing it will be appreciated that the pulses transmitted over the conductor C468 to the line relay R530 in the primary selector 500 are terminated by the operation of the digit space relay R860.

The relay R910 is provided in order to prevent the sending of the impulses of the next digit over the conductor C468 in the event that the next impulse receiving switch in the switch train over which the connection is to be completed is not in condition to receive the impulses transmitted by the director. In the next switch in the switch train is not in condition to receive the impulses of a digit, it returns a ground potential over the conductor C468 in order to energize the left-hand winding of the relay R910. This circuit may be traced from the conductor C468 via the contacts 866 or 922, the left-hand winding of the relay R910, contacts 868 and 934, and the resistor R923, to battery. The right-hand winding of the relay R910 is also energized over a circuit, including grounded contacts 753'. The relay R910, if operated over the above-traced circuit, completes, at is contacts 911, a circuit for retaining the relay R860 in its operated position even though the digit stop relay R920 has restored to normal and the locking ground potential has been removed from the conductor C890. In other words, the delay send relay R910, in its operated position, will prolong the operation of relay R860 until the next switch in the switch train is in condition to receive the next series of impulses, at which time the ground potential will be removed from the conductor C468 and restore the delay send relay R910 to normal.

For the purpose of this description it will be assumed that the delay send relay R910 is not operated. As a further result of the operation of relay R860, at its contacts 864, it interrupts the circuit for the pulse control relay R870 which now restores to normal, and, at its contacts 863, the relay R860 connects the pulse control relay R870 to the conductor C893 so that the latter relay may be reoperated at a predetermined point during the automatic stepping of the wipers of the sender switch 1660. Also, at its contacts 861, the relay R860 removes ground potential from the conductor C894, thereby to permit the magnet RM1651 of the send sequence switch 1650 to restore to normal and advance its wipers into engagement with the contacts 2 in the associated contact banks.

As soon as the relay R870 restores to normal, at its contacts 871 and 873, it completes points in the circuits which control the sender switch magnet RM1661 so that the wipers thereof will be automatically advanced, at a high rate of speed, from the engaged contacts 6 to the contacts 14. The circuit for operating the magnet RM1661 may be traced from ground via the wiper 1667 in engagement with the contact 6, conductor C898 extending to Fig. 8 (multiply connected to all of the contacts 1 to 12, inclusive), contacts 871, conductor C897, interrupter contacts 1662, and the winding of the magnet RM1661, to battery. The magnet RM1661 operates when the circuit is completed and interrupts its circuit at its contacts 1662. The magnet now restores to normal and advances its wipers an additional step in a counterclockwise direction. In this manner the wipers 1663 to 1667, inclusive, of the sender switch 1660 are advanced step-by-step from the engaged contacts 6 to the contacts 13 in the associated contact banks. As soon as the wiper 1667 disengages the associated contact 12, and steps to the contact 13, the self-interrupting circuit for the magnet RM1661 is interrupted and a separate circuit is completed via the conductor C896, contacts 874 and 871, conductor C897, the self-interrupting contact 1662, and the winding of the rotary magnet RM1661, to battery. The magnet RM1661 again operates and restores, in the manner previously described, and advances its wipers into engagement with the contacts 14. In this position, the wiper 1667 extends ground potential via the conductor C893 (multiply connected to the contacts 14 to 19, inclusive), contacts 863, winding of the pulse control relay R870, and the resistor 879, to battery. Accordingly, it will be seen that when the wiper 1667 engages the contact 14, the circuit for stepping the wipers of the sender switch 1660 is transferred from the automatic self-interrupting circuit for advancing the wiper at a rapid rate, to a circuit which advances the wipers step-by-step at the rate of ten pulses per second over the contacts 14 to 19, inclusive. As soon as the above-traced circuit is completed the relay R870 operates and, at its contacts 877, it recompletes the previously traced circuit for pulsing the rotary magnet RM1661 under control of the contacts 881 of the pulse relay R880. Therefore, the wipers 1663 to 1667, inclusive, are advanced step-by-step over the contacts 14 to 19, inclusive, at the rate of ten steps per second and when the wiper 1667 disengages the contact 19, the above-traced impulsing circuit for the magnet RM1661 is interrupted. The circuit for retaining the pulse relay R870 in its operated position is maintained as long as the wiper 1667 is in engagement with any one of the contacts 14 to 19, inclusive, and as soon as the wiper 1667 disengages the contact 19, the relay R870 restores. As soon as the relay R870 restores, it again completes at its contacts 871 and 873, the previously traced self-interrupting circuit for the magnet RM1661. Consequently, the wipers 1663 to 1667, inclusive, are again advanced at a rapid rate over the contacts 20 to 24, inclusive, and as soon as the wiper 1667 disengages the contact 24, the self-interrupting circuit of the magnet RM1661 is terminated. Furthermore, when the wiper 1664 disengages the contact 24, the ground potential on the conductor C788 is disconnected from the conductor C890 in order to interrupt the locking circuit for the digit space relay R860. The relay R860 now restores to normal and again conditions the various circuits to transmit the next digit registered in the director.

In view of the foregoing description of the operation of the director to transmit the first routing digit, it will be understood that the sender switch 1660 is controlled to advance its wipers over its contacts in order to transmit a series of impulses corresponding to the numerical value of the digit registered in the first route register of the coder 1800 which is selected by the send sequence switch 1650. It will also be understood that the sender switch 1660 returns its wipers back to the home contacts, first at a rapid rate, then at the rate of ten pulses per second, and finally, at a rapid rate in order to provide an interdigital pause between the transmission of each series of impulses. When the digit space relay R860 restores to normal at the end of the above described cycle of operation, the circuits are again in condition to repeat the cycle of operation in order to transmit the digit registered in the WXYZ12 register relays of the second route register in the coder 1800.

It will be recalled that the digit space relay R860 operates, under control of the digit stop relay R920, as soon as the impulses of the first routing digit 4 are transmitted. The relay R860, at its contacts 861, interrupts the circuit for the magnet RM1651 of the send sequence switch 1650 which restores to normal and advances its wipers 1653 to 1658, inclusive, into engagement with the contacts 2 in the associated contact bank. As soon as the wiper 1654 engages the contact 2, it applies ground potential to the conductor C1832 extending to Fig. 18. In Fig. 18, it will be seen that the conductor C1832 is connected to a series circuit including back contact of each of the register relays WXYZ12, the skip common conductor C1831 extending to Fig. 16, the self-interrupting contacts 1652, and the winding of the magnet RM1651. Similar circuits including, respectively, the conductors C1833 to C1836, inclusive for the respective third, fourth, fifth and sixth route registers in the coder 1800 are also provided for controlling the operation of the magnet RM1651. Each of the above-mentioned circuits may be completed only in the event that a digit is not registered in the associated route register. In the present example the digit 8 is registered in the X12 relay of the second route register in the coder 1800. However, no digits are registered in the third, fourth, fifth and sixth route registers. Since the X12 relay in the second route register is operated, the above-traced series circuit including the conductors C1832 and C1831 is interrupted in order to prevent the magnet RM1651 of the send sequence switch 1650 from being operated. The locking ground potential applied to the conductor C787, which retains the X12 relay in its operated position, is further extended via the X12 conductor in the cable 1745 to the wiper 1656 of the send sequence switch 1650, thereby to indicate that the digit 8 is registered in the second route register.

Figure 8:
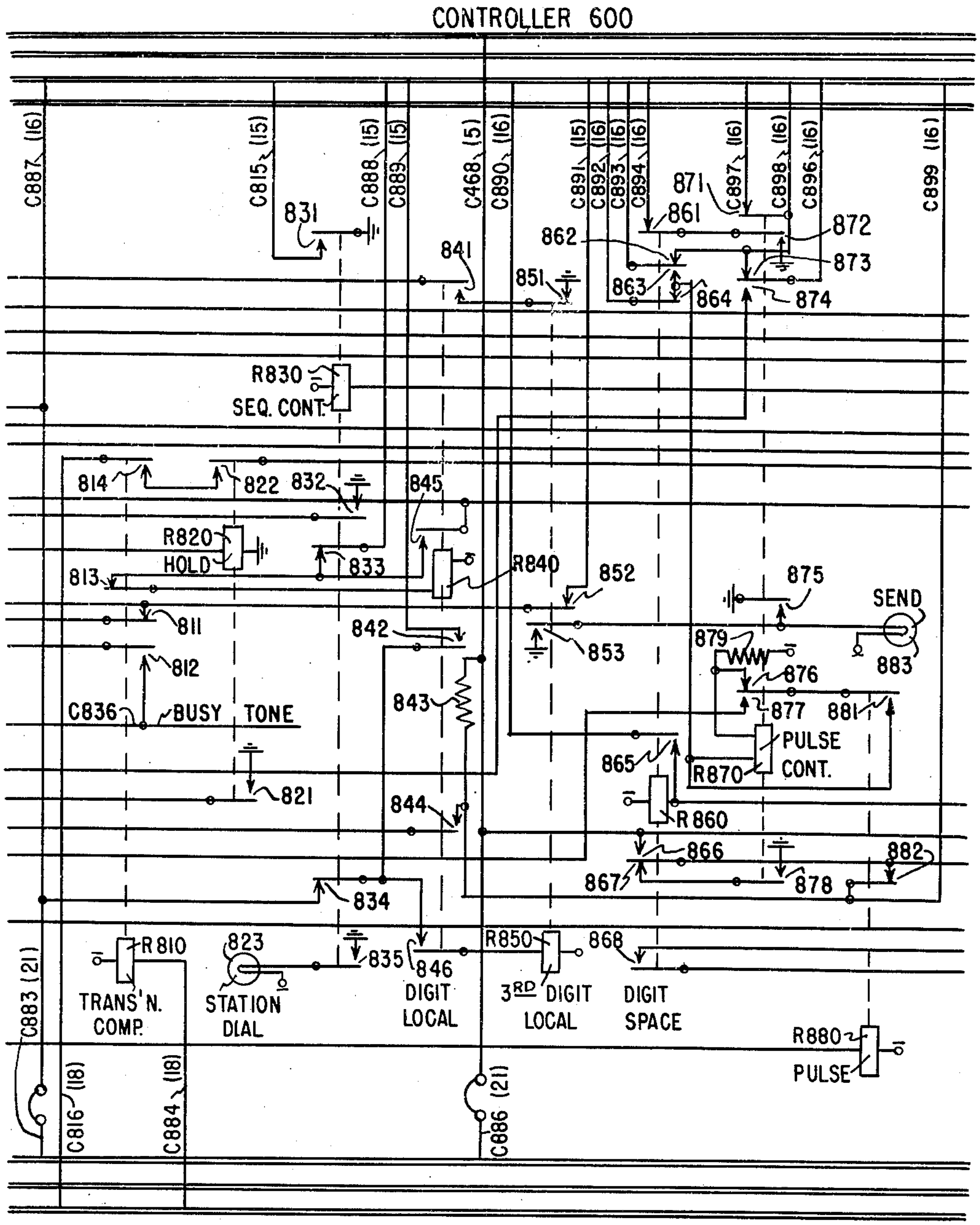

With the wiper 1653 in engagement with the contact 2, the ground potential applied to the conductor C977 is connected via the conductor C892 extending to Fig. 8, contacts 864, winding of the pulse control relay R870, and the resistor 879, to battery. The relay R870 now reoperates in order to provide the pulsing ground for controlling the magnet RM1661 of the sender switch 1660, in the manner previously described. Consequently, the wipers 1663 to 1667, inclusive, are advanced step-by-step to search for the code marking ground potentials applied to the contacts accessible to the wipers 1665 and 1666 through the WXYZ wipers 1655 to 1658, inclusive, by the second route register in the coder 1800. The operations of the sender switch 1660, the pulse control relay R870, the pulse relay R880, the digit stop relay R920, and the delay send relay R910, are the same as has been previously described. It will be understood that when the wiper 1665 engages the contact 10 in the associated contact bank, the ground potential applied thereto via the wiper 1656 from the X12 marking conductor in the cable C1745 will be applied to the conductor C796 in order to energize the right-hand winding of the digit stop relay R920. Simultaneously therewith the direct ground potential connected to the contact 10 engaged by the wiper 1666 is applied to the conductor C794 in order to energize the left-hand winding of the digit stop relay R920. Accordingly, the two windings of the relay R920 are simultaneously energized in order to operate the relay and thereby recomplete the previously traced circuit for operating the digit space relay R860.

As the wipers 1665 and 1666 are advanced step-by-step from the contacts 2 to the contact 10, eight impulses are transmitted over the conductor C468 by the pulse relay R880 in order to control the setting of the second switch in the switch train in accordance with the second routing digit 8. During the stepping of the wipers 1665 and 1666, circuits may be completed at different times for either the right-hand or left-hand winding of the digit stop relay R920, but it is not until these wipers reach the contacts 10 that circuits are completed for simultaneously energizing both windings of the relay R920 to terminate the transmission of the impulses constituting the second routing digit.

The operations which now take place are substantially the same as those previously described, whereby the sender switch magnet RM1661 is self-interruptedly controlled to advance its wipers step-by-step to the contacts 14, whereby the wipers are advanced step-by-step under control of the pulse relay R880 over the contacts 14 to 19, inclusive, at ten pulses per second, and whereby the wipers are advanced step-by-step over the contacts 19 to 24, inclusive, into engagement with the home contact position under control of the self-interrupting circuit for the rotary magnet RM1661. In this manner the sender switch 1660 completes the second cycle of operation to transmit the second routing digit 8 registered in the WXYZ12 register relays in the second route register of the coder 1800 and to provide the inter-digital pulse after the transmission of the second routing digit 8.

Since no routing digits are registered in the third, fourth, fifth and sixth route registers of the coder 1800, it is essential that the send sequence switch 1650 be automatically controlled to advance its wipers over the contacts 3 to 6, inclusive, in order to skip the above-noted registers. Therefore, at the end of the transmission of the second routing digit 8, the digit space relay R860 interrupts, at its contacts 861, a point in the circuit for the magnet RM1651. The magnet RM1651 thereupon restores to normal and advances its wipers into engagement with the contacts 3 thereof. In this position, the wiper 1654 applies ground potential to the conductor C1833 extending to Fig. 18, and then through the left-hand break contacts (not shown) of the four unoperated WXYZ13 register relays in the third route register of the coder 1800, the skip conductor 1831 extending to Fig. 16, the interrupter contacts 1652, and the winding of the magnet RM1651, to battery. The magnet RM1651 now operates and when it is fully operated, it interrupts its own circuit, at its contacts 1652, and restores to normal in order to advance the wipers 1653 to 1658, inclusive, from engagement with the contacts 3 into engagement with the contacts 4. In this position the wiper 1654 applies ground potential to the conductor C1834, whereby a similar self-interrupting circuit is completed for the magnet RM1651, which circuit includes the normally closed left-hand break contacts of the unoperated WXYZ14 register relays in the fourth route register of the coder 1800 and the skip conductor C1831. The magnet RM1651 thereupon operates and restores in order to advance its wipers into engagement with the contacts 5 in the associated contact banks. In this position the wiper 1654 applies ground potential to the conductor C1835 in order to again complete the circuit for operating the magnet RM1651 through the left-hand break contacts of the unoperated WXYZ15 register relays in the fifth route register of the coder 1800. When this circuit is completed the rotary magnet RM1651 again operates and restores in order to advance its wipers into engagement with the contacts 6. In this position the wiper 1654 applies ground potential to the conductor C1836 whereby the circuit is now completed through the left-hand break contacts of the unoperated WXYZ16 register relays of the sixth route register in the coder 1800. The magnet RM1651 again operates and restores, thereby to advance its wipers into engagement with the contacts 7. The above described operations whereby the wipers of the send sequence switch 1650 are automatically advanced step-by-step from the contacts 2 into engagement with the contacts 7, in order to skip the unoperated registers in the coder 1800, is started as the digit space relay R860 is operated, and it is completed within a very short interval of time, usually before the wipers of the sender switch 1660 have completed their cycle of operation and have been returned to their home contact positions.

The operations which now take place depend upon the operated and restored conditions of the TA, TB, TC and TD control relays R1890, R1885, R1880 and R1875 in the coder 1800. These relays, it will be recalled, store certain control information as determined by the operation of a selected translator relay in the translator 1300. In the present example the TB control relay R1885 has been operated and locked to the grounded conductor C787A. By referring to Fig. 8, it will be seen that conductors C1837, C1838 and C1839, which are respectively connected to the contacts 7, 8 and 9 accessible to the wiper 1654, are normally connected to the skip conductor C1831 via contacts of the TA and TB control relays R1890 and R1885. With only the TB control relay R1885 operated, it disconnects the conductor C1839 from the skip conductor C1831, at its contacts 1887, whereas the conductor C1837 and C1838 remain connected to the skip conductor C1831 by way of the contacts 1894 and 1893, respectively, of the unoperated TA control relay R1890. Consequently, when the wiper 1654 of the send sequence switch 1650 engages the contact 7, ground potential is applied via the conductor C1837 and the contacts 1894 to the skip conductor C1831, in order to again complete the self-interrupting circuit for the magnet RM1651. Accordingly, the magnet RM1651 advances its wipers into engagement with the contacts 8. In this manner, the send sequence switch 1650 will skip the digit registered in the first code register 1520 and marked on the WXYZ21 code marking conductors terminating in the bank contacts accessible to the wipers 1655 to 1658, inclusive.

The wipers 1654 now applies ground potential via the conductor C1838 and the contacts 1893 to the skip conductor C1831, in order to control the magnet RM1651 to advance its wipers into engagement with the contacts 9. In this manner the send sequence switch 1650 skips the digit registered in the second code register 1530 and marked on the WXYZ22 code marking conductors terminating in the bank contacts accessible to the wipers 1655 to 1658, inclusive. In this position the wiper 1654 applies ground potential to the conductor C1839, but inasmuch as the TB control relay R1885 has opened its contacts 1887, the ground potential is not applied to the skip conductor C1831. In other words, the operation of only the TB control relay R1885 has determined that the send sequence switch 1650 should skip the digits registered on the first and second code registers 1520 and 1530, and that the sender switch 1660 should send out the digit registered in the third code register 1540 and marked on the WXYZ23 code marking conductors. The advancement of the wipers 1653 to 1658, inclusive, from the contacts 2 to the contacts 9, and the tests performed over the corresponding contacts of the wipers 1654 are all completed during the interdigital pause provided after the transmission of the second routing digit 8.

When the wipers of the sender switch 1660 have completed the second cycle of operation by returning to the home contact positions, the locking ground potential retained on the conductor C890 by the wiper 1664 is removed therefrom in order to restore the digit space relay R860 to normal. In response to the restoration of the relay R860, the contacts 864 are again closed in order to complete the previously traced circuit for the pulse control relay R870. The relay R870 reoperates and reinitiates the cycle of operation whereby the sender switch 1660 advances its wipers over the associated contact banks to transmit impulses in accordance with the value of the digit registered in the third code register 1540. In the present example, the digit 1 is registered in the third code register 1540 and consequently the wipers 1544 and 1545 are in engagement with the contacts 1 in order to apply a marking ground potential to the W23 and X23 code marking conductors. Since the WXYZ23 code marking conductors are connected respectively to the contacts 9 engaged by the EXYZ wipers 1655 to 1658, inclusive, the ground potential applied to the W23 and X23 code marking conductors is connected to the contacts 3 accessible to the wipers 1665 and 1666 of the sender switch 1660. Therefore, when the wipers 1665 and 1666 engage the contacts 3, the first impulse will be transmitted over the conductor C468 by the pulse relay R880. At this instant the ground potential applied to the contacts 3 engaged by the wipers 1665 and 1666 will complete the previously traced circuits for energizing the left and right-hand windings of the digit stop relay R920. The relay R920, at its contacts 921, completes the circuit for the digit space relay R860, and the latter relay locks itself to the grounded conductor C890. During the stepping of the wipers of the sender switch 1660 from the contacts to the contacts 3, one impulse corresponding to the digit 1 registered in the third code register 1540 is transmitted over the conductor C468 to control the next impulse receiving switch in the switch train.

The digit space relay R860, upon operating, again interrupts the circuit for the magnet RM1651 in order to cause the wipers of the send sequence switch 1650 to be advanced into engagement with the contacts 10. Also, the pulse control relay R870, upon restoring to normal, again controls the magnet RM1661 of the sender switch 1660 in order to advance the wipers thereof, in the manner previously described, back to the home contact positions. As soon as the wipers of the sender switch 1660 are again returned to the home contact positions the digit space relay R860 is restored to normal and the circuit for operating the pulse control relay R870 is again prepared at the contacts 864.

Since the relay R870 must operate to initiate each cycle of operation in the sender switch 1660, circuits have been provided whereby a test is made to determine whether or not the sender switch 1660 has reached a point in the sending out of the digits registered in the call register 1500 which corresponds to a numerical register which is being controlled from the calling subscriber dial. In other words, if the calling subscriber should register the first three digits of the called office code portion of a directory number and should then delay in dialing the remaining digits of the numerical portion of the called number, it is possible for the sender switch 1660 to transmit all of the routing digits and all of the digits registered in the code registers 1520, 1530 and 1540 before the calling subscriber has registered a digit in the first numerical register 1610. In the latter event, the sender switch 1660 will test the first numerical register 1610 before attempting to send out the digit registered therein. If no digit is registered in the first numerical register 1610, the send sequence switch 1650 will prevent the operation of the pulse control relay R870 until after the calling subscriber has registered the first numerical digit of the called number in the first numerical register 1610. It may be well to point out at this time that if the subscriber delays in the dialing of any of the digits of the called number for more than a predetermined length of time, the director is arranged to automatically time-out and disconnect itself from the calling subscriber line.

In order to prevent the sender switch 1660 from getting ahead of the registration of the digits in the numerical registers 1610, 1620, 1630 and 1640, the controller 600 portion of the director is provided with corresponding relays R940, R950, R960 and R990, which are sequentially operated in response to the operation of each of the above-noted numerical registers to register a digit. More specifically, the relay R940 is provided to indicate when the first numerical digit has been registered in the first numerical register 1610. As previously noted, the sequence switch 1510 has its wipers in engagement with the contacts 4 during the time that the calling subscriber is dialing the fourth digit of a called number, which digit is the first digit of the numerical portion of the called number. The impulses of this digit are transmitted over the conductor C717, the wiper 1514, and the conductor C1554, to the first numerical register 1610, and thereafter the wipers of the switch 1510 are immediately advanced into engagement with the contacts 5, thereby to prepare the circuit for registering the second numerical digit in the second numerical register 1620. As soon as the wiper 1515 of the sequence switch 1510 engages contact 5, a circuit is completed from ground at the contacts 757 of the operated seizure relay R750, and then via the conductor C794 extending to Fig. 16, wiper 1515 and the engaged contact 5, conductor C979 extending to Fig. 9, and the winding of the relay R940, to battery. The relay R940 operates, and at its contacts 942, it locks itself to ground at contacts 754. The operated condition of relay R940 indicates that a digit has been registered in the first numerical register 1610. At its contacts 941, the relay R940 applies the ground potential at the contacts 751 to the conductor C978 extending to Fig. 16, and then via the contact 10 engaged by the wiper 1653 of the send sequence switch 1650, conductor C892 extending to Fig. 8, contacts 864, winding of the pulse control relay R870, and the resistor 879 to battery. The relay R870 now operates and reinitiates the cycle of operation of the sender switch 1660 whereby the digit registered in the first numerical register 1610 is transmitted to the switch train in the manner previously described.

Before proceeding with the description of the operations which now occur as a result of the operation of relay R870 it should be understood that the second numerical send relay R950, the third numerical send relay R960, and the fourth numerical send relay R990 are successively operated, over circuits similar to those described above for operating the first numerical send relay R940, as the second, third and fourth numerical digits are successively registered in the second, third and fourth numerical registers 1620, 1630 and 1640. These relays, of course, are operated over circuits including the wiper 1515 of the receive sequence switch 1510 as the wiper successively engages the sixth, seventh and eighth contacts in the associated contact bank. At the contacts 951, 961 and 991 these relays apply ground potential respectively to the conductors C979, C982 and C985, which terminate respectively in the contacts 11, 12 and 13 accessible to the wiper 1653 of the send sequence switch 1650.

When the pulse relay R870 operates, in response to the registration of the first numerical digit in the register 1610, it controls the sender switch 1660 to transmit a number of pulses corresponding to the digit registered in the first numerical register 1610. It should be noted, however, that as soon as the wipers of the switch 1650 engage the contacts 10 a test is made by the ground potential on the wiper 1654 to determine whether or not the digit registered in the register 1610 should be transmitted. This test is made over the conductor C1840 extending to Fig. 18, to the contacts 1876 of the TD control relay R1875. Since the relay R1875 is in its normal position, the contacts 1876 thereof will be opened and no ground potential will be applied to the skip conductor C1831. In the positions 11, 12 and 13, the wiper 1654 will also test the conductors C1841, C1842 and C1843 to determine whether or not the digit registered in the second, third and fourth numerical registers 1620, 1630 and 1640 are also to be transmitted. In the present example, each of the digits registered in the numerical registers of the call register 1500 will be transmitted. When the wipers 1665 and 1666 of the sender switch 1660 have found the contacts in the associated contact banks which are marked in accordance with the digit registered in the first numerical register 1610, the digit stop relay R920 will be operated, in the manner previously described, in order to terminate the transmission of the impulses corresponding to the digit registered in the register 1610. The remaining operations whereby the digit space relay R860 and the pulse control relay R870 cooperate with the sender switch 1660 to provide the interdigital pause between the transmission of successive digits and to return the wipers of the switch 1650 to the home contact positions is the same as has been previously described.

If it is assumed that the remaining three digits of the called number are registered in the second, third and fourth numerical registers 1620, 1630 and 1640, the WXYZ25, WXYZ26 and WXYZ27 code marking conductors will be marked accordingly. Thereafter, the send sequence switch 1650, the sender switch 1660, the digit space relay R860, the pulse control relay R870, and the digit stop relay R920 will cooperate, in the manner described above, to control the transmission of impulses corresponding to the registered digits to the digit receiving switches in the switch train, in order to complete the telephone connection to the desired called subscriber line. It may be well to mention at this time, however, that the sender switch 1660 is prevented from sending out the last digit of a called subscriber directory number in the event that the call recorder 2000 (Figs. 19 to 22) has not performed all of its operations by the time the sender switch 1660 is ready to transmit the last digit. The blocking of the sender switch 1660 to prevent the transmission of the last digit is controlled over the conductor C972 in a six-digit called number, and over the conductor C986 on a seven-digit called number. These conductors will be grounded in order to control the pulse relay R870 only when the call recorder 2000 has completed its normal operations.

After the sender switch 1660 has transmitted the last digit registered in the fourth numerical register 1640, the send sequence switch magnet RM1651 is controlled by the operation of the digit space relay R860, in the manner previously described, to advance its wipers from engagement with the contacts 13 into engagement with the contacts 14. The wiper 1654 in engagement with the contact 14 applies ground potential via the conductor C887, extending to Fig. 8, and the lower winding of the director release relay R780, to battery. The director release relay R780 now operates and locks itself, via its contacts 786, to ground at contacts 754; it controls the release of the director from the calling subscriber line, in the manner previously described; and it controls the director test relay R510, in the manner previously described, in order to connect the calling subscriber line to the connection which has been set up over the various switches in the switch train to the called subscriber line. Before the director release relay R780 is operated to control the release of the director, it should be understood that the call recorder 2000 illustrated in Figs. 19 to 22, inclusive, must have performed all of its operations, including the identification of the directory number of the calling subscriber substation.

*Operation of the call recorder 2000*

A description will now be given of the mode of operation of the call recorder 2000 illustrated in Figs. 19 to 22, inclusive. Before proceeding with the description it should be noted that in Fig. 19 the detector 1900 has been schematically illustrated by means of a block diagram, and that the conductors connected to the block diagram have been designated, for the most part, with the same designations that appear in the detector 1900, illustrated in the John E. Ostline application Serial No. 79,677, filed March 4, 1949, now Patent No. 2,639,330. The detector 1900 represented in the block diagram is the same as the detector 1900 shown and described in the last-mentioned Ostline application, and the various conductors are identified by the same designations in order to correlate the operation of the present system with the operation of the detector 1900. The detailed operation of the detector 1900 in the present application is identical with the operation of the detector 1900, illustrated in the above-noted Ostline application, and it will be understood from the following description that upon seizure, the detector will associate itself with the calling recorder 2000, it will identify the numerical portion of the directory number of the calling subscriber substation on a terminal per station basis, and it will store the number identifying the calling subscriber substation on the code storage relays WXYZ1 to WXYZ5, inclusive.

The call recorder 2000 is also provided with a code send switch 1950 which is arranged to transmit to the toll ticketing repeater 2300 included in the connection, the various items of record information which are stored either in the code storage relays of the call recorder 2000 or which are stored in the various registers of the call register 1500. As previously noted, the call recorder 2000 is also provided with a plurality of calling station identifying relays (Fig. 20) which are controlled by the calling devices at the calling party-line subscriber substations for the purpose of marking the party 1 to the party 5 conductors C1906 to C1909 and C1909' in accordance with the position of the calling station on a party line. The conductors C1906 to C1909, inclusive, are connected respectively to the party 1 to the party 4 relays provided in the detector 1900 of the Ostline application Serial No. 79,677, now Patent No. 2,639,330, and illustrated in Fig. 5 thereof, in order to control the detector to search for the identity of the particular calling station on a calling line in the manner described in the said Ostline application. Since the present application is arranged for five subscriber substations on a party line, an additional party 5 conductor C1909' is also connected to the detector 1900 and it is connected to a party 5 relay thereat, in the manner described above, so that the detector 1900 will search for the calling line in a group of lines including only the fifth subscriber substations on the party lines of the system. Since the latter modification of the detector 1900 in the Ostline application Serial No. 79,677, now Patent No. 2,639,330, merely comprises the addition of a party 5 relay and associated circuits which are substantially identical to the four-party relays and associated circuits illustrated therein, it is not deemed necessary to enlarge upon the disclosure of the present detector 1900 to include the circuit details of the modification.

Figure 22:
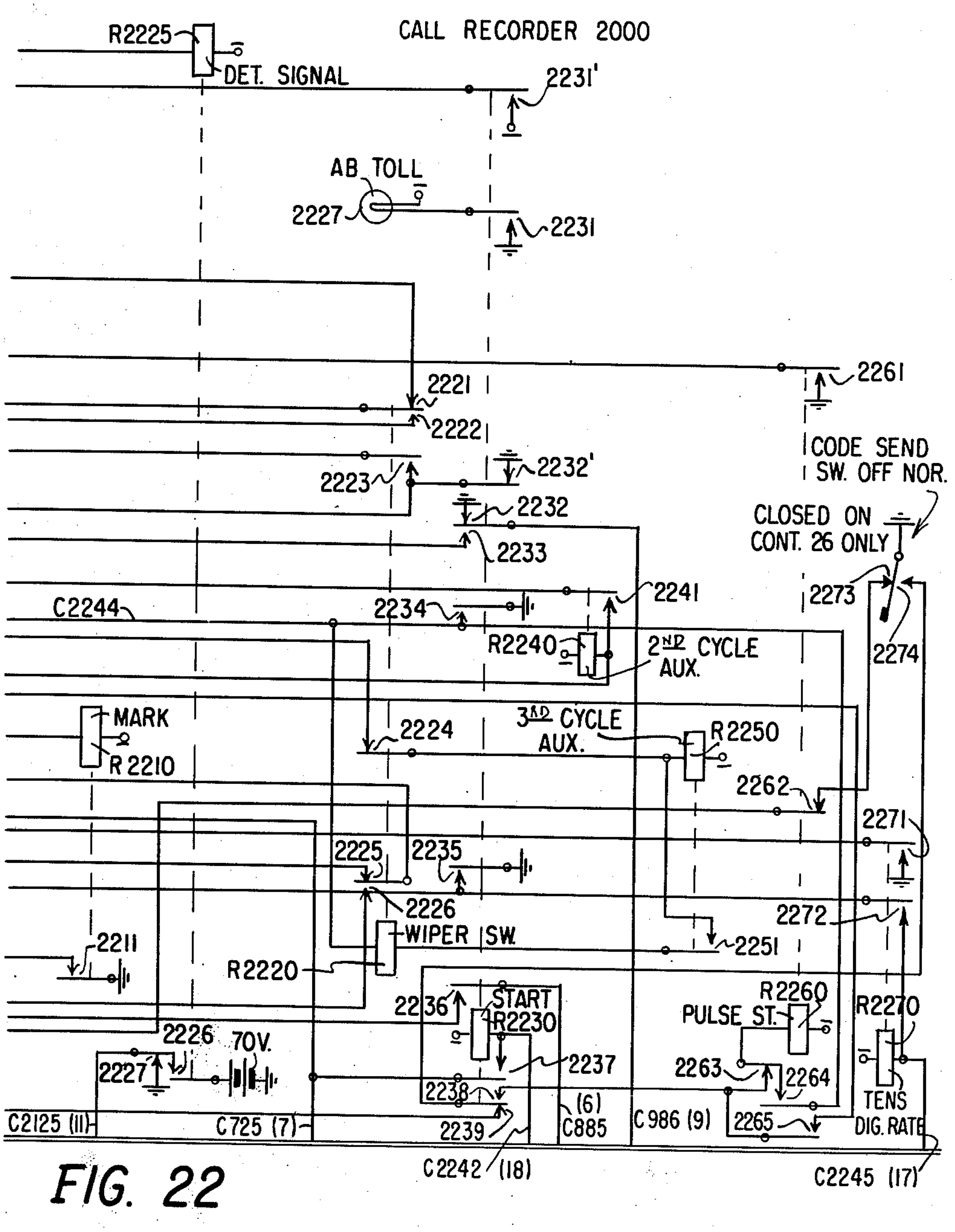

In the previous description of the mode of operation of the controller 600 portion of the director it was pointed out that as soon as the director was seized the seizure relay R750 operated and, at its contacts 757, applied ground potential to the conductor C725 extending to Fig. 22, in order to operate the relay R2105 in the call recorder 2000. The last-mentioned relay is operated as soon as the director is seized in order to prevent the subsequent operation of detection complete relay R2120 until after the detector 1900 has completed the detection cycle and has identified the calling line. It will also be recalled from the previous description of the operation of the coder 1800 that the translator 1300 completed a circuit for operating the start relay R2230 in the call recorder 2000 in order to indicate that the call recorder 2000 is required in the present telephone connection. In other words, the operation of the call recorder 2000, is, for all practical purposes, initiated in response to the operation of the start relay R2230.

Figure 9:
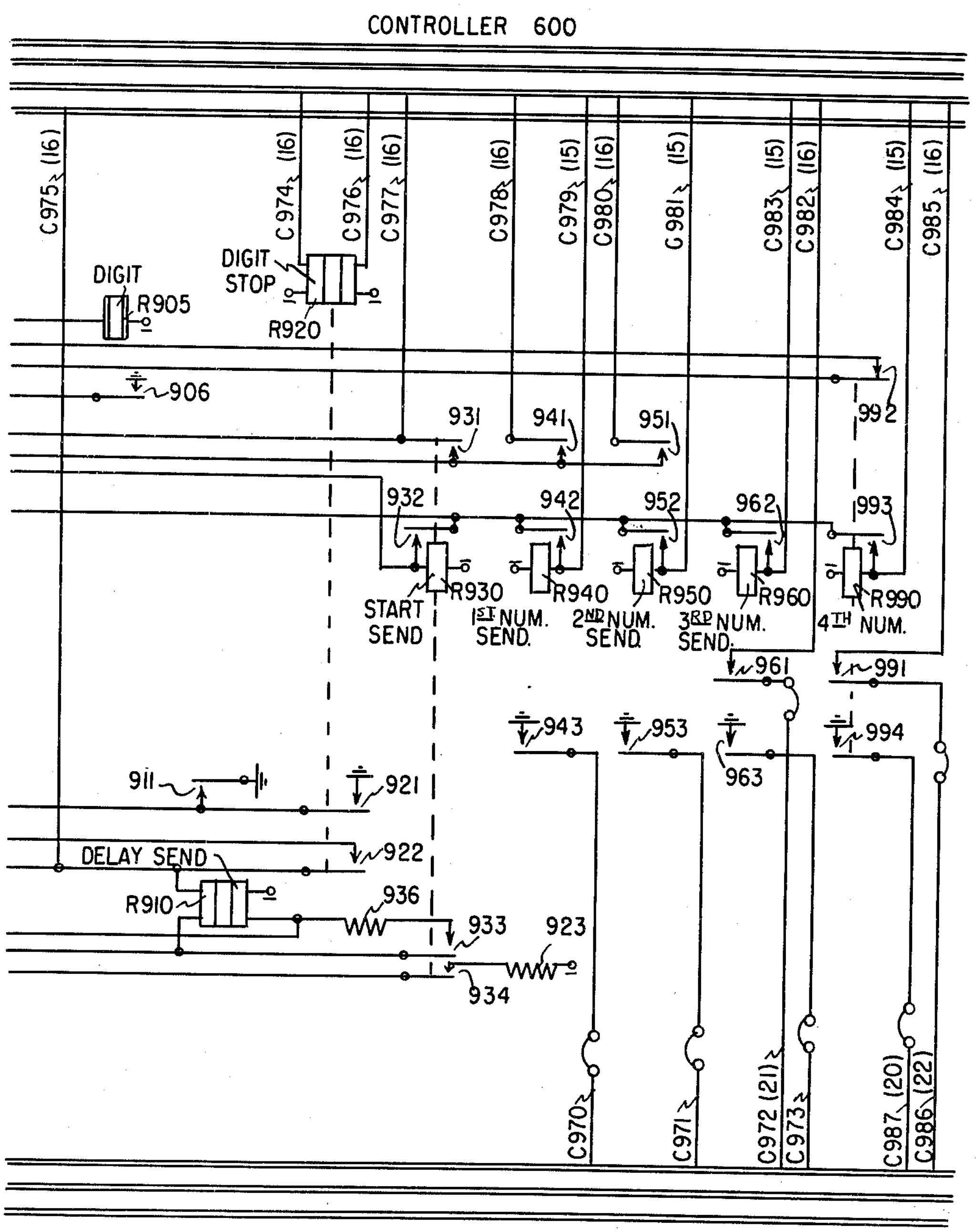

When the start relay R2230 operates, at its contacts 2234, it applies a holding ground potential to the conductor C2244; at its contacts 2232, it removes ground potential from the conductor C986 extending to Fig. 9, in order to prevent the sender switch 1660 from transmitting the digit registered in the fourth numerical register 1640; and, at its contacts 2231, it completes an obvious circuit for illuminating the AB toll lamp 2227 in order to indicate that the call recorder 2000 is being utilized in an AB toll connection. As a further result of the operation of the relay R2230, at its contacts 2238, it prepares a point in the circuit for the pulse start relay R2260; at its contacts 2236, it connects the T conductor C885 to the lower winding of the code send relay R2240; and finally, at its contacts 2235, it completes a circuit, including the contacts 2136, 2124 and 2112, for operating the detector start relay R2070. The relay R2070, at its contacts 2071, applies ground potential to the start conductor C1903 and, at its contacts 2172, it removes the busy marking ground potential from the guard conductor 1902'. The last-mentioned circuits, including the start conductor C1903 and the guard conductor C1902', control the association of the detector 1900 with the particular calling call recorder 2000.

It should be understood that the call recorder 2000 is one of a plurality of call recorders, each of which is individually associated with a particular director, and that the detector 1900 is common to all of the call recorders provided in the telephone exchange. Consequently, when the detector start relay R2070 operates and applies ground potential to the start conductor C1903, it simultaneously removes the busy marking ground potential from the guard conductor C1902'. The grounding of the start conductor C1903 controls the Finder in the detector 1900 to search for the particular calling call recorder 2000, which is now marked as the calling recorder by the removal of the busy marking ground potential from the guard conductor C1902'. All other call recorders are, at the present time, marked with a busy marking ground potential on the associated guard conductors. The rotary magnet ROT of the Finder in the detector 1900 automatically advances the wipers 597 and 597A over the associated bank contacts until the wiper 597 engages the ungrounded guard conductor C1902'. Simultaneously therewith, a ground potential connected to the wiper 597A of the Finder in the detector 1900 is applied to the holding conductor C1902 in order to operate the detector test relay R2110 in the call recorder 2000 over a circuit, including the contacts 2125, 2135 and 2231'. As a further result of the grounding of the start conductor C1903, the detector 1900 operates in the manner described in detail in the Ostline application Serial No. 79,677, filed March 4, 1949, to identify the number of the calling subscriber line.

When the detector test relay R2110 operates in response to the association of the detector 1900 with the call recorder 2000, it completes, at its contacts 2113, an obvious circuit for operating the detector connect relay R1910 whereby various conductors of the detector 1900, which are common to all call recorders, are individually connected to the call recorder 2000, over the contacts 1911 to 1926, inclusive. At its contacts 2112, the relay R2110 interrupts the circuit for the detector start relay R2070 which now restores to normal in order to remove the ground potential from the start conductor C1903 and apply the busy marking ground potential to the guard conductor C1902'. Since the operation of the detector 1900 has been started, however, it continues to operate until it has identified the number of the calling subscriber line. As a further result of the operation of relay R2110, at its contacts 2111, it connects the winding of the detection signal relay R2225 to the SB conductor C1901. The latter relay, however, will not be operated by the detector 1900 until the detector has been controlled over one of the party 1 to party 5 conductors in accordance with the position of the particular calling station on the calling party line.

In the previous description of the operation of the calling station identifying relays illustrated in Fig. 20, it was pointed out that these relays were operated in certain combinations in accordance with ground and loop impulses transmitted by the special calling devices provided at the second to the fifth substations on five-party lines. It was also pointed out that if the calling station is connected to an individual line, or is the first station on a five-party line, no station identifying ground impulses are transmitted and, consequently, all of the calling station identifying relays of Fig. 20 remained in their unoperated positions. It was also pointed out that the calling station identifying relays were selectively operated to apply a marking ground potential to any one of the party 1 to party 5 conductors in accordance with the position of the calling station on the different subscriber lines. Therefore, when the detector connect relay R1910 is operated it connects the various party conductors, noted above, to the conductors C1906 to C1909, inclusive, and C1909', and depending upon the position of the calling station on the calling line, one of the above-noted conductors is grounded. The ground potential applied to any one of the above conductors selectively controls the detector to determine the group of lines in which the detector must search to find and identify the directory number of the calling subscriber substation. As soon as the party marking is registered in the detector, over any one of the party conductors C1906 to C1909, inclusive, and C1909', it applies a ground potential to the SB conductor C1901 in order to operate the detection signal relay R2225.

The detection signal relay R2225, in its normal position, supplies the holding ground potential to the sleeve conductor of the calling line in order to retain certain of the switching apparatus in its operated position and in order to mark the calling line as busy to other switching apparatus having access thereto. More specifically, at its contacts 2227, the relay R2225 normally connects ground potential via the conductor C2125 extending to Fig. 11, conductor C473 extending to Fig. 5, wiper 458 of the director hunter 450, conductor C506, contacts 516 of the operated director test relay R510, conductor C446, line finder 440 and the wiper 436, conductor C431, line circuit 405, and the C conductor in the cable 404. The ground potential normally applied to the above circuit provides the holding ground potential for maintaining the line finder 440 in its operated position, for retaining the cut-off relay (not shown) in the line circuit 405 in its operated position, and for maintaining a busy marking ground potential on the C conductor in the cable 404 extending to the bank contacts of the various connectors in the exchange having access to the calling line.

However, as soon as detection signal relay R2225, operates as described above, it removes the direct ground potential from the above-traced circuit, at its contacts 2227, and at its contacts 2226, it applies the 70-volt positive booster battery to the above-mentioned circuit. This positive booster battery potential retains the line finder 440 and the line circuit 405 in their operated positions, and it also maintains the busy marking potential upon the C conductor in the cable 404. In addition to the foregoing, the 70-volt positive booster battery is also extended over an S lead, which is individual to the particular calling subscriber substation, to the detector 1900, illustrated in Fig. 19. In response to the booster battery potential applied to the above-described circuit, the detector 1900 operates, in the manner described in the above-mentioned Ostline application Serial No. 79,677, to register therein the thousands, hundreds, tens and units digit of the numerical portion of the directory number of the particular calling subscriber substation. When the detector 1900 has determined the digital value of the thousands digit of the calling subscriber number, the four WXYZ2 code marking conductors, schematically illustrated and designated C1930, will be marked in code form in accordance with the identified digit, and the digit will be registered in the WXYZ2 code storage relays in the call recorder 2000. The hundreds, tens, and units digits of the calling station directory number, as determined by the detector 1900, will also be transferred to and registered in the respective WXYZ3, WXYZ4, and WXYZ5 code storage register relays, in the manner noted above. In addition to the foregoing, the detector 1900 also marks the WXYZ1 code marking conductors in accordance with the exchange digit of the three digit office code identifying the particular exchange in which the calling line terminates. The digit identifying the calling exchange is registered in code form in the WXYZ1 code storage relays. At the conclusion of the operation of the detector, the last five digits of the calling subscriber directory number will be registered in the code storage relays WXYZ1 to WXYZ5, inclusive, in the call recorder 2000. The operated ones of the various code storage relays will be locked in their operated positions to the grounded conductor C2244.

When the detector 1900 has completed the identification of the calling substation directory number, it connects ground potential to the EB conductor C1904 in order to short-circuit the relay R2105. The latter relay is normally retained in its operated position by the seizure relay R750 in the controller 600 portion of the director. Consequently, when the relay R2105 restores to normal, at its contacts 2106, it now completes a circuit for operating the detection complete relay R2120, which may be traced from ground at the contacts 2235. The relay R2120 now locks itself in its operated position via its contacts 2123 to the grounded conductor C2244. As a further result of the operation of the relay R2120, at its contacts 2125, it interrupts the circuit for the detector test relay R2110. The latter relay now restores to normal and interrupts, at its contacts 2113, the circuit for the detector connect relay R1910. The latter relay now restores to normal and disconects the call recorder 2000 from the common detector 1900. At its contacts 2111, the relay R2110 also interrupts the circuit for the detection signal relay R2225 which also restores to normal and, at its contacts 2226 and 2227, substitutes the direct ground holding potential for the 700 volt positive booster battery applied to the conductor C2125. Although the relay R2105 may reoperate when the shunting ground potential is disconnected therefrom by the restoration of the relay R1910, it performs no further function at the present time inasmuch as the detection complete relay R2120 is now locked in its operated position.

As a further result of the operation of relay R2120, at its contacts 2121, it applies ground potential to the multiply connected contacts 4 to 23, inclusive, accessible to the wiper 1951; at its contacts 2122, it applies ground potential to the contact 2 accessible to the wiper 1951; and, at its contacts 2124, it interrupts the circuit for the detector start relay R2070. Finally, at its contacts 2126, the relay R2120 disconnects ground potential from the marking conductor X10 connected to the contact 2 accessible to the wiper 1955. Further operations of the call recorder 2000 will be initiated when the director has transmitted sufficient digits to include the toll ticket repeater 2300A in the telephone connection and has caused the connected ticket repeater to return a starting ground potential over the T conductor C885.

Before leaving the description of the operation of the call recorder 2000, it should be noted that the INC conductor C1905 is provided to cause the operation of the detection failure relay R2130 whenever the detector 1900 fails to find and register the number of the calling subscriber substation. The inability of the detector 1900 to detect a calling subscriber number is described in detail in the previously mentioned Ostline application Serial No. 79,677, and for the purpose of describing the detection failure condition, it will be assumed that the detector failed to identify the calling line and, as a result thereof, applied ground potential to the INC conductor C1905 in order to operate the relay R2130. Upon operating, the relay R2130, at its contacts 2132, locks itself to the grounded conductor C2244. It should be understood, however, that in response to a detection failure condition, the detection complete relay R2120 will not be operated. As a further result of the operation of the detection failure relay R2130, at its contacts 2133, it prepares a point in the circuit for applying ground potential to the conductor C883 extending to Fig. 8, in order subsequently to complete an operating circuit for the director release relay R780. Also, at its contacts 2134, the relay R2130 prepares a point in the circuit for applying ground potential to the R conductor C886 extending to Fig. 8, in order to prevent the director from transmitting further impulses to the switch train included in the partially completed connection. Further operations of the call recorder 2000 and other portions of the association director, as a result of a detection failure condition registered on the relay R2130, will be described hereinafter.

*Transmission of the items of record information*

Referring now to the schematic trunking diagram shown in Fig. 2, it will be seen that a call on any subscriber line will be extended via its associated line circuit, the finder 440A the primary selector 500A, and the director hunter 450A, to the director 300A. The director 300A is individually associated with the call recorder 2000A which in turn is controlled by the detector 1900A to register the calling station directory number. All of the digits of a called subscriber directory number, as dialed by the calling subscriber, are registered in the director and the translator 1300A is associated with the director, by means of the translator assigner 1000A, in order to register in the coder 1800 portion of the director the route digits for routing the telephone connection in the direction of the called destination. During the time that the detector 1900A is operating to detect the calling subscriber directory number, the director 300A is controlled, in the manner described above, to transmit the route digits to the primary selector 500A and the subsequent switches in the switch train. In the present call the first routing digit 4 transmitted by the director, controls the primary selector 500A to raise its wipers to the fourth level and to automatically select an idle toll ticket repeater, such as the ticket repeater 2300A. The second routing digit 8 transmitted by the director, controls the ticket repeater selector 2700A, associated with the selected ticket repeater, to raise its wipers to the eighth level and to automatically select an idle toll line to the EMpire 1 exchange by way of a repeater, such as the repeater 305. The remaining digits transmitted by the director are repeated over the selected toll line to the switching apparatus in the EMpire 1 exchange.

As soon as the above-mentioned connection is extended to the toll ticket repeater 2300A, it functions, in the manner described in the previously noted Ostline application, Serial No. 75,985, filed February 12, 1949, to return a battery potential over one of the incoming conductors included in the connection in order to signal the associated call recorder 2000A that it may start the code sending operation to be described hereinafter.

Referring now to Fig. 5, it will be assumed that battery potential returned from the ticket repeater 2300A is applied to the conductor C2306, and that it is further extended via the wiper 564 of the operated primary selector 500, contacts 524 and 515, conductor C502, wiper 454 of the director hunter 450, conductor C469 extending to Fig. 6, conductor C885 extending to Fig. 22, contacts 2236 of the operated start relay R2230, contacts 2143, and the lower winding of the code send relay R2140, to ground. The code send relay R2140 now operates in order to initiate the code sending operation of the call recorder 2000, whereby the registered items of record information, including the directory number of the calling subscriber substation and the directory number of the called subscriber substation, are transferred from the call recorder 2000 to the toll ticket repeater 2300A. The record information which is transferred to the toll ticket repeater 2300A is registered therein and made available, at the termination of the connection, to produce a record of the various items of information required in ticketing the present toll call.

When the code send relay R2140 operates, it locks itself in its operated position over a circuit including its upper winding, the contacts 2142, and the grounded conductor C2244. Also, at its contacts 2143, the relay 2140 disconnects its lower winding from the T conductor C885. Finally, at its contacts 2144, the relay R2140 completes a circuit for operating the rotary magnet RM1957 of the code send switch 1950. This circuit may be traced from ground via the code send switch off-normal contacts 2273, contacts 2262, 2144, and 1958, and the winding of the rotary magnet RM1957, to battery. The magnet RM1957 operates and then interrupts its own circuit, at its contacts 1958, whereupon the magnet restores to normal and advances its wipers 1951 to 1956, inclusive, from the normal resting position 26 into engagement with the contacts 1 in the associated contact banks. In response to the advancement of the wipers from position 26 to contact 1, the code send switch off-normal contacts 2273 are opened and the contacts 2274 are closed. It should be noted that the code send switch off-normal contacts 2274 remain closed as long as the wipers of the code send switch 1950 engage any one of the contacts 1 to 25, inclusive, and that the contacts 2273 are closed only when the wipers are in position 26 of the associated contact banks.

As soon as the contacts 2273 are opened, the initial operating circuit for the magnet RM1957 is interrupted and as soon as the contacts 2274 are closed, a circuit is completed via the contacts 2238 and 2263, and the winding of the pulse start relay R2260, to battery. The pulse start relay R2260 now operates and locks itself, via its contacts 2264, to the grounded conductor C2244 and simultaneously therewith, at its contacts 2263, it interrupts its initial operating circuit. As a further result of the operation of the pulse start relay R2260, at its contacts 2261, it completes a circuit via the contacts 2171 and 2151, and the upper winding of the code pulse relay R2150, to battery. The last-mentioned relay, upon operating, interrupts its initial operating circuit, at its contacts 2151, whereupon the relay slowly restores to normal and recompletes its operating circuit as soon as the contacts 2151 are again closed. The cyclic operation of the relay R2150 occurs at the rate of ten pulses per second under control of the variable discharge condenser connected to the local circuit including the lower winding of the relay. Therefore, the code pulse relay R2150 will continue to operate and restore at a predetermined rate as long as the circuit is completed for its upper winding.

As soon as the wipers 1951 to 1956, inclusive, of the code send switch 1950 engage the contacts 1 in the associated contact banks, the wiper 1954 connects the W6 code marking conductor to a circuit, including the winding of the mark relay R2210. The WXYZ6 and the WXYZ7 code marking conductors are connected, respectively, to the contacts 1 to 8, inclusive, accessible to the wiper 1954 and each of the marking conductors are connected to the terminal block TB1959. The two groups of WXYZ conductors are provided so that they may be marked in accordance with the tens and units digits identifying the particular call recorder 2000. In the present example, the WXYZ6 code marking conductors are marked in accordance with the tens digit 1 and the WXYZ7 code marking conductors are marked in accordance with the units digit 2. Therefore, the W6 and X6 code marking conductors are grounded to indicate the tens digit 1, and the W7 and Y7 code marking conductors are grounded to indicate the units digit 2. When the wiper 1954 engages the contact 1, the ground potential applied to the W6 code marking conductor is extended via the contacts 2176 and the winding of the mark relay R2210, to battery. The mark relay R2210 now operates and, at its contacts 2211, applies direct ground potential to the contacts 2152 of the code pulse relay R2150 in order to short-circuit the resistance ground potential normally applied to these contacts by way of the resistor 2154. Since the above-traced circuit for the mark relay R2210 is completed prior to the operation of the code pulse relay R2150, the first time the relay R2150 operates the direct ground potential, applied to its contacts 2152, is transmitted via the contacts 2236 and the T conductor C885, to the ticket repeater 2300A over the previously traced circuit whereby the ticket repeater controlled the initial operation of relay R2140. The toll ticket repeater 2300A is provided with code marking and stepping relays which are selectivity controlled either by direct ground or resistance ground impulses to register the various items of information transmitted thereto in the same manner as is described in the Ostline application, Serial No. 75,985. Since the schematically illustrated toll ticket repeater 2300A is exactly the same as the toll ticket repeater illustrated and described in the above-mentioned Ostline application, the description of the operation thereof will be omitted in the present application.

The first operation of the code pulse relay R2150 also completes, at its contacts 2153, an operating circuit for the magnet RM1957. At the end of the first pulse, the relay R2150 restores and, at its contacts 2152 it removes the ground pulse from the T conductor C885. At its contacts 2153, the relay R2150 interrupts the circuit for the magnet RM1957 which now restores to normal and advances its wipers from engagement with the contacts 1 into engagement with the contacts 2. In view of the above description, it will be understood that upon each operation of the code pulse relay R2150, either a direct ground or a resistance ground pulse will be transmitted over the T conductor C885 to the toll ticket repeater 2300A, and a pulse will also be transmitted to the magnet RM1957 in order to advance its wiper step-by-step over the associated contact banks. The transmission of a direct ground or a resistance ground pulse over the conductor C885 is determined in accordance with either the operated or the unoperated condition of the mark relay R2210. The operated or unoperated condition of the mark relay R2210, in turn, is governed in accordance with the particular code markings applied to the various code marking conductors accessible to the wiper 1954. It is in this manner that the various items of information stored in the call recorder 2000 and in the call register 1500 portion of the director are transmitted, in code form, to the ticket repeater 2300A.

The items of information picked up and transmitted as the wiper 1954 of the code send switch 1950 is rotated step-by-step over the contacts 1 to 25, inclusive, are as follows:

WIPER 1954 OF THE CODE SEND SWITCH 1950

| Contact Position | Code Marking | Information Transmitted |
|---|---|---|
| 1 | W6 | Identity of the Director Tens Digit. |
| 2 | X6 | |
| 3 | Y6 | |
| 4 | Z6 | |
| 5 | W7 | Identity of the Director Units Digit. |
| 6 | X7 | |
| 7 | Y7 | |
| 8 | Z7 | |
| 9 | W8 | Class of Calling Line {Class 1 if not Grounded. Class 2 if Grounded. |
| 10 | W17 | Charge Rate—Units Digit. |
| 11 | X17 | |
| 12 | Y17 | |
| 13 | Z17 | |
| 14 | W21 | Called Station Directory No. 1st Digit. |
| 15 | X21 | |
| 16 | Y21 | |
| 17 | Z21 | |
| 18 | W22 | Called Station Directory No. 2nd Digit. |
| 19 | X22 | |
| 20 | Y22 | |
| 21 | Z22 | |
| 22 | W23 | Called Station Directory No. 3rd Digit. |
| 23 | X23 | |
| 24 | Y23 | |
| 25 | Z23 | |
| 26 | ---------- | Stepping Pulse. |

From the foregoing table it will be understood that the tens digit 1 and the units digit 2 identifying the call recorder 2000 will be transmitted in code form to the ticket repeated 2300A as the wiper 1954 is advanced step-by-step over the contacts 1 to 8, inclusive. When the wiper 1954 engages the contacts 9 terminating the W8 code marking conductor C708 extending to Fig. 6, the class of the particular calling line will be transmitted and registered in the toll ticket repeater 2300A. The W8 code marking conductor C708 will normally be grounded if a class 2 line is calling and it will not be grounded if a class 1 line is calling. Consequently, a resistance ground code pulse indicative of a class 1 calling line will be transmitted over the T conductor C885 if the mark relay R2210 is not operated, and a direct ground code pulse indicative of a class 2 line will be transmitted over the T conductor C885 if the mark relay R2210 is operated. It may be well to mention at this time that inasmuch as the class 3 subscriber lines are of the paystation type, toll calls cannot be automatically ticketed. In other words, the director is arranged to deny automatic toll ticketing service to paystation lines. Consequently, the W8 code marking conductor C708 may be grounded or not grounded to respectively indicate a class 2 or a class 1 calling line, and since only these two classes of lines may utilize the toll ticketing facilities it is not necessary to provide an additional marking to include class 3 paystation lines.

When the wiper 1954 is successively advanced over the contacts 10 to 13, inclusive, the units digit of the rate of charge for the connection will be transmitted to the toll ticket repeater 2300A. The WXYZ17 code marking conductors in the cable C1850 terminate respectively on the contacts 10 to 13 accessible to the wiper 1954 and they are marked in code form in accordance with the units digit of the rate of charge for a call from a calling subscriber in the FLorida 3 exchange to a called subscriber in the EMpire 1 exchange. As previously indicated, the WXYZ17 code marking conductors in the cable C1850 are marked by the operated rate register relays WXYZ17 provided in the coder 1800 portion of the director. In the present example it may be assumed that the units digit 1 of the rate of charge 01 is registered in the above-noted register relays and that, as a result thereof, the W17 and X17 code marking conductors are marked with ground potential. Therefore, if the wiper 1954 is advanced over the contacts 10 to 13, inclusive, the mark relay R2210 and the code pulse relay R2150 will co-operate to transmit in code form to the toll ticket repeater 2300A, the units digit 1 of the rate of charge for the call.

The next three items of record information to be transmitted from the call recorder to the ticket repeater are the first, second and third code digits of the called subscriber directory number as registered in the first, second and third code registers 1520, 1530 and 1540 in the call register 1500 portion of the director. Consequently, the WXYZ21, the WXYZ22 and WXYZ23 code marking conductors connected respectively to the contacts 14 to 25, inclusive, accessible to the wiper 1954 are marked by the above-noted code registers in accordance with the digits 361 identifying the EMpire 1 exchange. The WXYZ21 to WXYZ23 code marking conductors are included in the cable C2012 extending to Fig. 16, and they are connected respectively to the bank contacts accessible to the wipers 1524 and 1525 of the second register 1520, the wipers 1534 and 1535 of the second code register 1530, and the wipers 1544 and 1545 of the third code register 1540. Therefore, as the wiper 1954 of the code send switch 1950 advances step-by-step over the contacts 14 to 25, inclusive, the marking relay R2210 and the code pulse relay R2150 will cooperate in the manner previously described to transmit in code form the digits 361, registered in the code registers of the call register 1500, to the toll ticket repeater 2300A.

During the first cycle of operation of the code send switch 1950, the wipers 1951, 1952, 1953, 1955 and 1956 perform no operating controls in the call recorder 2000, but the wiper 1954 is effective during the 25 steps of the first cycle of operation to transmit the above-noted items of information to the toll ticket repeater 2300A. During the time that the wipers of the code send switch 1950 are advancing step-by-step through the first cycle of operation, the ground potential at the code send switch off-normal contacts 2274 retains the second cycle auxiliary R2240 in its operated position over a circuit which includes the contacts 2238, 2265 and 2175, and the winding of the relay R2240. Accordingly, the relay R2240 is retained in its operated position during the first cycle of operation of the code send switch 1950 and as soon as the wipers thereof are advanced into engagement with the contacts 26, the off-normal contacts 2274 are opened and the off-normal contacts 2273 are closed. The contacts 2274 interrupt a point in the original operating circuit for the relay R2240, but simultaneously therewith a locking circuit is completed for the relay which includes its contacts 2241, the winding of the wiper switching relay R2170, and the grounded conductor C2244. The wiper switching relay R2170 operates in series with the relay R2240 and, at its contacts 2172, it connects the code pulse relay R2150 to the wiper 1951 of the code send switch 1950. Also, at its contacts 2177, the relay R2170 connects the mark relay R2210 to the wiper 1955 of the code send switch 1950. In view of the foregoing, it will be understood that the wiper switching relay R2170, places the code pulse relay R2150 under control of ground potential applied to the contacts accessible to the wiper 1951 and it transfers the mark relay R2210 from the wiper 1954 to the wiper 1955 of the code send switch 1950. During the second cycle of rotation of the wipers of the code send switch 1950, a test will be made for code marking potentials applied to the conductors terminating in the bank contacts accessible to the wiper 1955.

When the code send switch 1950 advances its wipers from the contacts 25 into engagement with the contacts 26, as noted above, ground potential is also extended via the wiper 1951 in engagement with its contact 26, the contacts 2221, 2172 and 2151, and the upper winding of the code pulse relay R2150, to battery. As soon as the code pulse relay R2150 operates, it completes, at its contacts 2153, an obvious circuit for operating the rotary magnet RM1957. Also, in response to the operation of the pulse relay R2150, at its contacts 2151 it interrupts its operating circuit and restores to normal, in the manner previously described. At its contacts 2153, the relay

R2150 now interrupts the circuit for the magnet RM1957 which also restores to normal and advances the wipers of the code send switch 1950 from engagement with the contacts 26 into engagement with the contacts 1. As a further result of the momentary operation of the code pulse relay R2150, at its contacts 2152, it transmits a resistance ground pulse over the T conductor C885 to the toll ticket repeater 2300A in order to cause a stepping switch thereat to remain in synchronism with the stepping of the wipers of the code send switch 1950. As a further result of the advancement of the wipers of the code send switch 1950 from engagement with the contacts 26 into engagement with the contacts 25, the off-normal contacts 2274 are again closed in order to complete a circuit via the contacts 2238, 2265, 2174 and 2224, in order to operate the third cycle auxiliary relay R2250.

The code send switch 1950 is now conditioned to transmit the various items of record information marked in code form on the marking conductors terminating in the bank contacts 2 to 25, inclusive, accessible to the wiper 1955. These items of record information are transmitted to the toll ticket repeater 2300A in substantially the same manner as has been described above in connection with the step-by-step rotation of the wiper 1954 of the code send switch 1950. It should be noted, however, that the circuit for the pulse relay R2150 is controlled during the second cycle of the code send switch 1950 by ground potential applied to the contacts accessible to the wiper 1951.

The items of record information picked up and transmitted as the wiper 1955 of the code send switch 1950 is rotated step-by-step over the contacts 1 to 25, inclusive, during the second cycle, are as follows:

WIPER 1955 OF CODE SEND SWITCH 1950

| Contact Position | Code Marking | Information Transmitted |
|---|---|---|
| 1 | ---------- | Stepping Pulse. |
| 2 | X10 | Detector Failure—If Grounded. |
| 3 | Y18 | Charge Rate {Tens Digit "0" if not Grounded. / Tens Digit "1" if Grounded. |
| 4 | W1 | Calling Station Directory No. 3rd Digit. |
| 5 | X1 | |
| 6 | Y1 | |
| 7 | Z1 | |
| 8 | W2 | Calling Station Directory No. 4th Digit. |
| 9 | X2 | |
| 10 | Y2 | |
| 11 | Z2 | |
| 12 | W3 | Calling Station Directory No. 5th Digit. |
| 13 | X3 | |
| 14 | Y3 | |
| 15 | Z3 | |
| 16 | W4 | Calling Station Directory No. 6th Digit. |
| 17 | X4 | |
| 18 | Y4 | |
| 19 | Z4 | |
| 20 | W5 | Calling Station Directory No. 7th Digit. |
| 21 | X5 | |
| 22 | Y5 | |
| 23 | Z5 | |
| 24 | W24 | Called Station Directory No. 4th Digit. |
| 25 | X24 | |
| 26 | ---------- | Stepping Pulse. |

When the wiper 1955 of the code send switch 1950 is in engagement with the contact 1, no circuit is completed for operating the mark relay R2210 and therefore the code pulse relay R2150 applies an additional resistance ground pulse to the T conductor C885, in order to transmit another synchronizing stepping pulse to the toll ticket repeater 2300A. At the end of the pulse the wipers of the code send switch 1950 are stepped from the contacts 1 into engagement with the contacts 2. In this position, the wiper 1955 again prepares a point in the circuit for controlling the mark relay R2210, and the wiper 1951 completes the previously traced circuit for operating the code pulse relay R2150. If the detector 1900 has failed, for some reason or other, the detection complete relay R2120 will not be operated and, consequently, a direct ground potential will be connected via its contacts 2126 to the X10 code marking conductor, and then via the wiper 1955 in order to complete the previously traced circuit for operating the mark relay R2210. If the mark relay R2210 is operated as a result of a detector failure condition, a direct ground pulse is transmitted over the T conductor, C885 to the toll ticket repeater 2300A, and it will cause the latter circuit to connect the calling subscriber line to an intercepting operator position. However, if the detection complete relay has been operated, no ground potential will be applied to the X10 code marking conductor. Therefore, the mark relay R2210 will not operate and the code pulse relay R2150 will transmit the resistance ground pulse to the ticket repeater 2300A in order to retain the rotary switch in the ticket repeater 2300A in synchronism with the code send switch 1950. The code pulse relay R2150 also causes the wipers of the code send switch 1950 to be advanced from the contacts 2, into engagement with the contacts 3.

When the wiper 1955 engages the contact 3, a circuit is prepared for operating the mark relay R2210, depending upon whether or not the tens digit rate relay R2270 is operated to apply ground potential to the Y18 code marking conductor. As previously noted, the charge rate for the present call is the rate 01 and, consequently, the tens digit rate relay R2270 will not be in its operated position. Therefore, no ground potential will be applied to the Y18 code marking conductor and the mark relay R2210 will not be operated. Consequently, the code pulse relay R2150 will transmit a resistance ground pulse over the T conductor C885 and it will transmit a stepping pulse to the magnet RM1957. A resistance ground pulse transmitted over the T conductor C885 to the ticket repeater 2300A will indicate that the tens digit of the rate of the present call is the digit 0, which digit will be registered in the toll ticket repeater. It should be noted, however, if the charge rate for the call described is any rate from 10 to 19, inclusive, the tens digit rate relay R2270 will be operated by the appropriate translator relay in the translator 1300. In the latter event the contacts 2271 will be closed in order to apply ground potential to the Y18 code marking conductor and thus complete the operating circuit for the mark relay R2210. The mark relay R2210 will cause the code pulse relay R2160 to transmit a direct ground pulse instead of a resistance ground pulse to the ticket repeater, thereby to cause the registration of the tens digit 0 for the rate of charge for a call. In response to the restoration of the code pulse relay R2150, the wipers of the code send switch 1950 will be advanced from the contacts 3 into engagement with the contacts 4.

Contacts 4 to 23, inclusive, accessible to the wiper 1955 are respectively connected to the WXYZ1 to WXYZ5, inclusive, code marking conductors extending to the correspondingly designated code storage relays. These relays have been operated to register therein the calling exchange digit 3 of the calling FLorida 3 exchange code and the four numerical digits of the numerical portion of the calling subscriber directory number as determined by the detector 1900. As the wipers of the code send switch 1950 are advanced step-by-step over the contacts 4 to 23, inclusive, under control of the code pulse relay R2150, the wiper 1955 successively tests the various code marking conductors in order to complete the circuit for controlling the mark relay R2210. Therefore, as the respective contacts are engaged by the wiper 1955, either a resistance ground pulse or a direct ground pulse will be transmitted over the T conductor C885, thereby to transfer the digits registered in the WXYZ1 to the WXYZ5 code storage relays to the toll ticket repeater 2300A in the manner described hereinbefore.

When the wiper 1951 of the code send switch 1950 is in engagement with the contacts 24 and 25, the operating ground potential for controlling the pulse relay R2150 will be supplied from the conductor C970 extending to Fig. 9. However, this conductor will be grounded only in the event a digit has been registered in the first numerical register 1610 of the call register 1500 and has caused the operation of the first numerical send relay R940 in the controller 600 portion of the director. If ground potential is applied to the above-noted conductor to indicate that the first numerical digit has been registered, the code pulse relay R2150 will again operate and restore in order to control the stepping of the wipers of the code send switch 1950 from engagement with the contacts 24 into engagement with the contacts 25. The contacts 24 and 25 accessible to the wiper 1955 terminate, respectively, the W24 and the X24 code marking conductors extending to the first numerical register 1610 in the call register 1500. Inasmuch as it has been assumed that the first digit of the numerical portion of the called subscriber number is the digit 1, the W24 and X24 code marking conductors will have a direct ground potential applied thereto. Consequently, during the stepping of the wiper 1955 over the contacts 24 and 25 the mark relay R2210 will be operated so that two direct ground pulses will be transmitted by the code pulse relay R2150 over the T conductor C885 to the ticket repeater 2300A to register therein the digit 1.

When the wipers of the code send switch 1950 are in engagement with the contacts 25, the next restoration of the code pulse relay R2150 will control the magnet RM1957 to advance the wipers into engagement with the contacts 26. In this position the code send switch off-normal contacts 2274 are again controlled, thereby to interrupt a point in the initial operating circuit for the third cycle auxiliary relay R2250. As soon as the above circuit is interrupted, the relay R2250 locks itself in its operated position over a circuit, including its contacts 2251, the winding of the wiper switching relay R2220, and the grounded conductor C2244. When the last-mentioned circuit is completed, the wiper switching relay R2220 operates and, at its contacts 2221, disconnects the code pulse relay R2150 from the wiper 1951. At its contacts 2222, the relay R2220 connects the code pulse relay R2150 to the wiper 1952. Also, at its contacts 2225, the relay R2220 disconnects the mark relay R2210 from the wiper 1955 and, at its contacts 2226, it connects the mark relay R2210 to the wiper 1956. From the foregoing it will be seen that the wiper switching relay R2220 transfers the circuit for controlling the mark relay R2210 from the wiper 1955 to the wiper 1956 and that it also transfers the control circuit for the code pulse relay R2150 from the wiper 1951 to the wiper 1952. In this manner, the call recorder 2000 is conditioned to operate the code send switch 1950 through its third cycle of operation, whereby the information stored in code form and marked on the bank contacts accessible to the wiper 1956 may be transferred to the toll ticket repeater 2300A.

The items of record information picked up and transmitted as the wiper 1956 of the code send switch 1950 is rotated step-by-step over the contacts 1 to 15, inclusive, during the third cycle are as follows:

WIPER 1956 OF CODE SEND SWITCH 1950

| Contact Position | Code Marking | Information Transmitted |
|---|---|---|
| 1 | Y24 | Called Station Directory No. 4th Digit. |
| 2 | Z24 | |
| 3 | W25 | Called Station Directory No. 5th Digit. |
| 4 | X25 | |
| 5 | Y25 | |
| 6 | Z25 | |
| 7 | W26 | Called Station Directory No. 6th Digit. |
| 8 | X26 | |
| 9 | Y26 | |
| 10 | Z26 | |
| 11 | W27 | Called Station Directory No. 7th Digit. |
| 12 | X27 | |
| 13 | Y27 | |
| 14 | Z27 | |
| 15 | X9 | 6 Digit Called No. {Indicates 7 Digit No. if Not Grounded. Indicates 6 Digit No. if Grounded. |

When the wiper 1952 of the code send switch 1950 engages the contact 26, ground potential thereon is applied via the contacts 2222, 2172, and 2151 in order to again complete the circuit for operating the code pulse relay R2150. The code pulse relay R2150 now operates and restores, in the manner previously described, in order to transmit a resistance ground stepping pulse to the toll ticket repeater, and also to transmit a stepping pulse to the magnet RM1957. The wipers of the code send switch 1950 are now advanced into engagement with the contacts 1 in order to begin the third cycle of operation of the code send switch 1950.

The Y24 and Z24 code marking conductors which terminate respectively in the contacts 1 and 2 accessible to the wiper 1956 extend to the first numerical register 1610 of the call register 1500 but, as previously noted, these conductors are not marked at the present time since the digit 1 is registered in the first numerical register 1610. Consequently, the mark relay R2210 will not be operated as the wiper 1956 is advanced over its contacts 1 and 2. In this connection it should be noted that the ground potential applied to the conductor C970 by the first numerical send relay R940 completes the circuit, including either the contact 1 or the contact 2 engaged by the wiper 1952, for controlling the pulse relay R2150. Therefore, the code pulse relay R2150 will transmit two pulses to the magnet RM1957 in order to advance the wipers over the contacts 1 and 2 during the third cycle of operation. Since the Y24 and Z24 code marking conductors are not grounded, the mark relay R2210 will remain in its unoperated position and the code pulse relay R2150 will also transmit two resistance ground impulses over the T conductor, C885. At the end of the second pulse, the wipers of the code send switch 1950 will be advanced from contacts 2 into engagement with the contacts 3.

Contacts 3 to 14, inclusive, accessible to the wiper 1956 terminate respectively the code marking conductors WXYZ25 to WXYZ27, inclusive, which conductors are respectively marked, in code form, in accordance with the last three digits of the called subscriber number registered in the second, third and fourth numerical registers 1620, 1630 and 1640 of the call register 1500. In order to control the subsequent pulses transmitted by the code pulse relay R2150, each of the last-mentioned digits must be registered in the call register 1500 before it can be transferred to the ticket repeater 2300A. More specifically, when the wiper 1952 disengages the contact 2, during the third cycle of operation, the operating ground potential applied to the conductor C970 is disconnected from the circuit including the code pulse relay R2150. When the wiper 1952 engages the contact 3, ground potential must be applied to the conductor C971 before the pulse relay R2150 can reoperate to transfer the digit registered in the second numerical register 1620. However, ground potential will be applied to the conductor C971, by the operation of the second numerical send relay R950, only in the event that a digit has been registered in the second numerical register 1620. As soon as the digit is registered, ground potential is applied by way of the conductor C971 to the multiply connected contacts 3 to 6, inclusive, and then via the wiper 1952 to the code pulse relay R2150.

In view of the foregoing it will be understood that the ground potential applied to the conductor C971 will control the code relay R2150 to operate and restore in the manner previously described in order to advance the wipers of the code send switch 1950 step-by-step over the contacts 3 to 6, inclusive, and also in order to transfer, in code form, the digit registered in the second numerical register 1620 to the ticket repeater 2300A. During the stepping of the wiper 1956 over the contacts 3 to 6, inclusive, the mark relay R2210 will be controlled to transmit direct ground pulses in place of resistance ground pulses in accordance with the code-markings applied to the WXYZ25 code marking conductors.

At the conclusion of the transmission of the digit registered in the second numerical register 1620, the wipers of the code send switch 1950 are advanced from the contacts 6 into engagement with the contacts 7. In this position the wiper 1952 engages the first of the four contacts connected to the conductor C973. The conductor C973 will be grounded only in the event that the third digit of the numerical portion of the called subscriber directory number has been registered in the third numerical register 1630 of the call register 1500 and has caused the operation of the third numerical send relay R960. If the conductor C973 is grounded to indicate that the third digit has been registered, the code pulse relay R2150 is controlled, in the manner previously described, to advance the wipers of the code send switch 1950 step-by-step over the contacts 7 to 10, inclusive, of the associated contact banks. As the wiper 1956 is advanced step-by-step over the above-noted contacts, the digit registered in the third numerical register 1630 and marked in code form on the WXYZ26 code marking conductors is transferred to the ticket repeater 2300A by means of the direct ground and resistance ground pulses transmitted over the T conductor C885 under control of the mark relay R2210 and the code pulse relay R2150, in the manner previously described.

When the wipers of the code send switch are advanced from engagement with the contacts 10, the pulsing circuit for the code pulse relay R2150 is again interrupted at the wiper 1952 and when the latter wiper engages the contact 11 a test is made to determine whether or not a digit has been registered in the fourth numerical register 1640. If a digit has been registered in the numerical register 1640, the fourth numerical send relay R990 will be in its operated position and ground potential will be applied to the conductor C987 terminating in the contacts 11 to 15, inclusive, accessible to the wiper 1952. This ground potential will cause the relay R2150 to again advance the wipers of the code send switch 1950 over the contacts 11 to 14, inclusive, whereby the code pulse relay R2150 and the mark relay R2210 will function, in the manner previously described, to transmit the digit registered in the fourth numerical register 1640 and marked in code form on the WXYZ27 code marking conductors over the T conductor C885.

When the pulse relay R2150 restores to normal to advance the wipers of the code send switch 1950 from the contacts 14, into engagement with the contacts 15, the wiper 1956 connects the mark relay R2210 to the X9 code marking conductor. This conductor is connected to the contacts 2165 of the two-digit code relay R2160. Inasmuch as the call being described is extended to an exchange having a three-digit office code, the two-digit code relay R2160 will be in its restored position. Therefore, the mark relay R2210 will not be operated when the wiper 1956 engages the contact 15 during the third cycle of operation. The code pulse relay R2150 will now operate, as a result of the ground potential applied to the contact 15 engaged by the wiper 1952, to transmit a resistance ground pulse over the T conductor C885 to the toll ticket repeater 2300A, and to transmit a stepping pulse to the magnet RM1957. The resistance ground pulse transmitted over the T conductor C885 to the toll ticket repeater 2300A will indicate that the called subscriber directory number includes three code digits and four numerical digits. It should be noted, however, that if the called number includes two code digits and four numerical digits, the two-digit code relay R2160 will be in its operated position and it will control the mark relay R2210 so that a direct ground pulse will be transmitted over the T conductor C885 to the toll ticket repeater 2300A to indicate that the called subscriber directory number includes only six digits.

In either event, when the code pulse relay R2150 restores, the wipers of the code send switch 1950 will be advanced from the contacts 15 into engagement with the contacts 16. At this time the wiper 1952 interrupts the previously traced circuit for controlling the code pulse relay R2150 in order to prevent an additional pulse from being transmitted by the latter relay. However, the wiper 1953 is now in engagement with the contacts 16 in the associated contact bank and it completes a circuit for controlling the sender switch 1660 in the director to send out the digit registered in the fourth numerical register 1640. This circuit may be traced from ground at contacts 2173 of the operated wiper switching relay R2170, wiper 1953 and the engaged contact 16, contacts 2223, 2164 and 2233, conductor C986 extending to Fig. 9, contacts 991 of the operated fourth numerical send relay R990, conductor C985 extending to Fig. 16, contact 13 engaged by the wiper 1653, conductor C892 extending to Fig. 8, contacts 864, winding of the pulse control relay R870, and the resistor 879, to battery. The relay R870 operates when the above-traced circuit is completed and controls the sender switch 1660, in the manner previously described, to transmit the numerical impulses corresponding to the digit registered in the fourth numerical register 1640.

The transmission of the last digit by the impulse sender 1660 controls the last impulse receiving switch in the switch train to select the terminals of the particular called subscriber line in the EMpire 1 exchange and to signal the subscriber thereon in a conventional manner. The principal reason for preventing the sender switch 1660 from transmitting the last digit of the called number until all of the items of record information have been transferred to the toll ticket repeater 2300A is to eliminate the possibility of a called subscriber answering a call during the period of time that the items of record information are being transmitted from the call recorder 2000 to the ticket repeater 2300A.

From the foregoing it will be seen that when the code send switch 1950 has completed the first, second and third cycles of operation, all of the items of record information will be transferred to the toll ticket repeater 2300A and the directors will be controlled to transmit the last digit to complete the connection to the called line. The subsequent release of the call recorder 2000 is controlled in response to the removal of the holding ground potential from the conductor C725 by the controller 600 portion of the director.

In the previous description of the operation of the director it was pointed out that the director release relay R780 is operated after all of the switch controlling impulses have been transmitted. It was also pointed out that during the release of the director, the seizure relay R750 in the controller 600 restores to normal and, at its contacts 757, removed ground potential from the conductor C725 extending to Fig. 22. In the call recorder 2000, the removal of ground potential from the conductor C725 causes various operated relays, including the start relay R2230, to restore to normal. As soon as the start relay R2230 restores to normal, the ground potential, at the contacts 2234, is removed from the conductor C2244 thereby to cause the restoration of various other operated relays in the call recorder 2000. At its contacts 2235, the relay R2230 interrupts the locking circuit for the relay R2270 and, at its contacts 2239, it completes a circuit including the off-normal contacts 2274 and the contacts 1958 for controlling the rotary magnet RM1957. The magnet RM1957 is self-interruptedly operated over the above-traced circuit to advance its wipers step-by-step, from the contacts 16, over the remaining contacts in the associated contact banks until they reach the contacts 26. In this position, the off-normal contacts 2274 are opened in order to terminate the stepping circuit for the magnet RM1957. The call recorder 2000 is now fully restored to normal.

*Toll calls from the FLorida 3 exchange to the CHase exchange*

The majority of the telephone exchanges included in the present telephone system are identified by a three-digit code comprising the first two letters of the exchange name and a digit identifying the particular exchange. In attempting to provide a universal numbering scheme in which all of the exchanges in the system may be identified by a three-digit code, it is necessary at times to retain the old numbering scheme for one or more of the exchanges which may, for example, have a two-digit code designation comprising only the first two letters of the exchange name. In the present system, the CHase exchange is identified by the two-digit code 2 and 4, which corresponds, respectively, to the letters C and H of the exchange name. The individual subscriber stations included in the CHase exchange are identified by the conventional four-digit number. It has also been found that during a conversion period it may be necessary in one of the exchanges to have some of the subscriber directory numbers include seven digits, while other subscriber directory numbers include six digits. For example, the seven-digit subscriber numbers in the CHase exchange would be identified by the first two letters of the exchange name, a third digit 7 identifying CHase 7 exchange, and four numerical digits identifying the subscriber substations; whereas the six-digit subscriber numbers in the same CHase exchange would be identified by the first two letters of the exchange name followed by the four numerical digits. Consequently, this particular exchange would be identified as the CHase exchange for all subscriber substations having six-digit numbers, and it also would be identified as the CHase 7 exchange for all subscriber substations having seven digit numbers.

It will be apparent from the foregoing discussion that the first three digits of certain of the six-digit subscriber numbers may be the same as the first three digits of all of the seven-digit subscriber numbers. For example, a subscriber in the CHase exchange may have a six-digit directory number such as CHase 7234 (24–7234), and another subscriber may have a seven-digit directory number such as CHase 7–5234 (247–5234). Accordingly, some provision must be made in the directors provided in the FLorida 3 exchange for completing telephone connections to the desired called subscriber substations in the CHase exchange regardless of the fact that the first three digits of both six-digit and seven-digit called numbers may be identical. Since the directors in the present system are arranged to translate the first three digits of the called subscriber directory numbers into appropriate routing digits by utilizing the common translator, the same translation will be made when the first three digits registered therein are identical for either six or seven-digit called numbers. In the present director, the same translation is made each time the first three digits 247 of either a six-digit or a seven-digit directory number is registered in the call register 1500 of the director and the call will be routed to the CHase exchange as though it is to be completed as a six-digit number. However, if a seventh digit is registered in the call register by the calling subscriber, the director is controlled to automatically route the call as a seven-digit number instead of a six-digit number.

In order to fully describe the above arrangement, it will be assumed that a call is initiated by the subscriber TS1–3 and that the calling subscriber line is connected to the director illustrated in the drawings in the manner previously described. It will also be assumed that the calling subscriber dialed the digits 24–7234, of the directory number CHase 7234 identifying a subscriber in the CHase exchange having a six-digit number. From the previous description of the operation of the director it will be understood that the called office code digits 24, corresponding to the first two letters of the CHase exchange name, will be registered in the first and second code registers 1520 and 1530 in the call register 1500 and that the four numerical digits 7234 will be registered, respectively, in the third code register 1540, the first numerical register 1610, the second numerical register 1620, and the third numerical register 1630. No digit will be registered in the fourth numerical register 1640. The first digit 2 registered in the first code register 1520 will select the wiper 1201 of the switch 1200; the second digit 4 registered in the second code register 1530 will control the vertical magnet VM1210 of the switch 1200 to raise the wipers 1201 to 1208, inclusive, to a position opposite the fourth level of the associated contact banks; and the first numerical digit 7, of the six-digit called subscriber number, registered in the third code register 1540 will control the rotary magnet RM1211 of the switch 1200 to rotate the wipers 1201 to 1208, inclusive, into engagement with the seventh contact in the associated contact banks. As a result of the above-described operation of the switch 1200, the wiper 1201 thereof is rendered effective to complete a circuit, including the conductor C1245A, for operating a particular translator relay in the translator 1300 corresponding to the code digits 247 and corresponding to the class of the calling line.

For the purpose of this description it will be assumed that the calling subscriber line is of the class 2 type and that the particular operated translator relay in the translator 1300 causes the registration of the digit 4 in the first route register of the coder 1800; that it causes the registration of the digit 5 in the second route register of the coder 1800; that it registers the digit 5 of the rate 05 in the rate register of the coder 1800. Also, the particular operated translator relay in the translator 1300 will ground both the TB and TC control conductors in order to operate the TB and TC control relays R1885 and R1880 in the coder 1800. Finally, the particular operated translator relay will ground the AB toll conductor extending to the coder 1800 in order to complete a circuit over the conductor C2242 for operating the start relay R2230 in the call recorder 2000.

In the coder 1800, the TB and TC control relay R1885 and R1880 lock themselves in their operated position, via the respective contacts 1886 and 1881, to the grounded conductor C787A. At this point, it may be well to note that the TB control relay R1885, at its contacts 1887, disconnects the conductor C1839 from the skip common conductor C1831, whereas the TA control relay R1890, in its restored position, connects the conductors C1837 and C1838 to the skip common conductor C1831. The three conductors C1837 to C1839 are connected to the bank contacts accessible to the wiper 1654 of the send sequence switch 1650 and, as previously noted, these conductors are tested during the step-by-step advancement of the wipers of the send sequence switch 1650 to determine whether or not the digits registered in the code registers 1520, 1530 and 1540 should be transmitted during the setting up of the connection. In the present example, the digits 2 and 4 registered in the first and second code registers 1520 and 1530 will be skipped, due to the fact that the TA control relay R1890 is in its normal position, and the first numerical digit 7 registered in the third code register 1530 will be transmitted by the director, after the transmission of the first and second routing digits 4 and 5 inasmuch as the TB control relay R1885 is in its operated position.

The TC control relay R1880, in its operated position, performs two separate controls. At its contacts 1882, the relay R1880 applies ground potential to the conductor C2167 extending to Fig. 21, in order to operate the two-digit code relay R2160 in the call recorder 2000. In other words, the call recorder 2000 is controlled immediately so that it will function during its remaining operations to set up the connection as a six-digit number. Also, at its contacts 1883, the TC control relay R1880 connects the conductor C1843 to the skip common conductor C1831 to cause the send sequence switch 1650 to skip the fourth numerical register 1640. In a six-digit call, the fourth numerical register 1640 is not operated, but it is necessary to skip that register and advance the wipers of the send sequence switch 1650 into engagement with the contacts 14 in the associated contact banks, in order to operate the director release relay R780 and initiate the release of the director after it has transmitted the sixth numerical digit of the six-digit number registered in the third numerical register 1630.

After the above described operations have been performed by the translator 1300, the translation complete relay R810 is operated to initiate the operation of the director whereby the sender switch 1600 and the send sequence switch 1650 cooperate to transmit the routing digits 45 registered respectively in the first and second route registers of the coder 1800 and then the digits 7234 registered respectively in the third code register 1540, the first numerical register 1610, the second numerical register 1620, and the third numerical register 1630, in order to complete the connection to the desired called subscriber in the CHase exchange having the six-digit directory number CH–7234.

During the setting up of the connection, the call recorder 2000 will be controlled, in the manner previously described, to transmit to the toll ticket repeater 2300A, the various items of record information registered in the code storage relays of the call recorder 2000 and in the registers of the call register 1500.

Since there is no digit registered in the fourth numerical register 1640 of the call register 1500, the fourth numerical send relay R990 remains in its restored position and, at its contacts 994, prevents the application of ground potential to the conductor C987 extending to Fig. 20 and terminating in the contacts 11 to 15, inclusive, accessible to the wiper 1952. From the previous description of the operation of the call recorder 2000 it will be understood that ground potential must be retained on the contacts 11 to 15 accessible to the wiper 1952 in order to advance the wipers of the code send switch 1950 into engagement with the contacts 16. In order to automatically advance the wipers of the code send switch 1950 over the contacts 11 to 15, inclusive, when no digit is registered in the fourth numerical register 1640 on a six-digit call, the contacts 11 to 15 accessible to the wiper 1952 are grounded by the two-digit code relay R2160. Accordingly, the two-digit code relay R2160, at its contacts 2161, will complete a circuit for applying ground potential to the contacts 11 to 15, inclusive, accessible to the wiper 1952 whenever a six-digit called number is registered in the call register 1500. This circuit may be traced from ground potential applied to the wiper 1654 of the send sequence switch 1650 when the latter wiper is in engagement with the contact terminating the conductor C1842 extending to Fig. 17, and then via the conductor C2168 extending to Fig. 21, contacts 2161 of the operated two-digit code relay R2160, contacts 11 to 15 accessible to the wiper 1952, contacts 2222, 2172 and 2151, and the winding of the code pulse relay R2150, to battery. Consequently, the code pulse relay R2150 will advance the wipers of the code send switch 1950 step-by-step over the contacts 11 to 15, inclusive, and simultaneously therewith, it will transmit synchronizing resistance ground impulses over the T conductor C885 to the toll ticket repeater 2300A. When the wiper 1956 of the code send switch 1950 engages contact 15, the two-digit code relay R2160, at its contacts 2165, applies direct ground potential to the X9 code marking conductor in order to operate the mark relay R2210, in the manner previously described, so that a direct impulse instead of a resistance ground impulse is transmitted over the T conductor C885 to register the two-digit called office code indication in the ticket repeater 2300A. The remaining operations, whereby the call recorder 2000 and the director are released from the telephone connection, are performed in the manner previously described.

In the above description of operation it was assumed that the calling subscriber dialed a six-digit number comprising the digits 24–7234 corresponding to the directory number of the CHase 7234 subscriber. It will now be assumed that the calling subscriber dials the digits 247–5234 of the directory number of the CHase 7–5234 subscriber. Consequently, the seven digits, 247–5234, will be registered, respectively, in the code and numerical registers 1520, 1530 and 1540, 1610, 1620, 1630 and 1640 of the call register 1500. Inasmuch as the first three digits 247 that are registered are the same as the first three digits of the six-digit called number described above, the switch 1200 will operate, in the manner previously described, to connect the wiper 1201 thereof with the contact in the associated contact bank terminating the conductor C1245A, in order to operate the same translator relay in the translator 1300. In other words, at this stage of the registration of the called number, the director cannot determine whether the call is to be completed to a six-digit or a seven-digit called subscriber substation in the CHase exchange. The selected translator relay will, therefore, register the digits 45 in the first and second route registers of the coder 1800; it will operate the TB and TC control relays R1885 and R1880; it will register the units digit 5 of the rate 05 in the rate register of the coder 1800, and it will cause the operation of the start relay R2230 in the call recorder 2000, all in the manner previously described. It should be noted, however, that the TC control relay R1880, at its contacts 1882, again completes the circuit for operating the two-digit code relay R2160 in the call recorder 2000. With the coder 1800 operated in the manner noted above, the translation complete relay R810 will operate and thus initiate the sending operation of the director whereby the route digits registered in the coder 1800 will be transmitted to set up the connection toward the called line.

The route digits are normally registered in the coder 1800 immediately after the registration of the third digit 7 in the third code register 1540, and the indication that the call is a six-digit call will remain registered on the TC control relay R1880 and the two-digit code relay R2160 until a digit is registered in the fourth numerical register 1640. When a digit is registered in the fourth numerical register 1640, a circuit will be completed for restoring the TC control relay R1880 to its normal position. In the present disclosure the restoration of the TC control relay R1880, as a result of the dialing of the seventh digit of the called number, is under control of the receive sequence switch 1510 in the call register 1500.

It will be recalled that the receive sequence switch 1510 is controlled to advance its wipers one step in a counterclockwise direction after each dialed digit is received by the director. Thus, the wiper 1514 in engagement with the contact 1 completes the pulsing circuit via the conductor C1551 for controlling the operation of the magnet RM1521 of the first code register 1520. After each digit the wiper is advanced one step and thereby successively connects the impulsing circuit, via the conductors C1552 to C1557, inclusive, to the remaining six registers of the call register 1500. When the wiper 1514 is in engagement with the contact 7 terminating the conductor C1557, the impulses transmitted thereover, corresponding to the seventh dialed digit, will be registered in the fourth numerical register 1640. Thereafter, the wipers of the receive sequence switch 1510 will be advanced one step into engagement with the contacts 8 in the associated contact banks. In this position, the wiper 1516 applies ground potential to the conductor C1517 extending to Fig. 18. The locking circuit for the TC control relay R1880, which normally includes the resistor 1895 and the exchange battery, is short-circuited by the direct ground potential applied to the conductor C1517 and the relay R1880 now restores to normal in order to remove the six-digit called subscriber number indication from the director. In other words, the relay R1880 at its contacts 1882, interrupts the circuit for the two-digit code relay R2160. The relay R2160 now restores to normal and, at its contacts 2165, removes the two-digit called office code indication marking from the X9 code marking conductor.

As soon as the above circuit is completed for restoring the TC control relay R1880, the call recorder 2000 and the associated director will function in the regular manner to complete the call to the called subscriber line and to transmit, in code form, the various items of record information to the toll ticket repeater 2300A as a normal seven-digit called directory number. In the present call, the director will transmit the routing digits 45 registered in the coder 1800, and then the digit 75234 registered respectively in the third code register 1540, and the first, second, third and fourth numerical registers 1610, 1620, 1630 and 1640.

*Registration of a falsely grounded calling line*

In the previous description of the mode of operation of the switching apparatus it was pointed out that when a call is initiated by a calling subscriber, the line finder 440 and the director hunter 450 are simultaneously operated. The line finder 440 searches for the calling line and the director hunter 450 searches for an idle director. Consequently, as soon as the calling line is found by the line finder 440, a loop circuit, including the calling line conductors C402 and C403, is normally completed for energizing the line relay R1130 in the code switch 1100. As a result of the operation of the line relay R1130, the controller 600 portion of the director performs a class test to determine the class of the calling line. Just prior to the completion of the class test, the control relay R730 is operated and, at its contacts 735, it completes the previously traced circuit for operating the test control relay R1110 in the code switch 1100. Upon operating, the relay R1110, at its contacts 1112 and 1114, connects the line test relay R1120 via the conductors C471 and C472, to the calling subscriber line conductors C402 and C403. As previously noted, the relay R1120 is adjusted to operate only in the event that either line conductor C402 or C403 of the calling subscriber line has a false ground potential thereon having a resistance of less than 10,000 ohms.

If the ring conductor C402 of the calling subscriber line is accidently grounded, the line circuit will operate in a normal manner even though the calling subscriber on the line has not initiated a call. The connection of the line conductors C402 and C403 will be completed in the normal manner to the director, the class test will be made of the line, and the line test relay R1120 will be operated. The same operations will also occur in the event that the tip conductor C403 of a subscriber line is accidently grounded, but in the latter case the line circuit 405 and the above-noted switching apparatus will not function until the subscriber on the line removes his receiver and thereby completes a connection between the grounded tip conductor C403 and the ring conductor C402 through the impulsing contacts at the calling subscriber substation. In other words, the grounded condition of the tip conductor C403 will not falsely operate the line circuit 405. However, when the line test relay R1120 is connected to the ring and tip conductors C402 and C403 a ground potential on either conductor will cause the operation of the relay R1110.

In order to point out a further distinction between a grounded ring conductor C402 and a grounded tip conductor C403 it should be noted that a false ground condition on the ring conductor C402 will prevent the impulsing contacts at a calling subscriber substation from transmitting the usual impulses of a dialed digit. Therefore, the timer 1190, which is started in its timing operation in response to the operations of the relays R1130 and R1140, will complete a circuit via its wiper 1191 and the conductor C1196, in the manner to be described hereinafter, in order to cause the director to automatically route the call to an intercepting operator position. However, if the tip conductor C403 is grounded at the time the calling subscriber initiates a call, the false ground condition will be registered by the operation of the line test relay R1120, and the call will be completed to the desired called subscriber in the event that the automatic toll ticketing apparatus is not required for the call, but the call will be automatically routed to an intercepting operator position in the event that the call is one that requires the toll ticketing apparatus to record the particulars for the call. From the foregoing it will be appreciated that, if the call is automatically routed to the intercepting operator position, appropriate steps may be taken to have the false ground condition removed from the subscriber line conductors.

In the present description it will be assumed that the fault has occurred as a result of the grounding of the tip conductor C403, and that the line test relay R1120 has operated. As a result of the operation of relay R1120, at its contacts 1121, it completes a circuit via the contacts 1116, the conductor C1167 extending to Fig. 18, and the winding of the relay R1810, to battery. The relay R1810 now operates and, at its contacts 1813, locks itself via the contacts 1821, to the grounded conductor C787. At its contacts 1812, the relay R1810 prepares a point in the circuit for operating the relays R1820 and R1830 in the event that the AB toll conductor is grounded to indicate that the call is one that is to be recorded. The latter circuit, however, will not be completed until after the calling subscriber has dialed the three digits corresponding to the called office code and has thereby caused the selection of a particular translator relay in the translator 1300. As a further result of the operation of relay R1810, at its contacts 1814, it completes an obvious circuit for operating the relay R1840. Thus the faulty ground condition encountered on the line conductor of the calling subscriber line is registered by the relay R1810 in the coder 1800.

After the above registration is made, the test control relay R1110 in the code switch 1100 restores to normal and reconnects the line relay R1130 to the calling subscriber line. Since it is assumed that the tip conductor C403 is grounded, the impulses dialed by the calling subscriber will control the line relay R1130 in the normal manner, to register all of the digits of the called subscriber number in the call register 1500. However, if the calling subscriber substation is on a party line and is provided with one of the special calling devices which is arranged to transmit station identifying ground impulses, the party line relay R1160 will be falsely operated during the dialing of the second digit by the false ground potential on the tip conductor C403. In other words, the party line relay R1160, in response to its false operation, will control the station identifying relays in the call recorder 2000 (Fig. 20) to falsely register the identity of a subscriber substation on the calling party line. Therefore, if the call is to be recorded the charge therefor may be made against the wrong subscriber substation.

In any event, as a result of the registration of the called office code digits in the call register 1500, the translator assigner will be controlled to associate the common translator 1300 with the calling director, the switch 1200 will be operated in its vertical and rotary directions in accordance with the second and third digits, and a wiper of the switch will be selected in accordance with the first digit of the called office code. As a result of these operations, circuits will be completed to select a particular translator relay in the translator 1300 in accordance with the class of the calling subscriber line and in accordance with the particular called office code digits. The operations of the director are the same as have been previously described, and the operations of the translator assigner 1000, and the translator 1300, are the same as described in detail in the previously noted Ostline application Serial No. 75,985, filed February 12, 1949. The selected translator relay is arranged to apply ground potential to predetermined ones of the conductors extending to the contacts 1 to 34, inclusive, of the connect relay R1710 in order to register the appropriate routing digits in the first, second, etc., route registers, to register the rate of charge for the call in the rate register, to operate predetermined ones of the TA, TB, TC and TD control relays, R1890, R1885, R1880 and R1875, and finally, to either ground or not ground the AB toll conductor depending upon whether the call is to be recorded or is not to be recorded.

In view of the foregoing it will be understood that if the AB toll conductor is not grounded, the relays R1820 and R1830 will not be operated. The director will then function to transmit the various routing digits registered in the coder 1800, and to transmit the various digits registered in the call register 1500 as determined by the operated and non-operated condtion of the TA, TB, TC and TD control relays in order to complete the connection to the desired called subscriber line, but the call recorder 2000 and the detector 1900 will not be operated to identify the calling line. This type of a call may be a free call to adjacent called exchanges in another zone or it may be a call to another exchange in the same zone as the calling exchange.

If the call is an AB toll call which is to be recorded, the selected translator relay will also apply ground potential to the AB toll conductor connected to the contact 33 of the relay R1710 and thereby complete a circuit for operating the relays R1820 and R1830. The relay R1820 upon operating, at its contacts 1822, completes a circuit for locking both relays R1820 and R1830 to the grounded conductor C787. As a further result of the operation of relay R1820, at its contacts 1821, it disconnects the locking ground conductor C787 from the conductor C787A, thereby to cause the restoration of any operated register relays in the first to the sixth route registers, the restoration of any operated rate register relays, and the restoration of any operated TA, TB, TC or TD control relays. Also, at its contacts 1821, the relay R1820 interrupts the locking circuit for the relay R1810 which now restores to normal and, at its contacts 1814, interrupts the circuit for the slow-to-release relay R1840. As soon as the relay R1840 restores to normal, at its contacts 1841 to 1844, inclusive, it connects four marking conductors C1866 to the contacts of the operated relays R1820 and R1830. The four marking conductors C1866 may be connected, by means of appropriate strapping conductors to the WXYZ11 and WXYZ12 code marking conductors extending to the register relays in the first and second route registers. In the present call the four code marking conductors C1866 are jumpered to the WXYZ11 and WXYZ12 conductors to register in the first and second route registers, the routing digits 59 for routing the present call to an intercepting operator position. It should be noted, however, that when the ground potential was removed from the conductor C787A, any route registration that may have been made in the first to the sixth route registers of the coder 1800 will be cancelled in response to the restoration of the operated register relays.

For the purpose of this description it is assumed that the digits 5 and 9 are respectively registered in the first and second route registers of the coder 1800. However, it should also be understood that any digit from 1 to 9 and 0, may be registered in both the first and the second route registers. The circuits for registering the digits 5 and 9 in the first and second route registers of the coder 1800 are completed in response to the restoration of the relay R1840. One circuit may be traced from ground at contacts 1832, and then via the contacts 1841, the X11 code marking conductor, and the winding of the X11 register relay in the first route register, to battery. Another circuit may be traced from ground at contacts 1824, and then via the contacts 1842, the Y11 code marking conductor, and the winding of the Y11 register relay in the first route register, to battery. The operation of the X11 and Y11 register relays in the first route register will register therein the digit 5. The operating ground potential for these register relays, however, is also extended via the X11 and Y11 code marking conductors in the cable C1744 to the corresponding contacts accessible to the wipers 1655 to 1658, inclusive, of the send sequence switch 1650 in order to control the sender switch 1660 to transmit impulses corresponding with the first routing digit 5. Still another circuit may be traced from ground at the contacts 1833, and then via the contacts 1843, the Y12 code marking conductor and the winding of the Y12 register relay in the second route register, to battery. The operation of the Y12 register relay in the second route register will register therein the second routing digit 9. The operating ground for the Y12 relay is also connected to the Y12 conductor in the cable C1745 terminating in the bank contacts accessible to the wipers 1655 to 1658, inclusive, of the send sequence switch 1650. Therefore, the sender switch 1660 will transmit the second routing digit 9 registered in the second route register of the coder 1800. As previously noted the ground potential at the contacts 1834 may also be utilized to complete a circuit via the contacts 1843 for operating any of the WXYZ12 register relays in the second route register so that at least two of the relays may be operated in combination to register any digit.

As a further result of the operation of the relay R1820, at its contacts 1825, it connects the grounded conductor C787 in order to operate the TD control relay R1875. With the TD control relay R1875 in its operated position, and the TA, TB, and TC control relays R1890, R1885 and R1880 in their restored position, all of the conductors C1837 to C1843, inclusive, will be connected to the skip common conductor C1831 in order to control the send sequence switch 1650 to skip the transmission of any of the digits registered in the seven registers of the call register 1500. Finally, at its contacts 1823, the relay R1820 applies ground potential to the conductor C884 extending to Fig. 8, in order to complete the operating circuit for the translation complete relay R810. As soon as the relay R810 is operated, a circuit is completed for operating the start send relay R930 which may be traced from ground at contacts 1845 of the restored relay R1840 in the coder 1800, and then via the contacts 1831, conductor C816 extending to Fig. 8, contacts 814 and 822 and the winding of the start send relay R930. The start send relay R930 now initiates the sending operation of the director, whereby the sender switch 1660, the send sequence switch 1650, and the relays R860, R870, R880, R910, and R920 cooperate, in the manner previously described, to transmit impulses corresponding to the digit 5 registered in the first route register and then the digit 9 registered in the second route register of the coder 1800. Thereafter, the send sequence switch 1650 will automatically advance its wipers step-by-step over its contacts 3 to 13, inclusive, in order to skip the third, fourth, fifth and sixth route registers in the coder 1800 and in order to skip the seven registers in the call register 1500. Thereafter, the wiper 1654 of the send sequence switch 1650 will step one step into engagement with the contact 14 and complete the previously traced circuit for operating the director release relay R780. The remaining operations for releasing the director and its associated equipment is the same as has been described previously.

From the above description of the mode of operation of the director and the associated switching apparatus it will be understood that a false ground condition encountered on the tip conductor C403 of a calling subscriber line is registered in the director by the operation of relay R1810 in the coder 1800. It will also be understood that the subsequent operations of the director will depend upon whether the connection, desired by the calling subscriber, is one that is to be recorded or is one that is to be completed without recording. If the call is one that would normally be completed with recording, the operated condition of the relay R1810 will automatically control the director to transmit the two routing digits to route the call to the intercepting operator position, and it will control the director so that it will disregard all of the digits which have been registered therein by the calling subscriber.

Referring now to Fig. 2, it will be seen that when the director 300A, for example, transmits the first routing digit 5 in the above described call, the primary selector 500A will raise its wipers step-by-step to the fifth level of the associated contact banks, and then automatically rotate its wipers to search over the selected level for an idle special selector, such as the special selector 340. When the director transmits the second routing digit 9 the special selector 340 will raise its wipers to the ninth level of the associated contact banks, and then automatically rotate its wipers over the selected level to search for an idle trunk extending to the intercepting operator position 50. The group of trunks terminating in the ninth level of the special selector 340 are only utilized in the interception of calls in response to the false ground condition encountered on the calling subscriber line. Since the call is routed to the intercepting operator position over this particular group of trunks the intercepting operator recognizes the fact that the call is from a subscriber line with a false low resistance ground potential thereon and she can, after ascertaining the calling line number, advise the exchange attendant of the condition of the particular calling line.

*Failure to dial*

In order to describe the mode of operation of the circuits and apparatus employed in the present system when a calling subscriber initiates a call, but then fails to dial any digits of a called number, it will be assumed that a calling subscriber at one of the substations connected to the line conductors C402 and C403 has extended a call to the director, in the manner previously described. Consequently, the usual class test will be made of the calling subscriber line, the line relay R1130, and the hold relay R1140 in the code switch 1100 will be in their operated positions, and the usual dial tone signal will be transmitted to the calling subscriber to indicate that the dialing of the called subscriber number may be started. Referring now to the code switch 1100 (Fig. 11) it will be seen that when the hold relay R1140 is operated under control of the line relay R1130, ground impulses applied to the conductor C1135 at the rate of twelve per minute, will be transmitted via the contacts 1143, the wiper 1192 and the engaged contact 1, and the winding of the minor switch stepping magnet RM1194, to battery. The magnet RM1194 will operate and restore in response to each pulse transmitted over the conductor C1135 and at the end of fifteen seconds, i. e., the third pulse, the wiper 1191 of the timer 1190 applies ground potential to the conductor C1196 extending to Fig. 6. Referring now to Fig. 6, it will be seen that the ground potential applied to the conductor C1196 is further extended via the contacts 621 and 992, and the winding of the fault seizure relay R770, to battery. The fault seizure R770 now operates and locks itself in its operated position via its contacts 772, to ground at contacts 752. As a further result of the operation of relay R770, at its contacts 771, it disconnects the impulsing conductor C1138 from the circuit including the conductor C717 over which the impulses of the dialed digits are normally repeated and registered in the call register 1500, and from the circuit for operating the digit relay R905. At its contacts 773, the relay R770 completes a circuit including the contacts 811, 783 and 662 for operating the assigner start relay R640. At its contacts 774 and 775, the relay R770 disconnects the dial tone conductor C797 from the conductor C1136 and it prepares a point in the circuit for subsequently transmitting the busy tone signal applied to the conductor C836 via the conductor C1136 to the calling subscriber line. Finally, at its contacts 776, the relay R870 prepares a point in the circuit for operating the fault seizure lamp 666. The last-mentioned circuit, however, is not completed until the start send relay R930 is operated to indicate that the director is sending the digits for intercepting the call.

In response to the operation of the assigner start relay R640, as noted above, the translator assigner 1000 will automatically operate and associate the common translator 1300 with the calling director, in the manner previously described. When the translator assigner 1000 is associated with the calling director it applies ground potential, via its wiper 1003, to the conductor C1070 extending to Fig. 15. Referring now to Fig. 15, it will be seen that the ground potential applied to the conductor C1070 is further extended to the wiper 1527 of the first code register 1500. Since the calling subscriber has not dialed any digits, the wiper 1527 will be in engagement with the home contact position and the ground potential will be further extended via the conductor C1234 to the terminal T1235B on the terminal block TB1240 (Fig. 12). This terminal will be jumpered by means of a jumper wire, such as C1235B, to a terminal on the terminal block TB1250 terminating a conductor, such as the conductor C1235C, extending to the translator 1300. Depending upon the class of the calling line, the ground potential on the terminal T1235B will control the operation of a particular translator relay in the translator 1300 which is arranged to control the coder 1800 so that appropriate routing digits are registered therein to route the call to the intercepting operator position 50.

The manner in which the routing digits are registered in the coder 1800 is exactly the same as has been described previously. Consequently, it will be assumed that translator 1300 registers the routing digits 5 and 0 respectively in the first and second route registers of the coder 1800. In response to the registration of the digits 5 and 0 in the coder 1800, the conductor C884 thereat will be grounded in order to complete the previously described circuit for operating the translation complete relay R810 in the controller 600 portion of the director. In response to the operation of the relay R810, at its contacts 814, it connects ground potential applied to the conductor C816 via the contacts 882 in order to complete the operating circuit for the start send relay R930. The relay R930, upon operating, locks itself in its operated position, at its contacts 932, and, at its contacts 931, it completes the previously described circuit for initiating the sending operation whereby the sender switch 1660 and the send sequence switch 1650 cooperate, in the manner previously described, to transmit the routing digits 5 and 0 registered respectively in the first and second route registers of the coder 1800. Also, at its contacts 931, the start send relay R930 completes a circuit which may be traced from ground at the contacts 751 for illuminating the fault seizure lamp 666 in order to indicate that the director is operating to intercept a false call.

Referring now to Fig. 2, it will be seen that the routing digit 5 transmitted by the director 300A controls the primary selector 500A, to raise its wipers to the fifth level and to select an idle special selector, such as the selector 340. The special selector 340, will be controlled by the second routing digit 0 to raise its wipers to the tenth level and to route the call over one of the trunks in the tenth level, to the intercepting operator 50. When the intercepting operator receives a call at her position over any trunk in the group of trunks connected to the tenth level she will recognize the fact that the particular call has been routed to her position because the calling subscriber failed to dial any of the digits of a called number.

From the above description, it will be appreciated that when the translation complete relay R810 operates, it controls the director to automatically route the call to the intercepting operator position and simultaneously therewith, at its contacts 812, it connects the busy tone conductor C836 via the contacts 774, to the conductor C1136, thereby transmitting the busy tone signal to the calling subscriber line. The calling subscriber, upon hearing the busy tone signal, will normally release the connection before it is routed to the intercepting operator position. However, if the subscriber fails to release the connection, the director will, shortly thereafter, route the call to the intercepting operator. Thereafter, the intercepting operator will answer the intercepted call and she will instruct the calling subscriber to release the connection.

*Dialing an incomplete called number*

In the foregoing description of operation of the director it was assumed that the calling subscriber failed to dial any of the digits of the called subscriber directory number within approximately fifteen seconds after the director was seized. As a result thereof, the director transmitted a busy tone signal to the calling subscriber and it also routed the call on the calling subscriber line to the intercepting operator position. It will now be assumed that the calling subscriber, after having seized the director in the manner previously described, dials at least the three code digits identifying a called exchange and that these digits are respectively registered in the first, second and third code registers 1520, 1530 and 1540 of the call register 1500. During the dialing of the first of the above noted digits, the digit relay R905 operates the sequence control relay R830 and the latter relay, at its contacts 832, completes the previously described circuit for operating the tone control relay R620. The relay R620 locks itself in its operated position and, at its contacts 621, it disconnects the conductor C1196 from the circuit for operating the fault seizure relay R770. Consequently, the ground pulse applied to the conductor C1196 within fifteen seconds after the director is seized, will be ineffective to operate the fault seizure relay R770 provided the calling subscriber has started to dial the first digit.

In response to the registration of the three code digits of the called number, the translator assigner 1000, the translator 1300, the coder 1800, and the switch 1200 of the director will operate in the manner previously explained to register the appropriate routing digits in the coder 1800. Furthermore, the director will be controlled by the operation of the translation complete relay R810 to start sending the registered routing digits. For the purpose of the present description it will be assumed that the calling subscriber fails to dial one or more of the remaining four digits of the numerical portion of the called subscriber directory number.

Referring again to the code switch 1100 (Fig. 11), it will be seen that at the end of approximately fifteen seconds the timer switch 1190 will have positioned its wiper 1191 into engagement with the contact terminating the conductor C1196, but due to the fact that the calling subscriber has started to dial the first digit, the previously traced circuit for operating the fault seizure relay R770 is not completed in the present call. At the end of approximately thirty seconds, however, the timer switch 1190 will have positioned its wiper 1191 into engagement with the conductor C1197. The ground potential applied to this conductor will by-pass the contacts 621 of the now operated relay R620 and complete the previously traced circuit for operating the fault seizure relay R770. The relay R770, at its contacts 774, immediately transmits a busy tone signal to the calling subscriber line inasmuch as the calling subscriber has dialed three digits and the translation complete relay R810 is now in its operated position. The circuit for transmitting the busy tone signal to the calling subscriber line includes the busy tone conductor C836, the contacts 812 and 774, and the conductor C1136 extending to Fig. 11. Upon hearing the busy tone signal, the calling subscriber will replace his receiver and thus cause the restoration of the line relay R1130 in the code switch 1100. The relay R1130, at its contacts 1133, interrupts the circuit for the holding relay R1140 and the latter relay, at its contacts 1141, interrupts the circuit of the seizure relay R750 in the controller 600 portion of the director. As soon as the seizure relay R750 restores to normal, it will terminate further transmission of any switch setting impulses by the director and it will complete previously described circuits for operating the director release relay R780. The director now restores to normal and releases any operated switches in the switch train which may have been controlled by routing digits transmitted by the director.

From the foregoing description of operation it will be understood that when the calling subscriber has dialed the first three digits of a called subscriber directory number, the director will operate in a normal manner to translate the same and attempt to complete the connection. However, if the calling subscriber fails to dial one or more of the remaining three or four digits of the numerical portion of a called subscriber directory number within approximately thirty seconds after the director is seized, a busy tone signal will be automatically transmitted to the calling subscriber line and the director will be automatically restored to normal as soon as the calling subscriber replaces his receiver upon the associated switch hook.

It may be well to mention at this time that, if the calling subscriber should dial either the first, or the first and second digits of a called office code, and then fails to dial any of the remaining digits of the called subscribed directory number, the tone control relay R620 will be operated to disconnect the conductor C1196 from the circuit of the fault seizure relay R770 and thus prevent the operation of the latter relay at the end of the fifteen-second time interval. However, due to the fact that the subscriber has failed to dial the first three digits of a called number, no translation can be made by the translator 1300 and the translation complete relay R810 will remain in its unoperated position. After the elapse of thirty seconds, the conductor C1197 will be grounded in order to operate the fault seizure relay R770, in the manner previously described. The fault seizure relay R770 will now control the assigner start relay R640 in order to cause the director to route the call to the intercepting operator position 50 in the same manner as has been described above in connection with the operation of the director when the subscriber fails to dial any digits within the fifteen seconds after the director is seized.

*Failure of the translator assigner 1000*

Several fault conditions have been described above, including the failure of the calling subscriber to dial any digits of a called number within fifteen seconds and the failure of the calling subscriber to dial one or more of the digits in the numerical portion of the directory number after having dialed the first three digits within thirty seconds. It will now be assumed that the calling subscriber has dialed all seven digits of a called subscriber number within the allotted thirty seconds in the regular manner. As previously described, when the last or fourth digit of the numerical portion of a seven-digit directory number is registered in the call register 1500, the fourth numerical send relay R990 is operated. At its contacts 992, the relay R990 disconnects the winding of the fault seizure relay R770 from both the fifteen-second time conductor C1196.

In the normal operation of the director, as has been previously explained, the registration of the first three digits of the called number in the call register 1500 completes the circuit for operating the assigner start relay R640. This relay, in turn, normally controls the translator assigner 1000 to find the calling director and to connect the common translator 1300 thereto, for the purpose of translating the first three digits and for registering the translated digits in the route registers of the coder 1800.

If the translator assigner 1000 fails to associate itself with a calling director requiring the assistance of the translator 1300 within approximately thirty-five seconds after the director is seized, the director is arranged to automatically route the call to an intercepting operator position.

Referring again to the code switch 1100 (Fig. 11), it will be seen that at the end of approximately fifteen seconds, and again at the end of approximately thirty seconds from the time that the director is seized, the wiper 1191 will apply ground potential first to the conductor C1196 and then to the conductor C1197. However, due to the fact that the calling subscriber has registered all of the digits of the called subscriber directory number in the call register 1500 within the allotted time, the relay R990, at its contacts 992, prevents the operation of the fault seizure relay R770. At the end of approximately thirty-five seconds, the wiper 1191 of the timer 1190 applies ground potential to the conductor C1199 extending to Fig. 6.

Referring now to Fig. 6, it will be seen that the ground potential applied to the conductor C1199 is further extended via the contacts 647 of the still operated assigner start relay R640 over a first branch including the conductor C649 extending to Fig. 18 and over a second branch circuit including the winding of the translator assigner relay R680. The relay R680 operates over the second branch circuit and, at its contacts 682, it locks itself to ground potential at the release key 614. At its contacts 681, the relay R680 interrupts its initial operating circuit. Also, at its contacts 683, the relay R680 completes an obvious circuit for illuminating the incomplete transmission lamp 609 and, at its contacts 684, it completes a circuit for applying ground potential to the translation assigner alarm conductor in order to sound an alarm in the exchange to indicate the failure of the translator assigner 1000.

Referring now to the coder 1800 (Fig. 18), it will be seen that the ground potential applied over the first branch circuit to the conductor C649, completes a circuit for operating the translator assignment failure relay R1860. At its contacts 1865, the relay R1860 completes an obvious circuit for operating the TD control relay R1875 and, at its contacts 1861 to 1864, inclusive, it provides four separate marking paths for applying ground potential to appropriate ones of the WXYZ11 and WXYZ12 code marking conductors in order to register in the first and second route registers of the coder 1800 at least two routing digits for routing the particular call to the intercepting operator position.

More specifically, at its contacts 1861, and 1862, the relay R1860 applies ground potential to the X11 and Y11 code marking conductors in order to register the digit 5 in the corresponding register relays of the first route register and, at its contacts 1863, it applies ground potential to the W12 code marking conductors to register the digit 7 in the corresponding register relay of the second route register. At the left-hand outer make contacts of the operated X11 and Y11 register relays, ground potential is applied to the conductor C884, in order to operate the translation complete relay R810. The latter relay now controls the operation of the director, whereby the routing digits 5 and 7 registered in the first and second route registers of the coder 1800 are transmitted to the primary selector 500A and the special selector 340, illustrated in Fig. 2, in order to route the call to the intercepting operator position over the group of trunks terminating in the seventh level of the special selector 340. Thereafter, the director will be released, in the manner previously described, and the connection will be completed between the calling subscriber line and the intercepting operator. The fact that the call is routed to the intercepting operator position over a trunk in the group of trunks terminating in the seventh level of the special selector 340 will indicate that the translator assigner 1000 failed to connect with the calling director within thirty-five seconds after the director was seized.

It may be well to mention at this time that when the translation complete relay R810 operates in response to the translation assigner failure condition, it interrupts, at its contacts 811, the circuit for the assigner start relay R640. Upon restoring to normal, the relay R640 at its contacts 647, interrupts the operating circuit for the relay R1860 in the coder 1800. The restoration of the relay R1860 at this time, however, is without effect inasmuch as the operated register relays in the first and second route registers are locked in their operated positions to the grounded conductor C787A. Also, the TD control relay R1875 is locked in its operated position over a circuit including the contacts 1826 and 1879', and the grounded conductor C787A.

With the TA, TB and TC control relays, R1890, R1885, and R1880 in their restored positions, and with the TD control relay R1875 in its operated position, each of the conductors C1837 to C1843, inclusive, will be connected to the skip conductor C1831 in the manner previously described. Consequently, after the send sequence switch 1650 and the sender switch 1660 have cooperated to transmit the routing digits 5 and 7 registered respectively in the first and second route registers of the coder 1800, the sender sequence switch 1650 will be automatically controlled to skip the third, fourth, fifth and sixth route registers in the coder 1800, and then to automatically skip the digits registered in all of the registers in the call register 1500.

At the end of the automatic stepping of the send sequence switch 1650 to skip the above noted registers the wiper 1654 engages its contact 14 and applies ground potential to the conductor C887 extending to Fig. 8, in order to operate the director release relay R780. This relay, as previously described, initiates the release of the director. However, since the translator assigner relay R680 is locked in its operated position to ground potential at the release key 614 it will not automatically restore to normal in response to the release of the director. The relay R680 retains the ground potential on the translation assignment alarm conductor and it also retains the circuit for illuminating the incomplete transmission lamp 609 to indicate to the exchange attendant that the assigner 1000 did not connect itself to the director in the normal manner. The exchange attendant, after correcting the fault in the assigner 1000 will then actuate the release key 614 in order to interrupt the locking circuit for the translator assigner relay R680 which restores to normal and removes the alarm condition.

The above-described fault condition, wherein the assigner 1000 fails to associate itself with the calling director, is registered by the operation of the translator assigner relay R680 approximately thirty-five seconds after the director is seized by the calling subscriber. Another type of fault is registered in the calling director in the event the translator assigner 1000, although properly associating itself with the calling director, fails to connect the translator 1300 to the coder 1800 portion of the director. This condition is transmitted to and registered in the controller 600 portion of the calling director by the operation of the translation failure relay R660. The operation of the translator assigner 1000 is initiated in response to the operation of the assigner start relay R640. This relay starts the rotary switch of the translator assigner 1000 to search for the calling director and when the calling director is found the assigner test relay R650 is operated. If the translator assigner 1000 then controls the translator 1300 to register appropriate routing digits in the coder 1800, and the translation complete relay R810 in the controller 600 is operated, the relay R810 controls the restoration of the assigner start relay R640 and the latter relay, in turn, restores the assigner test relay R650 in order to prevent the operation of the translation failure relay R660. However, it should be noted that the translation failure relay R660, although it is connected to the conductor C684 as long as relay R650 remains operated, will not operate because the associated translator assigner 1000 normally applies a resistance ground potential to the conductor C684.

If the above operations are performed in the above described sequence and within a predetermined time interval, which is determined by the operation and release time of certain relays in the translator assigner 1000, the translation failure relay R660 will not operate. If, in the above described sequence of operation, the translator assigner 1000 fails to cause the operation of the translation complete relay R810 and the restoration of the assigner test relay R650 within the predetermined elapsed time interval, it will automatically substitute a direct ground potential for the resistance ground potential applied to the conductor C684. The substitution of the direct ground potential for the normal resistance ground potential on the conductor C684 causes the operation of the marginal translation failure relay R660. Upon operating, the relay R660 locks itself in its operated position over a circuit including its lower winding, its contacts 664 and ground potential at the release key 614.

Upon operating, the relay R660 also completes, at its contacts 665, an obvious circuit for operating the failure slave relay R690. At its contacts 661, the relay R660 completes an obvious circuit for retaining the director busy relay R610 in its operated position in order to maintain the director busy until it is manually released by the subsequent operation of the release key 614. At its contacts 662, the relay R660 interrupts the circuit of the assigner start relay R640 and, at its contacts 663, it completes a circuit for transmitting the busy tone signal on conductor C836 via the contacts 623 and 775, to the calling subscriber line, in the manner previously described. When the failure slave relay R690 operates, as noted above, at its contacts 691, it interrupts a point in the previously described releasing circuit including the upper winding of the director release relay R780, in order to prevent the release of the director at this time. At its contacts 692, the relay R690 applies ground potential to the conductors C788 extending to Fig. 16 and the conductor C787 extending to Fig. 18, in order to prevent the release of the coder 1800. At its contacts 693, the relay R690 disconnects the pulsing conductor C895 from the pulsing contacts 881 thereby to terminate further stepping of the sender switch 1660 and thus prevent the further transmission of any switch setting impulses. Finally, at its contacts 694, the relay R690 illuminates the incomplete transmission lamp 609 to indicate that fact to the exchange attendant.

In view of the foregoing description it will be understood that when the translation failure relay R660 is operated, the director will be locked in its busy condition in order to prevent further seizure thereof until the exchange attendant actuates the release key 614 and restores the translation failure relay R660 to normal. In addition to the foregoing, the failure slave relay R690 will lock-in the failure condition by preventing the operation of the director release relay R780 in order to permit the exchange attendant to study the condition of the director and the associated assigner 1000 at the time the translation failure relay R660 operated. However, when the release key 614 is actuated, the translator failure relay R660 and the relay R690 restores to normal in the order named. Restoration of the relay R690 completes the circuit for the director release relay R780 whereby the various register switches and other apparatus of the director is restored to normal in the manner previously described.

*Sending failure*

In the previous description it was pointed out that the failure slave relay R690 is operated under control of the translation failure relay R660, and that the latter relay operates under control of the translator assigner 1000 whenever the assigner fails to control the translator 1300 to register the routing digits for a call in the coder 1800. It should be noted, however, that the circuit for the failure slave relay R690 may also be controlled by the contacts 634 of the sender failure relay R630. Consequently, if the sender failure relay is operated, the failure slave relay R690 will also operate and lock the director in the sender failure position until it is released by the exchange attendant as described above.

The sender failure relay R630 may be operated over a circuit including the contacts 874 of the pulse control relay R870, the conductor C896 extending to Fig. 16, and terminating in contact 13 accessible to the grounded wiper 1667 of the sender switch 1660. However, this circuit will normally not be completed when the wiper 1667 engages its contact 13 because, at that instant, the pulse control relay R870 will normally be in its unoperated position. More specifically, as the impulses of each digit are transmitted during each cycle of rotation of the wipers of the sender switch 1660, the digit stop relay R920 will normally operate before the wiper 1667 engages contact 13. The relay R920, as previously described, operates the digit space relay R860, and the latter relay interrupts the circuit for the pulse control relay R870 so that it will be in its restored position as the wiper 1667 passes over the associated contact 13.

If, during the transmission of any digit the digit stop relay R920 is not operated, then the pulse relay R870 will be in its operated position and the circuit will be completed, as traced above, for operating the sender failure relay R630 when the wiper 1667 engages its contact 13. The failure of the digit stop relay R920 to operate during each cycle of rotation of the wipers of the sender switch 1660 indicates that the impulse sending operation of the director has failed. The relay R630, upon operating, immediately locks itself via its contacts 633 to ground at the release key 614. Also, the relay R630, at its contacts 634, completes the operating circuit for the failure slave relay R690; at its contacts 631, it completes the multiple holding circuit for the director busy relay R610; and, at its contacts 632, it completes a point in the previously traced circuit for transmitting the busy tone signal to the calling subscriber line. The operations performed by the relay R610 and R690, whereby the relay R610 marks the director busy and whereby the relay R690 prevents the release of the director, are the same as previously described.

When the exchange attendant has corrected the fault condition which prevented the sender switch 1610 from correctly transmitting impulses corresponding to a registered digit, he may actuate the release key 614 and thereby interrupt the holding circuit for the sender failure relay R630. The relay R630, upon restoring, controls the release of the busy relay R610 and the failure slave relay R630, and the restoration of the latter relay permits the director release relay R780 to operate and control the release of the director.

From the foregoing description of the mode of operation of the director it will be understood that when the failure slave relay R690 is operated, either as a result of the operation of the translation failure relay R660 or as a result of the operation of the sender failure relay R630, the director will be marked as busy in order to prevent further seizure thereof, it will transmit a busy tone signal to the calling subscriber to indicate that the connection should be released, and it will be locked in the particular operated position that existed at the time the failure slave relay R690 operated. Also, it will be understood that the director will be automatically released and rendered available for additional calls when the faulty condition therein has been cleared by the exchange attendant and the release key 614 has been actuated.

*Dialing a non-existent called office code*

In the event that any calling subscriber attempts to extend a call by dialing the code digits of a non-existing exchange, the director will automatically function to route the call to an intercepting operator position. More particularly, if a calling subscriber seizes the director, in the manner previously described, and registers three digits of the code of a non-existing exchange in the first, second and third code registers 1520, 1530 and 1540, the switch 1200 will be controlled in the normal manner to raise its wipers in a vertical direction in accordance with the second digit, to rotate its wipers over the selected level in accordance with the third digit, and one of the eight wipers of the switch will be selected in accordance with the first digit. During the period of time that the calling subscriber registers the four remaining digits of the numerical portion of a number in the numerical registers of the call register 1500, the assigner 1000, and the translator 1300 will be seized in the manner previously described, and an attempt will be made to complete a circuit to a translator relay in the translator 1300 which corresponds to the registered called office code. Since the code digits registered in the first three registers correspond to a non-existing exchange or unassigned code, the translator 1300 is not provided with a corresponding translator relay. Therefore, the translator assigner 1000 cannot release the translator 1300 from the director in the previously described manner, and as a result thereof an unassigned code relay (not shown) in the translator assigner 1000 will operate and apply ground potential to the conductor C1235. Referring now to Fig. 10, it will be seen that the ground potential applied to the conductor C1235 is extended to Fig. 12 to the terminal T1235A on the terminal block TB1240. The ground potential applied to the terminal T1235A is further extended via the jumper C1235B and the conductor C1235C, in order to complete the operating circuit for the unassigned code translator relay (not shown) in the translator 1300. This translator relay is arranged, when operated, to register, for example, the routing digits 5 and 0 in the first and second route registers of the coder 1800 in the manner previously described. As a result of the registration of the route digits 5 and 0 in the coder 1800, the translator assigner 1000 will function, in the usual manner, to disconnect the translator 1300 from the director. The operation of both the assigner 1000 and the translator 1300 in response to the dialing of a non-existent called office code is described in detail in the previously noted Ostline application, Serial No. 75,985. Also, in response to the registration of the routing digits 5 and 0 in the coder 1800, the sender switch 1660 and the send sequence switch 1650 will cooperate to transmit only the routing digits 5 and 0 in order to complete the connection between the calling line and the intercepting operator position, in the manner previously described. In addition to the foregoing, the send sequence switch 1650 will be controlled to skip the third to the sixth route registers in the coder 1800 and to skip the seven registers in the call register 1500. Thereafter, the director will disconnect itself from the calling line and it will release all of the operated relays and switches therein before it is rendered available for additional calls. Since the call has been routed to the intercepting operator over an idle trunk in the tenth level of the special selector 340, the operator may now inform the calling subscriber that he has dialed the code digits of a non-existing exchange or the code identifying an exchange which may not be called by the calling subscriber without the aid of a toll operator. In the latter case, the intercepting operator will inform the calling subscriber to call the toll operator by dialing the single digit "0."

*Dialing the "0" toll operator*

From the previous description of the mode of operation of the director and the common translator 1300 it will be understood that the translator 1300 is normally associated with the director in response to the registration of three digits in the first, second and third code registers 1520, 1530 and 1540 of the call register 1500. It will also be understood that in the case of a falsely grounded calling line the routing digits registered by the translator 1300 in the coder 1800 will be cancelled and that other routing digits will be registered in the route registers of the coder 1800 so that a call on a falsely grounded line will be automatically routed to an intercepting operator position. It will also be understood from the previous description of operation that in response to a translator assignment failure condition, predetermined routing digits will be registered in the route register of the coder 1800 in order automatically to route the calling subscriber line to the intercepting operator position. However, during the normal operation of the equipment, the common translator 1300 will be utilized to translate the three called office code digits registered in the director into appropriate routing digits and to register the same in the coder 1800.

In the previously mentioned Ostline application, Serial No. 75,985, filed February 12, 1949, the translator assigner 1000 and the common translator 1300 are also called into use by the director each time the single digit 0 of the director number of the "0" toll operator is registered in the first code register 1520 of the call register 1500. The present director, however, is arranged to automatically route a connection to the "0" operator position, without requiring the assistance of either the translator assigner 1000 or the common translator 1300, by automatically translating the single digit 0 into a plurality of routing digits, so that the calling subscriber line may be routed to the "0" toll operator position by way of the last two switching stages of the switching apparatus provided in the telephone exchange.

In order to describe this operation of the present director it will now be assumed that a calling subscriber at a substation connected to the line conductor 402 and 403 desires to extend a connection to the "0" toll operator position. Any calling subscriber in the FLorida 3 exchange, regardless of the class of his line, may extend a connection to the "0" operator position by dialing the single digit 0. In response to the removal of the receiver at the calling station, the line circuit 405, the primary selector 500 and the director hunter 450 will operate, in the manner previously described, to connect the calling line to the illustrated director. The usual test will be made of the calling line to determine whether or not a false ground potential is applied to the line conductors and to determine the class of the calling subscriber line. In response to the dial tone signal thereafter transmitted to the calling subscriber line, the subscriber may dial the single digit 0 which is registered in the first code register 1520 in the call register 1500. In response to the single digit 0, the wipers 1523 to 1527, inclusive, of the first code register 1520 will be advanced into engagement with the contacts 10 in the associated contact banks. During the dialing of the digit 0, the line relay R1130 and the hold relay R1140 in the code switch 1100 will cooperate, in the manner previously described, to control the operation of the digit relay R905, and the latter relay, at its contacts 906, controls the operation of the send sequence control relay R830. The relay R830, at its contacts 832, completes the operating circuit for the relay R620 and the latter relay, at its contacts 621, disconnects the fifteen second time conductor C1196 from the circuit for the fault seizure relay R770.

When the wiper 1526 of the first code register 1520 engages the contact 10 in the associated contact bank, it applies ground potential to the conductor C1518 extending to Fig. 18, in order to complete the operating circuit for the "0" operator relay R1850. The relay R1850, upon operating, at its contacts 1856, completes a circuit for operating the TD control relay R1875, and the latter relay locks itself in its operated position over a circuit including the contacts 1826 and 1879', and the grounded conductor C787A. As a further result of the operation of relay R1850, at its contacts 1851, it applies ground potential to the conductor PC1 in order to complete an operating circuit for a peg count meter (not shown) to record the number of times that the "0" operator is called. At its contacts 1853 and 1854, the relay R1850 applies ground potential to the X11 and Y11 code marking conductors in order to register the digit 5 in the X11 and Y11 register relays of the first route register. At its contacts 1855, the relay R1850 applies ground potential to the X12 code marking conductor in order to register the digit 8 in the X12 register relay of the second route register. It should be noted at this point, that an additional contact may be provided on the relay R1850 so that ground potential may be applied to two WXYZ12 code marking conductors to operate corresponding register relays in the second route register in any combination to register any one of ten digits from 1 to 9, inclusive, and 0. As a further result of the operation of the relay R1850, at its contacts 1852, it applies ground potential to the conductor C696 extending to Fig. 6, and then via the winding of the motor start relay R790, to battery. The ground potential applied to the conductor C696 is also extended via the conductor C695, the sender sequence switch off-normal contacts 1659', the contacts 1652, and the winding of the magnet RM1651, to battery. The magnet RM1651 momentarily operates and restores in order to advance its wipers from engagement with the home contacts into engagement with the contacts 1 in the associated contact banks, and also to interrupt its operating circuit by opening its off-normal contacts 1659'.

Referring now to the motor start relay R790 (Fig. 7) it will be seen that when this relay fully operates it locks itself in its operated position via its contacts 793 to the ground potential at contacts 759. The remaining operations performed by the relay R790 are the same as previously described. The above-described circuit for operating the relay R790 is controlled, in response to "0" operator calls, by the relay R1850 instead of the assigner start relay R640. In other words, in the normal operation of the director, the assigner start relay R640 operates to start the pulse generator 700 only after the third digit of a called office code is registered in the call register 1500, but in single digit "0" operator calls it is necessary to start the pulse generator 700 as soon as the single digit 0 is registered in the call register 1500.

In response to the registration of a routing digit in the first route register of the coder 1800, ground potential is applied to the conductor C884 extending to Fig. 8, in order to operate the translation complete relay R810. The latter relay, as previously described, initiates the impulse transmitting operation of the director whereby the sender switch 1660 and the send sequence switch 1650 cooperate to first transmit impulses corresponding to the routing digits 5 and 8, respectively registered in the first and second route registers of the coder 1800. Since no digits are registered in the third to the sixth route register in the coder 1800, the send sequence switch 1650 is automatically controlled to skip these registers after the transmission of the routing digits 5 and 8. Since the TA, TB and TC control relays R1890, R1885 and R1880 are in their normal positions and since the TD control relay R1875 is in its operated position, the send sequence switch 1650 is also automatically controlled, in the manner previously described, to skip the seven registers in the call register 1500. Thereafter, the send sequence switch 1650 will advance its wiper 1654 into engagement with the contact 14 in the associated contact bank and complete a circuit including the conductor C887 for operating the director release relay R780.

In response to the operation of the director release relay R780, the connection will be completed between the calling subscriber line and the "0" operator position and the director will disassociate itself from the calling and called ends of the connection. Furthermore, the director release relay R780 will cause all of the operated relays and the switching apparatus included in the director to be restored to normal in the usual manner.

Referring now to Fig. 2, it will be seen that the routing digit 5 transmitted by the director, controls the primary selector 500A to select an idle trunk in the associated fifth level extending to a special selector, such as 340, and the routing digit 8 controls the special selector 340 to select an idle trunk in the eighth level extending to the "0" operator position. The "0" operator may handle the call extended to her position in a conventional manner and thus complete the same to a desired called subscriber.

From the above description of the mode of operation of the director it should be understood that it will automatically translate the single digit directory number 0 of the "0" operator position into at least two routing digits without calling into use either the translator assigner 1000 or the translator 1300.

Various other operations of the director and the associated apparatus of the telephone system whereby calls are completed to other exchanges of the telephone network and whereby records are produced of the various items of information pertaining to each telephone connection, are described in detail in the previously mentioned Ostline application, Serial No. 75,985, filed February 12, 1949, now Patent No. 2,678,353, granted May 11, 1954. A description of the operation of the primary selector 500A, the ticket repeater 2300A, the ticket repeater selector 2700A, the tabulator allotter 2801A, the tabulator 2800A, the ticket tape punch 2968, and the record tape punch 2967, is also contained in the last-mentioned Ostline application.

The apparatus and circuit arrangements in the telephone system whereby the register sender tests the calling line for a false ground condition thereon and then either completes the call to its destination or to an operator position depending upon whether or not the call is to be recorded are claimed in the copending parent application, Serial No. 205,460, filed January 11, 1951.

The apparatus and circuit arrangements in the telephone system whereby the register sender is connected to the line finder at substantially the same time that the line finder is connected to the calling line, are claimed in a copending divisional application Serial No. 368,053, filed July 15, 1953.

While one embodiment of the invention has been disclosed, it will be understood that various modifications may be made therein which are within the true spirit and scope of the invention.

What is claimed is:

1. In an automatic telephone system, a calling exchange, a single called exchange identified by both a two-digit and a three-digit code wherein the first digit of the two-digit code and the first digit of the three-digit code are identical and wherein the second digit of the two-digit code and the second digit of the three-digit code are identical, subscriber lines terminating in said called exchange identified by four-digit numbers wherein the first digit of said four-digit numbers assigned to subscriber lines utilizing said two-digit code as part of the directory number are identical to the third digit of said three-digit code, a register sender in said calling exchange including seven-digit registers and a plurality of route registers and a sender, means for registering in successive ones of said digit registers the two-digit code or the three-digit code identifying said called exchange and a four-digit number identifying a desired called subscriber line in said called exchange, a common translator, a translator assigner, means controlled by the registration of said first three digits in said digit registers for controlling said assigner to connect said translator to said register sender and for controlling said translator to register in successive ones of said route registers predetermined routing digits for routing said call to said called exchange, a register relay in said register sender operated by said translator in the event that the first three digits registered in said digit registers correspond to the digits of said three-digit code for controlling said sender portion of said register sender to set up said connection to said called subscriber line in said called exchange on the basis that the directory number of said called line includes said two-digit code and a four-digit number, means controlled in the event a digit is registered in the last register of said seven-digit registers for restoring said register relay so that said sender portion of said register sender is controlled to set up said connection to said called subscriber line in said called exchange on the basis that the directory number of said called line includes said three-digit code and a four-digit number, and means in said register sender operated by the registration of at least one digit in said route register for controlling said sender to transmit all of said predetermined digits registered in said route register and then the four digit number identifying said called line registered in said digit registers.

2. In an automatic telephone system, a calling exchange, a single called exchange identified by both a two-digit code and a three-digit code wherein the first digit of the two-digit code and the first digit of the three-digit code are identical and wherein the second digit of the two-digit code and the second digit of the three-digit code are identical, subscriber lines terminating in said called exchange identified by four-digit numbers wherein the first digit of the numbers assigned to subscriber lines utilizing said two-digit code as part of the directory numbers and the third digit of the three-digit code are identical, a register sender in said calling exchange including seven-digit registers and a plurality of route digit registers and a sender, means for registering in successive ones of said digit registers the two-digit code or the three-digit code identifying said called exchange and a four-digit number identifying a desired called subscriber line in said called exchange, a common translator, a translator assigner, means operated incident to the registration of the first three digits of the three-digit code of said called exchange in said digit registers for controlling said translator assigner to connect said translator to said register sender and for controlling said translator to register in successive ones of said route digit registers predetermined routing digit for routing said call to said called exchange, a register relay in said register sender operated by said translator incident to the registration of said three-digit code for controlling said sender to set up said connection to said called subscriber line in said called exchange by transmitting the routing digits registered in said route digit register and then the digits registered in the fourth and fifth and sixth digit registers in said register sender, and means controlled by the registration of a digit in the seventh digit register in said register sender before said sender has completed transmission of the digit registered in the sixth digit register for restoring said register relay to normal in order to control said sender to also transmit the digit registered in the seventh digit register.

3. In an automatic telephone system, a calling exchange, a called exchange, a first group of subscriber lines in said called exchange each identified by a seven-digit number, a second group of subscriber lines in said called exchange each identified by a six-digit number, said six-digit numbers and said seven-digit numbers having corresponding first and second and third digits, a register sender including a first group and a second group of digit registers, means for registering the first three digits of a called line number in said first group of digit registers and for registering either the remaining three digits of a six-digit called line number or the remaining four digits of a seven-digit called line number in said second group of digit registers, a route digit register and a control relay in said register sender, a common translator, a translator assigner, means operated incident to the registration of said first three digits in said first group of digit registers for controlling said translator assigner to connect said common translator to said register sender and for controlling said translator to register in said route digit register predetermined routing digits and to operate said control relay, means operated incident to the registration of at least one routing digit in said route digit register for controlling said register sender to transmit the digits registered in said route digit register and then the digits registered in said second group of digit registers, means controlled incident to the operation of said control relay for releasing said register sender after the transmission of the digit registered in the next to the last digit register in said second group in order to complete a connection to a called subscriber line in said second group of lines, and means controlled incident to the registration of a digit in the last digit register of said second group of digit registers at any time prior to the transmission of the digit registered in the next to the last digit register in said second group of digit registers for restoring said control relay so that said register sender releases after the fourth digit registered in said second group of digit registers has been transmitted in order to complete a connection to a called subscriber line in said first group of lines.

4. In an automatic telephone system, a calling exchange, a called exchange, a first group of subscriber lines in said called exchange each identified by a seven-digit number, a second group of subscriber lines in said called exchange each identified by a six-digit number, said six-digit numbers and said seven-digit numbers having corresponding first and second and third digits, a register sender including a first group and a second group of digit registers, means for registering the first three digits of a called line number in said first group of digit registers and for registering either the remaining three digits of a six-digit called line number or the remaining four digits of a seven-digit called line number in said second group of digit registers, a route digit register and a control relay in said register sender, a common translator, a translator assigner, an assigner start relay operated incident to the registration of three digits in said first group of digit registers for controlling said translator assigner to find said register sender and connecting said common translator to said register sender, means selectively controlled in accordance with said first three digits registered in said first group of digit registers for controlling said translator to register in said route digit register a predetermined number of routing digits wherein the last digit of said predetermined number of routing digits is identical to the third digit of said six-digit and seven-digit subscriber numbers and to operate said control relay, a translation complete relay in said register sender operated incident to the registration of said routing digits for controlling said register sender to transmit in succession each of the digits registered in said route digit register and then each of the three or the four digits registered in said second group of digit registers depending upon the operated or restored position of said control relay, contacts controlled incident to the operation of said control relay for selectively controlling said register sender to release after the transmission of the third digit registered in said second group of digit registers in order to complete a connection between said calling exchange a called subscriber line in said second group of lines in said called exchange, and means controlled incident to the registration of a fourth digit in said second group of digit registers at any time prior to the completion of the transmission of the third digit registered in said second group of digit registers for selectively restoring said control relay to normal in order to prevent said register sender from releasing until it has also transmitted said fourth digit registered in said second group of digit registers in order to complete a connection between said calling exchange and a called subscriber line in said first group of lines in said called exchange.

5. In a telephone system having a plurality of register senders, a route register and route control relay and a timer in each of said register senders, a translator common to said register senders, means for connecting said common translator with any one of said register senders, a calling line, a called line means controllable from said calling line for selecting an idle one of said register senders and for registering therein a plural digit directory number identifying said called line, means operated incident to said selection of said register sender for initiating operation of said timer, means controlled incident to the registration of said plural digit directory number in said register sender for controlling said common translator connecting means to connect said common translator with said register sender and for selectively controlling said common translator to register in said route register a plural digit translation of said plural digit directory number, means controlled by said timer in the event said common translator is not connected to said register sender within a predetermined elapsed time interval after the initiation of the operation of said timer for operating said route control relay, means controlled incident to said operation of said route control relay for registering in said route register a predetermined digit or digits, whereby said route register is operated to register the fact that said common translator has not been connected to said register sender, and means in said register sender controlled incident to the registration in said route register of said plural digit translation of said called line directory number for selecting a route over which a connection may be completed to said called line identified by said directory number and controlled incident to the registration in said route register of said predetermined digit or digits indicative of the fact that said common translator has not been connected to said register sender for selecting a route over which a connection may be completed to a called line identified by said predetermined digit or digits.

6. In a telephone system having a plurality of register senders, a route register and a timer in each of said register senders, a translator common to said register senders, a calling line, a called station, an intercepting operator position, means for connecting said common translator with any one of said register senders, means controllable from said calling line for selecting an idle one of said register senders and for registering therein a plural digit directory number identifying said called station, means operated incident to said selection of said register sender for initiating operation of said timer, means controlled incident to the registration of certain of the digits in said plural digit directory number for controlling said common translator connecting means to connect said common translator with said register sender and for selectively controlling said common translator to register in said route register a plural digit translation of said certain digits in said directory number, a route control relay in said register sender, means controlled by said timer in the event said route register is not operated to register said plural digit translation within a predetermined elapsed time interval after the operation of said timer is initiated for selectively operating said route control relay, means controlled incident to the operation of said route control relay for registering in said route register a plural digit number identifying a route to said operator position, and means in said register sender controlled incident to the registration of the digits in said route register for routing a call to said called station over the route determined by the plural digit translation registered in said route register in the event said route control relay is not operated and for routing a call to said intercepting operator position over the route determined by the plural digit number registered in said route register in the event said route control relay is operated.

7. In a telephone system having a plurality of register senders, means for seizing and for operating any one of said register senders to register different called station directory numbers, a timer operated incident to said seizure of said register sender, switching apparatus, a route register included in said one register sender for registering one or more routing digits, a translator common to said register senders, means in said one register sender operated incident to the registration therein of a plural digit directory number identifying a called station for connecting said common translator with said one register sender, means including said common translator for registering a first plurality of routing digits in said route register, a relay in said register sender operated by said timer in the event said last-mentioned means fails to register any digits in said route register within a predetermined elapsed time after said timer is operated, an operator position, contacts controlled by said relay for registering a second plurality of routing digits in said register sender identifying said operator position, and means in said register sender operated by the registration of at least one routing digit in said route register for transmitting said registered routing digits to said switching apparatus in order to extend a connection in the direction of the called station identified by the directory number registered in said register sender or to said operator position over the route determined by the first or the second plurality of routing digits registered in said route register.

8. In a telephone system having a plurality of register senders, means for seizing and for operating any one of said register senders to register a seven-digit called station directory number, a timer in said one register sender operated incident to said seizure thereof, a translator common to said register senders, means including a first relay in said register sender operated incident to the registration therein of the first three digits of a seven-digit directory number identifying a called subscriber substation for connecting said common translator with said one register sender, a route register in said register sender, means controlled incident to said connection for translating said first three digits in said directory number into two or more routing digits and for registering said routing digits in said route register, an operator position, a second relay in said register sender operated by said timer in the event that said routing digits are not registered in said route register within a predetermined elapsed time interval after said timer is operated for automatically registering two arbitrary routing digits in said route register identifying said operator position, switching apparatus, normally inactive impulse generating means in said register sender, means controlled incident to the registration of routing digits in said route register for initiating operation of said impulse generating means, and means controlled by said impulse generating means for transmitting impulses to said switching apparatus corresponding to the digits registered in said route register and the last four digits of said directory number in the event said second relay is not operated and for preventing the transmission of any of the digits of said seven-digit directory number in the event said second relay is operated, whereby a connection is completed to said called station in the event said second relay is not operated and whereby a connection is completed to said operator position in the event said second relay is operated.

9. In a telephone system having a plurality of register senders, a route register included in each of said register senders, an operator position, a first route identified by a first route designation over which connections may be extended to said operator position, a called exchange identified by a three-digit code, a second route identified by a second route designation over which connections may be extended to said called exchange, a timer in each of said register senders, means for seizing one of said register senders and for registering therein said three-digit code identifying said called exchange, means controlled by the seizure of said register sender for initiating operation of said timer, a translator common to said plurality of register senders, means for connecting said translator with any one of said register senders, a first relay in said register sender operated incident to the registration therein of said called exchange three-digit code for controlling said connecting means to connect said common translator with said seized register sender, means controlled incident to said connection for selectively controlling said translator to register said second route designation in said route register, a second relay in said register sender, means controlled incident to the registration of said second route designation in said route register for operating said second relay, means controlled incident to the operation of said second relay for restoring said first relay and for controlling said register sender to complete said connection to said called exchange over said second route in accordance with said second route designation registered in said route register, a third relay, means controlled by said timer in the event said second relay is not operated within a predetermined elapsed time interval after said seizure of said register sender for operating said third relay, and means controlled incident to said operation of said third relay for registering said first route designation in said route register and for thereafter operating said second relay, whereby said register sender is controlled to complete said connection to said operator position over said first route in accordance with said first route designation registered in said route register.

10. In a telephone system having a plurality of register senders, a route register included in each of said register senders, an operator position, a first route identified by a first route designation over which connections may be extended to said operator position, a first route identified by a first route designation over which connections may be extended to said operator position, a called exchange identified by a three-digit code, a second route identified by a second route designation over which connections may be extended to said called exchanges, a timer in each of said register senders, means for seizing one of said register senders and for registering therein said three-digit code identifying said called exchange, means controlled by the seizure of said register sender for initiating operation of said timer, a translator common to said plurality of register senders, means for connecting said translator with any one of said register senders, a first relay in said register sender operated incident to the registration therein of said called exchange three-digit code for controlling said connecting means to associate said common translator with said seized register sender, means controlled incident to said connection for selectively controlling said translator to register said second route designation in said route register, a second relay in said register sender, means controlled incident to the registration of said second route designation in said route register for operating said second relay, means controlled incident to the operation of said second relay for restoring said first relay and for controlling said register sender to complete said connection to said called exchange over said second route in accordance with said second route designation registered in said route register, a third relay, a circuit prepared by contacts on said first relay for controlling the operation of third relay, means controlled by said timer in the event said first relay is not restored due to the failure of said second relay to be operated within a predetermined time control after said register sender is seized for completing said circuit in order to operate said third relay, and means controlled by the operation of said third relay for registering said first route designation in said route register, whereby said second relay is operated in order to restore said first relay and whereby said register sender is controlled to complete said connection to said operator position over said first route in accordance with said first route designation registered in said route register.

11. In a telephone system having a plurality of register senders, a translating relay and a route register included in each of said register senders, a translator common to all of said register senders, means for registering a called station directory number in one of said register senders, means controlled in accordance with a single digit directory number registered in said one register sender for selectively operating the translating relay in said one register sender, means controlled in accordance with a plural digit directory number registered in said register sender for connecting said common translator with said register sender and for selectively operating said common translator in accordance with certain of said digits of said plural digit directory number, means governed in accordance with the selective control of said translating relay or said common translator for registering in the route register of said one register sender a plural digit number translation of the said single digit or said plural digit directory number, and means in said one register sender for selecting a route over which a connection may be completed to the called station having the directory number registered in said one register sender in accordance with the plural digit translation registered in said route register.

12. In a telephone system having a plurality of register senders, means for operating any one of said register senders to register different called station directory numbers, switching apparatus, a route register included in said one register sender for registering one or more routing digits, a relay in said one register sender operated in the event that a single digit directory number is registered therein identifying a certain called station, contacts controlled by said relay for simultaneously registering a plurality of routing digits in said route register, a translator common to said register senders, means in said one register sender operated in the event that a plural digit directory number is registered therein identifying another called station for connecting said common translator with said one register sender, means including said common translator for simultaneously registering a different plurality of routing digits in said route register, and means in said register sender operated by the simultaneous registration of said routing digits for transmitting said registered routing digits to said switching apparatus in order to extend a connection to the called station identified by the directory number registered in said register sender over a route determined by the registered routing digits.

13. In a telephone system having a plurality of register senders, translation relay and a route register included in each of said register senders, a translator common to all of said register senders, means for connecting said common translator with any one of said register senders, a calling line, means controllable from said calling line for selecting an idle one of said register senders and for registering therein a single digit or a plural digit directory number identifying a desired called station, means governed in accordance with a single digit number registered in said register sender for selectively controlling the translation relay in said register sender, additional means governed in accordance with a plural digit directory number registered in said register sender for controlling said common translator connecting means, means controlled in the event said translation relay is selectively controlled for registering in the route register in said register sender a plural digit translation of said registered single digit number, means controlled in the event said common translator connecting means is controlled for connecting said common translator with said one register sender and for selectively controlling said common translator to register in said route register a plural digit translation of said registered plural digit number, and means in said one register sender operated in accordance with the particular translation registered in said route register for routing a call to the called station identified by the particular number registered in said one register sender.

14. In a telephone system having a plurality of register senders, means for operating any one of said register senders to register a called station directory number, a relay in said one register sender operated in response to the registration therein of a single digit called station directory number, contacts controlled by said relay for translating said registered single digit number into at least two routing digits and for registering said routing digits in said one register sender, a translator common to said register senders, means in said one register sender operated in response to the registration therein of a plural digit called station directory number for connecting said translator with said one register sender, means controlled incident to said connection for selectively operating said translator to translate at least three of the digits of said last-mentioned registered directory number into two or more routing digits and for registering said routing digits in said one register sender, and means for setting up a connection to the called station identified by the directory number registered in said register sender over a route determined by the value of said registered routing digits.

15. In a telephone system having a plurality of register senders, means for operating any one of said register senders to register a called station directory number, a first relay in said one register sender operated incident to the registration therein of a single digit called station directory number, contacts controlled by said relay for translating said registered single digit number into at least two routing digits and for registering said routing digits in said one register sender, a translator common to said register senders, means including a second relay in said one register sender operated incident to the registration therein of a plural digit called station directory number for connecting said translator with said one register sender, means controlled incident to said connection for selectively operating said translator to translate at least three of the digits of said last-mentioned registered directory number into two or more routing digits and for registering said routing digits in said one register sender, control means in said register sender operative to control said register sender to transmit impulses corresponding to the routing digits registered in said register sender, contacts controlled incident to the operation of said first relay for operating said control means, whereby said register sender transmits impulses corresponding to the routing digits registered therein by said first relay in order to complete a connection from said register sender to said called station having said single digit directory number, and contacts controlled incident to the operation of said second relay for operating said control means, whereby said register sender transmits impulses corresponding to the routing digits registered therein by said translator in order to extend a connection from said register sender in the direction of said called station having said plural digit directory number.

16. In a telephone system having a plurality of register senders, means for operating any one of said register senders to register a called station directory number, a first relay in said one register sender operated incident to the registration therein of a single digit directory number identifying a special service operator position for automatically translating said registered single digit directory number into at least two routing digits and for registering said routing digits in said one register sender, a translator common to said register senders, means including a second relay in said one register sender operated incident to the registration therein of a seven-digit directory number identifying a called subscriber substation for connecting said common translator with said one register sender, means controlled incident to said connection for translating at least three of the digits of said plural digit directory number into two or more routing digits and for registering said routing digits in said one register sender, switching apparatus, normally inactive impulse generating means in said register sender for transmitting impulses to said switching apparatus corresponding to the digits registered in said register sender, contacts controlled incident to the operation of said first relay for operating said impulse generating means and for preventing said impulse generating means from transmitting said single digit directory number, whereby said impulse generating means transmits impulses corresponding to the routing digits registered in said register sender by said first relay in order to complete a connection from said register sender to said special service operator position via said switching apparatus, and contacts controlled incident to the operation of said second relay for operating said impulse generating means and for controlling said impulse generating means to transmit impulses corresponding to at least the last four digits of said seven-digit directory number, whereby said impulse generator transmits impulses to said switching apparatus corresponding to said routing digits registered in said register sender by said translator and corresponding to at least the last four digits of said seven-digit directory number registered in said register sender in order to complete a connection from said register sender to said called station via said switching apparatus.

17. In a telephone system including a calling line, a first called line having a single digit directory number, second called lines having seven-digit directory numbers, switching apparatus, a register sender operative to register the single digit directory number of said first called line or the seven-digit directory number of one of said second called lines transmitted thereto over said calling line, a route register in said register sender operative to register a translation of the particular directory number registered in said register sender, sending means in said register sender, a first relay in said register sender operated incident to the registration therein of the single digit directory number of said first called line for selectively operating said route register to register at least two digits constituting a predetermined translation of said first called line directory number, a translator common to a plurality of said register senders, means including a second relay in said register sender controlled incident to the registration therein of the first three digits of a seven digit directory number of a second called line for connecting said common translator with said register sender and for selectively operating said translator in accordance with said first three digits in said seven-digit directory number in order to operate said route register to register at least two digits constituting a predetermined translation of said first three digits in said seven-digit directory number, means controlled jointly by the operation of said first relay and by the registration of said digits in said route register by said first relay for operating said sending means to transmit the digits registered in said route register to said switching apparatus in order to complete a connection from said register sender to said first called line, and means controlled jointly by the operation of said second relay and by the registration of said digits in said route register by said translator for operating said sending means to transmit the digits registered in said route register and then at least the last four of the digits of said seven-digit called line number to said switching apparatus in order to complete a connection from said register sender to said second called line.

18. In a register sender for use in a telephone system to register numbers of calls to be routed to either a first destination identified by a single digit or to a second destination identified by three digits and to retransmit routing digits corresponding to a translation of said registered numbers in order to route the call to the appropriate destination, a route register in said register sender operative to register routing digits indicative of a route to said first or said second destination, a first relay in said register sender controlled each time a single digit number identifying a call to said first destination is registered therein for operating said route register to register at least two digits corresponding to a predetermined translation of said registered single digit first destination number, a translator mechanism common to a plurality of such register senders, a second relay in said register sender controlled each time the three digits number identifying a call to said second destination is registered therein for connecting said translator mechanism with said register sender, means in said translator selectively operated in accordance with the value of each of the three digits in said last-mentioned number for operating said route register to register two or more digits corresponding to a predetermined translation of said registered three-digit second destination number, an impulse generator in said register sender operative to retransmit the translated digits registered in said route register, said first relay and second relay including respectively separate contacts for operating said impulse generator, a translation complete relay operated incident to the registration of digits in said route register, and a sending mechanism controlled jointly by the operation of said impulse generator and said translation complete relay for transmitting the digits registered in said route register in order to route the call to said first destination in the event said first relay is operated or in order to route the call to said second destination in the event said second relay is operated.

19. In a telephone system having a plurality of register senders, means for operating any one of said register senders to register a called station directory number, a first relay in said one register sender operated incident to the registration therein of a predetermined single digit called station directory number for automatically translating said registered single digit directory number into at least two routing digits and for registering said last-mentioned routing digits in said one register sender, a translator common to said register senders, a second relay in said one register sender operated incident to the registration therein of at last three digits of a plural digit called station directory number for connecting said common translator with said one register sender, means in said common translator operated responsive to said connection for translating at least the first three digits of said plural digit called station directory number into at least two routing digits and for registering said routing digits in said one register sender, switching apparatus, and means in said register sender controlled by said first relay or said second relay for selectively controlling said switching apparatus in accordance with the routing digits registered in said register sender in order to extend a connection via said switching apparatus to the called station corresponding to the directory number registered in said register sender.

20. In a telephone system having a plurality of register senders, means for operating any one of said register senders to register a single digit "0" identifying a particular operator position or a three-digit number identifying a particular called exchange, a route register included in said one regster sender comprising a plurality of groups of code storage relays, each of said groups of code storage relays being operative to register any one of a plurality of different digits, a first relay and a second relay in said register sender, means in said one register sender operated incident to the registration therein of said single digit "0" identifying said operator position for selectively operating said first relay, contacts controlled incident to operation of said first relay for operating at least two of said groups of code storage relays in said route register in order to register in code form at least two predetermined route digits, a translator common to said register senders, means in said one register sender operated incident to the registration therein of said three-digit number identifying said called exchange for selectively operating said second relay, a hunting switch, contacts controlled incident to the operation of said second relay for controlling said hunting switch to connect said common translator with said one register sender, means controlled jointly by each of said digits in said three-digit number registered in said register sender and by said translator for selectively operating at least two of said groups of code storage relays in said route register in order to register in code form at least two different predetermined route digits, switching apparatus, means in said one register sender controlled incident to the operation of either said first relay or said second relay for controlling said register sender to transmit numerical impulses to said switching apparatus corresponding to the route digits registered in code form in said groups of code storage relays in said route register, whereby said switching apparatus is controlled by said numerical impulses to select a particular route and complete a connection to said operator position incident to operation of said first relay and whereby said switching apparatus is controlled by said numerical impulses to select a particular route to said called exchange over which a connection may be established to a desired called line in said called exchange incident to operation of said second relay.

21. In a telephone system having a plurality of register senders, a route register included in each of said register senders, a first route identified by a first plural digit route designation over which connections may be established to a called operator position identified by a single digit number, a second route identified by a second plural digit route designation over which connections may be established to a called exchange, identified by a three-digit number, a translator common to said plurality of register senders, means for registering said single digit number or said three-digit number in one of said register senders, a first relay in said one register sender operated incident to the registration therein of said single digit number for registering said first plural digit route designation in the route register in said one register sender, means including a second relay in said one register sender operated incident to the registration therein of said three-digit number for connecting said common translator with said one register sender and for selectively controlling said translator to register said second plural digit route designation in said route register in said one register sender, a translation complete relay operated incident to the registration of either said first or said second plural digit route designation in said route register, means operated incident to the operation of both said first relay and said translation complete relay for controlling said register sender to complete a connection over said first route to said operator position in accordance with said first plural digit route designation registered in said route register, said last-mentioned means also operated incident to the operation of said second relay and said translation complete relay for controlling said register sender to extend a connection over said second route to said called exchange in accordance with said second plural digit route designation registered in said route register.

References Cited in the file of this patent

UNITED STATES PATENTS 2,628,282 Ostline ---------------- Feb. 10, 1953